United States Patent
Salim et al.

(10) Patent No.: US 7,328,233 B2
(45) Date of Patent: Feb. 5, 2008

(54) METHOD AND APPARATUS FOR IMPLEMENTING AN ACTIVE INFORMATION MODEL

(75) Inventors: Mohammad Salim, Boulder, CO (US); Barbara Rossner, Boulder, CO (US); Ronald Barber, Boulder, CO (US)

(73) Assignee: Corybant, Inc., Boulder, CO (US)

( * ) Notice: Subject to any disclaimer, the term of this patent is extended or adjusted under 35 U.S.C. 154(b) by 556 days.

(21) Appl. No.: 09/765,964

(22) Filed: Jan. 19, 2001

(65) Prior Publication Data

US 2002/0035593 A1 Mar. 21, 2002

Related U.S. Application Data

(60) Provisional application No. 60/176,983, filed on Jan. 19, 2000.

(51) Int. Cl.
*G06F 15/16* (2006.01)
*G06F 17/30* (2006.01)

(52) U.S. Cl. .................. 709/202; 709/201; 707/9

(58) Field of Classification Search ............... 709/229; 705/8, 9; 707/9; 715/500
See application file for complete search history.

(56) References Cited

U.S. PATENT DOCUMENTS

| | | | |
|---|---|---|---|
| 4,714,995 A | 12/1987 | Materna et al. | |
| 5,187,787 A | 2/1993 | Skeen et al. | |
| 5,202,996 A | 4/1993 | Sugino et al. | |
| 5,319,543 A | 6/1994 | Wilhelm | |
| 5,339,434 A | 8/1994 | Rusis | |
| 5,446,891 A * | 8/1995 | Kaplan et al. | 707/2 |
| 5,596,744 A | 1/1997 | Dao et al. | |
| 5,627,764 A | 5/1997 | Schutzman et al. | |
| 5,640,546 A | 6/1997 | Gopinath et al. | |
| 5,666,490 A | 9/1997 | Gillings et al. | |
| 5,666,553 A | 9/1997 | Crozier | |
| 5,677,997 A | 10/1997 | Talatik | |
| 5,678,041 A * | 10/1997 | Baker et al. | 707/9 |
| 5,706,452 A | 1/1998 | Ivanov | |
| 5,721,912 A | 2/1998 | Stepczyk et al. | |
| 5,721,913 A | 2/1998 | Ackroff et al. | |
| 5,724,406 A | 3/1998 | Juster | |
| 5,734,837 A | 3/1998 | Flores et al. | |
| 5,745,687 A | 4/1998 | Randell | |
| 5,745,692 A | 4/1998 | Lohmann, II et al. | |
| 5,754,857 A | 5/1998 | Gadol | |
| 5,768,506 A | 6/1998 | Randell | |
| 5,774,661 A | 6/1998 | Chatterjee et al. | |
| 5,790,789 A | 8/1998 | Suarez | |
| 5,790,809 A | 8/1998 | Holmes | |
| 5,799,297 A | 8/1998 | Goodridge et al. | |

(Continued)

OTHER PUBLICATIONS

Feigenbaum, Edward, Computing Machinery and Intelligence, "Computers and Thought," 1963, pp. 11-35, McGraw Hill, New York.

(Continued)

*Primary Examiner*—Kenny Lin
(74) *Attorney, Agent, or Firm*—Trenner Law Firm, LLC

(57) ABSTRACT

An active information model constructed from an aggregation of personal information portals containing an active agent. In a preferred embodiment, the system of this invention can be offered as a network service providing for information access and exchange according to the individual users' preferences.

27 Claims, 38 Drawing Sheets

*Active Information model*

U.S. PATENT DOCUMENTS

| | | | |
|---|---|---|---|
| 5,826,020 | A | 10/1998 | Randell |
| 5,842,205 | A | 11/1998 | Brann |
| 5,874,954 | A | 2/1999 | Kilmer et al. |
| 5,878,398 | A | 3/1999 | Tokuda et al. |
| 5,890,130 | A | 3/1999 | Cox et al. |
| 5,890,133 | A | 3/1999 | Ernst |
| 5,893,911 | A | 4/1999 | Piskiel et al. |
| 5,915,115 | A | 6/1999 | Talati |
| 5,937,388 | A * | 8/1999 | Davis et al. ............. 705/8 |
| 5,999,940 | A | 12/1999 | Ranger |
| 5,999,942 | A | 12/1999 | Talati |
| 6,073,109 | A | 6/2000 | Flores et al. |
| 6,078,326 | A | 6/2000 | Kilmer et al. |
| 6,088,679 | A * | 7/2000 | Barkley ................. 705/8 |
| 6,138,156 | A | 10/2000 | Fletcher et al. |
| 6,148,337 | A | 11/2000 | Estberg et al. |
| 6,161,007 | A | 12/2000 | McCutcheon et al. |
| 6,178,443 | B1 * | 1/2001 | Lin ..................... 709/208 |
| 6,189,104 | B1 * | 2/2001 | Leppek .................. 713/201 |
| 6,212,550 | B1 | 4/2001 | Segur |
| 6,236,983 | B1 * | 5/2001 | Hofmann et al. ........ 706/47 |
| 6,397,191 | B1 * | 5/2002 | Notani et al. ............ 705/9 |
| 6,438,217 | B1 | 8/2002 | Huna |
| 6,449,632 | B1 * | 9/2002 | David et al. ............ 709/202 |
| 6,539,404 | B1 * | 3/2003 | Ouchi ................... 715/500 |
| 6,697,865 | B1 * | 2/2004 | Howard et al. .......... 709/229 |
| 2001/0033639 | A1 | 10/2001 | Martin |

OTHER PUBLICATIONS

Adams, James L., Conceptual Blockbusting—A Guide to Better Ideas, 1986, pp. 1-10; 83-101, Perseus Books, Cambridge, Massachusetts.

Humphrey, Watts S., Managing the Software Process, 1990, pp. 72-80, Addison-Wesley Publishing company, Reading, Masachusetts.

Senge, Peter M., The Fifth Discipline, The Art and Practice of The Learning Organization, 1990, pp. 273-301, Doubleday Currency, New York.

Smith, Preston, Developing Products in Half The Time, 1991, pp. 3-6, Van Nostrand Reinhold, New York.

Brunt, Ron, OPENframework—The Systems Architecture: an Introduction, 1992, Prentice Hall, New York.

Hampden-Turner, Charles, The Seven Cultures of Capitalism, 1993, pp. 163-196, Doubleday Currency, New York.

Miller, Lawrence M., Whole System Architecture—Beyond Reengineering: Designing the High Performance Organization, 1994, pp. 263-290, The Miller consulting Group, Inc., Atlanta, GA.

Hollingsworth, David, Workflow Management Coalition The Workflow Reference Model, 1994, Workflow Management Coalition, Belgium.

The Common Object Request Broker: Architecture and Specification, Revision 2.0, 1995.

International Standard CEI IEC 601-1-4, 1996, Collateral Standard Programmable Electrical Medical Systems.

Van Hoff, Arthur, The Open Software Description Format, 1997, W3C Consortium.

Business Services Architecture: the Integration of Software Components and Common Services Infrastructure, 1998 A NAC Position paper.

Microsoft OLE DB 2.0 Programmer's Reference and Data Access SDK, 1998, Microsoft Press.

Conallen, Jim, Building Web Applications with UML, 1999, Addison-Wesley, Reading, Massachusetts.

* cited by examiner

Figure 1 Active Information model

*Figure 2. Defining a Role*

Figure 3. Perspectives and Views of Information

*Figure 4. Data Sources viewed through roles*

Figure 5 Reference category

*Figure 6. Facades*

Figure 7. Beginnings of an Information Model

Figure 8. Access to Information is an attribute of Roles

Figure 9 *Users are autonomous members of the community*

Figure 10 Active Agent Engine functions

Figure 12. Implementing Personal Information Portals

Figure 13 Using a Personal Information Portal

Figure 14 Example: Personal Information Portal in Home Healthcare

FIG. 20

*Example: Organizational view of an Information system for HomeCare*

| Reference ID | Description |
|---|---|
| 1 | Intake Form |
| 2 | Dr Verbal Order |
| 3/O | Open Reimbursement form |
| 4/O | Open Treatment of Consent |
| 5/O | Open Financial Responsibility |
| 6/O | Open Oasis Form |
| 7/O | Open Progress notes 2nd page only |
| 7SN | Daily Progress notes  Skilled Nursing |
| 7PT | Daily Progress notes  Physical Therapy |
| 7ST | Daily Progress notes  Speech Therapy |
| 7OT | Daily Progress notes  Occupational Therapy |
| 7MSW | Daily Progress notes Social Worker |
| 7CNA | Daily Progress notes  Certified Home Health Aid |
| 8/O | Open 485 |
| 9 | Med sheet side affects |
| 10/O | Medication list |
| 11 | Discharge Summary |
| 12 | CNA Plan of Care |
| 13PT | Plan of Care  Physical Therapy |
| 13ST | Plan of Care  Speech Therapy |
| 13OT | Plan of Care  Occupational Therapy |
| 13MSW | Plan of Care  Social Worker |
| 14 | MSW Plan of Care  Social Worker |
| 15PT | Initial Eval  Physical Therapy |
| 15ST | Initial Eval  Speech Therapy |
| 15OT | Initial Eval  Occupational Therapy |
| 15MSW | Initial Evaul  Social Worker |
| 16 | Activity Sheet |
| 17MSW | MSW orders |
| 17 | Interim physician's orders |
| 18 | CNA Supervisory |
| 19 | Misc. communication form |
| 20 | Revisit Form |
| 21 | Transfer Summary |

*Table 1.*

*Example: Summary of forms identified in Figure 27*

*Example: QA function explicitly identified*

*Example: Using generic Roles and proxy Roles*

```
C:\
   Program Files\
      Corybant\
         homecare\
            homecare.mdb  (contains patient information table: Table1)
            intake\
               intake.ham
               intake.mdb (contains caregiver information table: cg)
            registered nurses\
               registerednurse.ham
               rn010\
                  rn010.ham
               rn020\
                  rn020.ham
               rn030\
                  rn030.ham
```

*Figure 33.*
*Example: Directory Structure*

METHOD AND APPARATUS FOR IMPLEMENTING AN ACTIVE INFORMATION MODEL

RELATED APPLICATION

This application is a Non-Provisional filing based on the U.S. Provisional patent application Ser. No. 60/176,983, filed Jan. 19, 2000, and entitled "Datasource Harmonizer".

FIELD OF THE INVENTION

This invention relates to computer systems, and more particularly to creation of information models for managing a distributed information system. The invention has particular utility for creation and maintenance of enterprise information systems.

INTRODUCTION, BACKGROUND, AND SUMMARY OF THE INVENTION

There are several problems associated with a conventional "technology-centric" approach to developing Enterprise applications. These problems include a certain lack of flexibility in the final system and real or perceived non-conformance to user and business needs. An example of previous work done in providing a system that is responsive to business processes is described in U.S. Pat. No. 6,073,109, issued Jun. 6, 2000 for a Computerized method and system for managing business processes using linked workflows.

Two of the principal advantages of current invention are that it is based on a "user-centric" approach to creating an information system, and that it can be implemented incrementally.

To be of value in the decision process, an information system must be easy to implement and adaptable to emerging technologies and changing business needs. Its successful implementation incorporates knowledge of the roles of the individuals and the workflow within the enterprise. Additionally, it is necessary to implement such an information system incrementally, allowing at all times for different parts of the enterprise to be at different levels of operational and technological maturity or obsolescence.

The basic theories of distributed systems incorporate four abstract operating perspectives. These are perspectives of Business Management, Application Developer, Service Provider and User. Although this model represents the users' perspective, it implicitly assumes that the information system belongs to the one enterprise and the users' perspective is in the context of their relation to that enterprise. We feel, however that user centric information systems must reflect the dimensionalities of the users' universe beyond those mandated by their employers. By using the example of professional practitioners in regulated industries, we were able to include a quantifiable attribute of a professional's universe that transcends the consideration of a single enterprise.

Need for a User Centric Information System

A fundamental premise of the invention is that "the user is the primary focus of the information system". To understand why this approach may be unique now we can reflect on the evolution of information systems.

Focus on Building Better Computers

There is hardly anything that we do with computers that does not find its way back to A. M. Turing. It is possible that the reason for this strong affinity is Turing's unmistakable genius. It is also possible that we are trapped by the clarity of Turing's ideas. Turing's landmark paper [1] poses a simple question "Can machines think?" This seemingly innocent question locked the focus of information systems on technology for the last 50 years.

When we think of the people who have contributed to the development of information systems we think of physicists, mathematicians and engineers, not coincidentally, individuals with the same love for the abstract as Turing. It is interesting to think of what may have happened if Turing had stated a different question. Who would have been the designers of information systems today if Turing had asked, "Can people use these machines to an advantage?" Or simply "are computers really worth all the trouble?"

It was inevitable that once people outside of the closed circle of scientists and engineers started using the computers, people would find a way to make them more useful. The interesting question is what took so long? We can spend a few minutes and ponder how would we have thought about information systems if humanity had approached the information revolution with a bias toward "the domain of the problem" rather than "the domain of the solution"[2].

Information System is a Commitment not a Project

This is not idle curiosity. The fundamental technology of information systems, i.e. software, has consistently resisted economies of scale. One reason for this may be that up to now, in an information system the only acceptable specification can be presented in the language of implementation.

In other words we have a language for specifying other major undertakings such as highways or buildings, that allows us to think of them in terms of what is needed but in information system we only think in terms of what is possible or what is "cool". That is, a "technology-centric" model for an information system.

As the information revolution progresses and non-programmers begin to rely on information systems, the information industry has no choice but to assume a broader perspective. Specifically, we are beginning to realize the extent to which an information system in each phase of its lifecycle, be it specification, development, or deployment, is an organizational commitment (a process), and not an individual or departmental task (not a project).

The Individual and the Collective

At the very core of the invention we start with the benefit of hindsight captured in one simple question that is to be answered independently for every single individual who is to be served by the information system: "what will the system do for me?" which is only the prelude to asking "how can I make it do what I want?"

The social implications of these questions are much more significant than may appear at first glance. There is a very good reason that software and system vendors and even many Internet businesses adopt a Business to Business (B-to-B) model and risk their business objectives to the long sales cycles and uncertain outcome of attempting to sell their products to the Fortune 1000 companies. Information systems are fundamentally focused on computers, which are only effective if they are handling abstractions (i.e. running programs).

From the point of view of a programmer, organizations, and in particular large organizations, are information abstractors. From the point of view of information management an organization is an abstraction of information needs for groups of individuals. If you start with the question "can we make a smarter computer?" the resulting product will make more sense to the larger enterprise every time.

On the other hand, the convergence industry, i.e. the industry that is concerned with information management and communication in a world of global commerce, wireless devices and Internet, is learning something about the value of being able to serve an individual, independent of their "current" employers. In this industry a company's net worth can be measured in terms of the number of subscribers that it serves. This value makes it worthwhile to answer a direct question "how can we serve this user?" But the traditional approach to design of information systems is preoccupied with building smarter computers and answers this question indirectly, if at all.

The convergence market requires a strong user centric element. A phenomenon similar to the evolution of long distance service providers and wholesale bandwidth merchants may make the delivery of information services a commodity in the future. If that happens, delivering information services to an individual in the context of both personal and professional requirements will pose an attractive business opportunity and may create a greater demand for true user centric implementations. Such a user centric information system must balance the traditional contention between "individualism" and "collectivism" [7] smoothly and consistently. We will refer to this need as "personalization".

Retrofitting the Old Approach to the New Problem

A traditional engineering approach for personalization is to start with existing technology centric elements and develop a transformation that maps its attributes into the attributes of a user centric system. This approach is the common characteristic of architectural design methodologies including the recent object oriented approaches that are based on a formal definition of use cases [15].

A difficulty with this traditional approach is that these transformations tend to be non-linear i.e. they do not scale with the number of users or other changes in the scope of users' needs. However, when such changes occur, a non-linear transformation contributes its own artifacts into the solution, which are indistinguishable from the attributes of the problem space. For example it is difficult to ascertain if a certain behavior of the system is the result of implementation considerations or if it was a part of the original use case. Consequently traditional information systems tend to become an obstacle to the growth of the enterprise.

Another difficulty with this traditional approach is that these transformations are unidirectional because they are postulated, not calculated, as a result of a process of synthesis, which flows from requirement to implementation. Consequently a traditional architecture approach to information systems may identify deployment and maintenance as auxiliary processes that take place after the system has been designed, implemented, and validated. This approach is necessitated by the unidirectional nature of the transformation from the problem space (use cases) to the solution space (implementation).

In the end, users of information systems find that using an information service is effectively the same as joining an exclusive information club (a domain). Certain services are exclusively supported within the domain and the domain tends to have a life cycle, or a growth characteristic that is independent of the user.

Looking at the Information System as an Organizational Undertaking

The invention describes a method and an apparatus to serve the user. The method starts with the recognition that an individual user is a member of multiple enterprises. Within each enterprise, the invention attempts to capture a pragmatic specification of the user's information needs.

In a user centric system each enterprise is a forum for collaboration [4]. In other words, the invention assumes that the user's association with each enterprise codifies the user's information needs. This is an important concept that makes it possible to use a distributed computing environment to serve the information needs of the users.

The invention includes the concept that abstracting the users' roles within each enterprise creates an Information Model. The invention provides for continued evolution of this Information Model by making it possible for a user or a group of users to modify its or their behavior (we will refer to this as an "Active Information Model").

An information system is an organizational commitment and as such the processes governing allocation of resources for its continued operation are a primary concern of the organization. Its specific attributes, such as the technologies that are included or the need for upgrading a certain service or a component become a concern only through such processes, for example if they are discovered to be in conflict with the organization's operational assumptions.

Multiple Perspectives

Furthermore, change is a reality of practice and it is a given that any information model (active or not) is always incomplete. The only reason that we consider any information model to be commercially useful is because it can be continually improved through formal processes [3][8]. If these processes are not supported, the implementation of the information model is faulty.

The apparatus that supports the invention serves two functions. As a component of a user centric system it must facilitate satisfaction of the information exchange agreements between the user and his/her collaborators. As a component of the enterprise's Active Information Model it must serve to contribute to the enterprise decision support processes for allocation of resources to the information system.

Extensive and excellent prior art exists in the area of characterizing an enterprise information system. Principally this work addresses the issues involved in implementing a service oriented distributed system [13], and the mechanisms for presenting system services as commodity items in a distributed environment [10], [12]. In general however, prior art is based on the assumption that the primary force governing an information system is the organization's mission or business objectives.

Early work in this area [6] describes four general perspectives that govern the evolution of an information system. These perspectives were identified as Management, Technology (Application Development[6]), Service, and User. In the development of the invention we found that a user centric system must accommodate additional perspectives that relate to the users' professional considerations, which in certain cases are independent of the business considerations of the enterprise. In an example of a specific embodiment of this invention (discussed in more detail in the "Detailed Discussion"), we choose to use a professional in a regulated industry as the prototypical user in order to extend the traditional model while at the same time maintaining a specific and recognizable relationship with a real world example.

Implementing the Engine

The operation of the Active Agent engine is described in detail in the Detailed Description of the Invention. Here, a few notes are appropriate.

The Active Information Model is a distributed system that:
  Describes the information management policies of the enterprise,
  Is never totally completed, although to the extent that it is described, it is accurate.
  Accurately reflects the organization because it is Active, i.e. it includes components that provide two essential services in the enterprise information system, namely information mapping and workflow.
  Is insensitive to the technologies that the organization uses to implement the underlying information system.

Interfaces

Certain unique attributes of the engine that support the active information model of this invention are based on its relationship to the users and the enterprise i.e. its interfaces, rather than its internal implementation. In essence these interfaces characterize the levels of integration, i.e. the way this engine relates to the computer based as well as human based segments of the enterprise information system. The engine is characterized by five interfaces. Four of these interfaces (Provider, Consumer, Configuration and Execute interfaces) are effectively exposed to the enterprise. The fifth interface deals with the way the engine retrieves its programming from the information model.

Workflow and Data Mapping

In this invention the combination of workflow and data mapping serve to make the active Information Model work.

The invention treats an action as an attribute of a role and not a service that is provided by the enterprise system. In a traditional enterprise application, an individual user can invoke an action. This causes the system to perform certain functions, which generally includes access to data sources. Changing system functions generally requires intervention by programmers. The concept of an Active Information Model in a user centric system directly supports situations where a user (or group of users) redefine a particular organizational function. For example, a supervisor may choose to change the way a service request is routed to a particular sub-group of his/her staff because they have had to move to a customer site for the day and are using PDAs instead of workstations for communication.

This local and transient nature of workflow is closely coupled with data mapping and the need for its redefinition to be configurable at the user level. To implement this, the inventors have defined a concept of a Command, for a lower level activity which is similar to system services in a traditional system, and have created a higher level abstraction of Actions as an externally visible attribute of a role that can be invoked by other roles.

It should be noted that Workflow is not defined by the aggregation of the actions but rather by the aggregation of the roles that include those actions. In other words Workflow is a statement of policy and the Active Information Model reflects this policy (moves information according to it) rather than implements it.

Information Mapping

The value of the engine of this invention to the information model of this invention is in the way it maps the information more than in its unique algorithms to move information at high speed. The engine is principally a mechanism for remembering the association of various elements of information in the context of a certain role within the enterprise. When an action is invoked the engine attempts to resolve all of the associations that are related to that action. In the process of resolving those associations various commands are executed and some data is moved.

There are two further concepts that are significant to discuss here, namely the use of reference categories and the use of facades. These concepts are discussed in some detail in the specification but it is worth noting here that they serve to contain the localized changes in the information model, making it possible to construct and maintain the information model incrementally.

Objectives

The methods, apparatus and systems of the invention are designed to meet the needs of professionals who collaborate with associates in multiple enterprises. To test fully the user centric aspects of the invention, it was determined that the above statement should be extended to meet the needs of certain business segments that have additional elements of cost or regulatory requirements. Therefore the design point for an embodiment of the invention was chosen to include additional constraints by using as the prototypical user professionals who work in small to medium size businesses and who are part of a regulated or structured industry such as healthcare, legal or maintenance and repair services. In this regard, the objectives of the method, apparatus and system of the invention include the following metrics:
  Information systems and applications must be easy to purchase and provide an immediate return on investment (ROI).
  They must integrate easily into the existing environment and be easy to use.
  They should be configurable:
    to allow the users to define their own environment relative to multiple business and professional associations.
    to allow the businesses to incorporate their own unique business processes. "I want it my way, not the way a programmer thinks I want it" is a phrase heard over and over during market research interviews.
    to accommodate improvements in the individual and/or organizations' operational practices.
  They should be compliant with current and emerging communication and reporting standards.
  They should be flexible, enabling access to a wide variety of communication devices, databases and data sources and possess the ability to change as personal practice and business processes change.
  Information management solutions must be scalable to allow the business to start small, yet maintain the ability to grow as business needs dictate.
  Technology must be supported, if not embraced, by information services (IS) professionals (i.e. consultants and systems integrators) to allow professionals to enlist knowledgeable support as the need arises.
  Technology must support, not dictate, the business operations and users' needs.

With these objectives in mind, the result of deploying the Invention is a virtual, interactive, information management system that is not uniquely dependent on any server or any specific apparatus for its operation. The implementation of the system can use a variety of electronic data processing devices to assist the users' interaction with the system and data storage servers and communication links to provide for storage and transmission of persistent information. Examples of suitable electronic data processing devices may include workstations, laptop computers, and hand held data entry and communication devices, and others that may be developed in the future. The choice among these devices is based on the needs of the users of the system and the system itself is not dependent on any apparatus. The primary governing factors in the information system that deploys the Invention are the processes that the user community has adopted, in contrast to a traditional information system that imposes processes that facilitate use of its components.

The concept of "process" as used in the context of The Invention indicates a continuous focus by the participants on achieving a common objective. Specifically, and for the purposes of information management, a process is the formal element for managing the probability of success during the course of an activity.

The active elements of any process in an organization are the individuals who participate in the process. Within the framework of the governing process, these individuals evaluate progress, and redefine and execute the specific actions that result in improving the probability of success. An information system that serves such a process must facilitate this continuous redefinition and execution of these specific tasks. It follows that a critical attribute of the Invention is its ability to represent an existing process in a coherent, active information model whose behavior is continually updated and reconfigured by its users.

A significant function of the invention is the creation and continuous improvement of an information system by the individual or organization that deploys a computer system to serve an enterprise. The Information Model of this invention:

Identifies the individual roles within the organization,
Identifies location and characteristics of sources and destinations of the information elements that are used or created by each role (the relationship of each role to the data),
Specifies the rules of translation between elements of data, from the perspective of each individual role,
Specifies actions that are taken by each role relative to the information (the relationship of roles to one another).

Among the components of the invention that support these features are:

A persistent record that describes the above information for each role: Configuration
A software program that uses this information to perform the specified actions for each role: the Active Agent Engine
A formalism that provides for translating the needs of the organization into configuration records for each instance of the Engine: Process.

The invention is a method and system embodied in the apparatus of an Active Agent that facilitates implementation and deployment of adaptable collaborative enterprise-wide information management systems.

It includes a software program that can operate in conjunction with, and independent of other programs within a computer system. This program operates as a system service which means that it may receive its instructions from the users of the information system or from other objects or application programs that are either running on the computer in question or have the ability to communicate with this computer. (software Engine).

This Engine is, and is implemented using, a group of independent, homomorphic components with specific structure and interfacing rules (industry term: Objects). A current embodiment of this invention is exemplified in its prototype implementation within the framework of an Object Model. As the Engine is itself an Object, multiple copies of it may be present within the system.

Using this Engine in a network of computers makes it possible for the organization to create a living definition of an organization's information use and management practices (an Active Information Model). "Active Information Model" implies that this model is defined and modified as needed, and in real time, in order to reflect the organization's structure. It further implies that it is an integral part of the organization's daily operation. "Real time" means that in order to redefine the responsibilities of one component, other components within the system do not have to stop functioning. The primary benefit to the organization is the ability to create an information management system, substantially independent of its specific hardware and software components. Specific advantages of this invention include the elements of the software system as well as the Active Information Model and elements of an information architecture that, once adopted by the organization, makes the overall information system a living and changing component of the enterprise.

Advantages of the Invention over Prior Approaches

The Active Agent Engine is a tool for tailoring enterprise applications to satisfy the users' requirements. It:

Serves as the agent of the user (not as the glue between applications),
Satisfies the user's information needs within the enterprise rather than forcing the user to deal with the information that is created by generic applications,
Defines the enterprise's Information Management practices as an aggregation of the user's information needs.

SUMMARY OF THE INVENTION

This invention includes an active information model constructed from an aggregation of personal information portals containing an active agent.

In a preferred embodiment, the system of this invention can be offered as a network service providing for information access and exchange according to the individual users' preferences. The advantages of the system include the ability of users and organizations to deploy best of breed information services in an integrated information system that is created and managed by the business management, based on the needs of the business and preferences of the individual users. This combination of features permits the organizations to provide information services to their employees through a variety of communication devices as well as personal workstations and terminals.

Active Information Models

The highest level of abstraction with regard to the invention is the concept of Active Information Models. Every idea within the invention eventually finds a way to support the following notion. An Active Information Model is a distributed information system that:

Describes the information management policies of enterprises.
Although accurate in describing these policies to the extent that it does, it is never totally complete.
Includes components that provide two essential services in the enterprise information system namely information mapping and workflow.
The language of its definition reflects the organization's behavior and is relatively insensitive to the technologies that each organization uses to implement the underlying information system.

The four basic elements of the invention reflect these concepts in such a way as to facilitate a formal process for creation and maintenance of an Active Information Model for an organization. These elements are Roles, Data Sources, Relations, and Workflow.

The invention provides for definition and utilization of these elements, to the extent that is necessary to create and maintain an Active Information Model in an enterprise. The focus of the invention is on accuracy of this model and two essential qualities of the resulting information system i.e. serviceability and potential for change. Other essential qualities of the information system (such as performance, security, and availability) reflect the behavior of the implementation platforms.

The invention includes an apparatus for implementation and a method for specification of an Active Information Model. Although the principles of the invention are generally applicable, we have chosen to describe it in the context of organizations that operate within regulated industries. In doing so we feel that we have demonstrated the general nature of the device and method beyond current practices in design of information systems.

The basic theories of distributed systems incorporate four abstract operating perspectives. These are perspectives of Business Management, Application Developer, Service Provider and User. Although this model represents the users' perspective, it implicitly assumes that the information system belongs to one enterprise and the users' perspective is in the context of their relation to that enterprise. We feel, however that user centric information systems must reflect the dimensionalities of the users' universe beyond those mandated by their employers. By using the example of professional practitioners in regulated industries, we were able to include a quantifiable attribute of a professional's universe that transcends the consideration of a single enterprise.

Roles

The invention provides a mechanism to define a Role by specifying the activities in which an individual participates and the services that an individual requires within the context of the information system, in the course of fulfilling an assignment.

Data Sources

Data source is an abstract concept that encapsulates the origin and destinations of the information. We have used the generic term "data source", in recognition of Microsoft's ODBC and OLEDB initiatives, which are significant contributors to the computer industry's ability to share information between disparate systems. Our use of this term, however, is broader than Microsoft's. We look at data sources as elements of the entire enterprise rather than a component of the computing environment within the enterprise.

A data source, as a fundamental element of an Active Information Model refers to any component of the overall organization where information is stored and is made available according to a well-defined set of rules.

Practically, for the purposes of the invention, we define a data source as any data storage mechanism within the information system for which a formal interface definition is available. This includes databases and application specific file formats and other Engines.

Categories

A Category identifies reference to a data source within a Role. Categories describe data sources (logical reference), how to access them (access parameters), and the treatment of the information. For example, a Category may be a database located at a specific location on a network where the actual data resides. Another Category may be a reference schema that describes the way data is organized or a facade, which is a description of the presentation of data.

Relations

Relations are formal, abstract attributes of an Active Information Model that characterize the relationship between the elements of data sources. The prototype implementation of the Invention included two classes of Relations, namely Associations and Rules.

Associations

An Association is a declaration that a relationship exists between two or more elements of different data sources. Associations do not imply sequence or cardinality. From the point of view of information system design, an Association is an abstract condition that must be satisfied in order for the Active Information Model to achieve steady state. The sequence of operations that lead to steady state may be implicit or it may be described in terms of a Rule.

Rules

Rules are the mechanisms that embody an Association.

In general, Rules are attributes of Relations and independent of Associations. At the simplest level, this independence may be perceived as a means to re-use a definition of a Rule in the context of multiple Association. Although this is an appropriate example of the relationship between Rules and Associations it does not completely capture the scope of this concept. For example, the Invention allows for implementation of a time-variant, parametrically defined Rule that generates independent events based on changes in values of elements within multiple data sources.

Workflow

The Workflow Management Coalition (WFMC) defines Workflow as: "The computerized facilitation or automation of a business process, in whole or part". In the context of the Invention, Workflow refers to attributes of an Active Information Model that are concerned with movement of information between different data sources. Largely, Workflow is the element of the Invention that creates a unique instance of the Active Agent Engine, specific to the activities of an individual User. The prototype implementation of the Invention included two classes of Workflow elements, namely Commands and Actions. As a general rule, Workflow elements tend to serve as a "verb" in a sentence where Categories serve as nouns.

Commands

Commands are the lowest level operators for moving data from one data source to another. The most common examples of Commands in an Information System are select and insert (similar to put and get as used in network protocols). As a rule, Commands require parameters that qualify their targets. Specifically, the definition of a Command is not instructions to the Information System for movement of data, rather the execution of a Command starts the chain of activities that ultimately resolve the conditions set forth in the related Associations.

Actions

Actions are aggregations of Commands that are visible to the run time interfaces of the Engine. In general, Actions activate the portions of the information system that are specific to an individual user. Actions are high level events and include global parameters that specify the criteria for access to the data sources and the context within which information is modified.

It is important to recognize that the attributes of the Role govern the details needed for executing the task.

The Active Information Model is Measured in Terms of its Elements

The Active Information Model is higher level abstraction than the Information System that implements it because it captures the aggregate description of the "purpose" of that Information System from the perspective of its users.

As such, the Active Information Model includes only one type of element, the Personal Information Portal. The relationships of the users within the Active Information Model are reflected in the relationships of these Portals. For example if two users share information, then there is a mechanism within the portals to accommodate this sharing.

The general notion of a Personal Information Portal is not unique to the invention. The concept of using such a construct to include an "active agent" and to represent a User's involvement in one or more enterprises is unique. The further refinement of this concept, namely the methodology of creating Active Information Models to formalize the process of defining and continuously enhancing the usefulness of the Personal Information Portal is also unique. A Personal Information Portal as defined by the invention must have the following characteristics:

- It must be a component of a distributed system architecture (it is an "object" within a distributed environment)
  have a persistent storage
    perform certain functions within the distributed system including
    methods (programs) that it inherits from its class
    methods that are unique to its specific instance
    can be instantiated (a new copy if it generated for a new user)
    can be remotely accessed (send and receive messages)
  Its behavior is subject to modification by the User
  Is aware of its relationship with other Personal Information Portals within one or more enterprises, reflective of the users' associations.
  It supports multiple interfaces
    Interface to the user, for performing its functions within the information system
    Interface to allow the user to modify its behavior
    Interface to other portals, external information services, and data sources
    Interface to the distributed system to allow maintenance, monitoring and upgrade functions The concept of Personal Information Portal as the primary dispatch mechanism for information services offers a simple solution of the technical issues involved. A personal information agent can keep track of all of the transactions that an individual performs by simply logging these transactions. It can also invoke the appropriate context sensitive encryption levels making it possible to distribute the same service to a variety of users with subscription to different levels of services.

In this way, this feature is similar to the notion of kWh meter at each home. The method involving the Personal Information Portal makes it possible for users to have ubiquitous access to network services. In addition, having this capability makes it possible for any vendor of application services to use an Internet service provider as the distribution mechanism for their product and for the users to be charged according to a schedule appropriate for that service.

The General Idea of an Active Agent Engine

The concept of an Active Agent as a component of a Personal Information Portal is unique to the invention. The Active Agent is one example of a class of devices that effectively provides this function.

The general function of an Active Agent within a Personal Information Portal is to create a single mechanism (a unifying language; both in terms of syntax and semantics) that gives the user a pragmatic and therefore simple means of specifying their intention for using the various service elements. Service Elements may be Information Services (programs), communication devices, information sources, or other system resources. The Active Agent is viewed as an engine, an active component that performs sequences of specific programmed tasks. It accomplishes its objective by enabling the user to specify their view of each Service Element in terms of the way the functions of that Service Element relate to other Service Elements.

Attributes of the Active Agent Engine that are significant from the standpoint of implementing a Personal Information Portal are that the Active Agent Engine:

- Can Gain Access to Service Elements
- Offers a unified view of the Service Elements to the user.
- Recognizes other Active Agent Engines as Service Elements
- Has specific atomic functions
- Has the ability to perform its functions in sequence as directed by the user or as triggered by other Active Agent Engines or Service Elements (is programmable and can accept trigger events).

Implementation of the Active Agent Engine

The Active Agent engine is an Active component, a program, which moves information between various data sources within a network of digital computers. A "data source" can be any collection of data for which a provider can be created. Examples of data sources are tab separated text files, spreadsheets, named fields in a form, or a table in a relational database. Active Agent engines are capable of communicating information in form of data and events i.e. an Active Agent engine can see data sources through other Active Agent engines and can send and receive events.

Creating an Active Information Model

An Active Information Model is a process. During this process the organization creates and continues to improve a formal and accurate description of who creates and uses the information, how they create and use this information, and in what forms. Ultimately an Active Information Model is a tool that will help with the process of improving the management of information within an organization. As a tool of process improvement, the Invention offers three important concepts that are somewhat independent and at the same time collectively provide a complete definition. These concepts (roles, categories and actions) have already been introduced, and will be discussed in greater detail in the "Detailed Description of the Invention."

An additional concept that is an important element of the invention is the concept of Messages, as used commonly in distributed systems to signify a formal mechanism for transporting information.

These concepts are "abstractions" in the sense that each of them is a convenient aggregation of ideas and practices that satisfy the needs of a particular view within the enterprise.

Embodiment of the Active Agent

The Active Agent is an element of distributed application architecture and includes modular components that support workflow management, data mapping, and application linking. These components implement an information management system that is effective in a single workstation or a network of computers in a client-server model such as World Wide Web or an enterprise Intranet system.

Framework of the Invention

The technical foundation of the invention is rooted in the concepts of distributed, and service oriented approaches to computer system architecture. The purpose of the invention is to provide a framework for an information system that can serve users who are members of one or more professional communities (as well as other users), by providing them with a tool for participating and improving the formal processes of information exchange and collaboration.

While this invention applies to other users and to non-professional communities, most professional communities (such as legal, accounting or healthcare practitioners) have developed processes specific to their unique needs and are using a formalism that reflects their specific discipline (e.g. medicine, law, or finance). Industries that are formed around these professional communities have adopted these processes in creating the operational framework of the businesses that support each professional practice (e.g. health clinics, law firms, or accounting firms). Regulatory bodies or significant stake holders in these industries (e.g. government agencies or insurance companies) have further identified certain additional considerations in order to facilitate their support or monitoring of these industries (e.g. insurance forms, tax laws, or FDA regulations).

Collectively, these definitions and agreements impose a general structure on each industry segment. Each business within each segment incorporates additional refinements to this basic framework to derive its own unique operational policies.

This entire chain of agreements, conventions and regulations is subject to change as a result of political, social, economic or business considerations. In order to be effective, an information system that serves a business in a regulated industry must respond to these changes.

The traditional method of implementing information systems is most responsive to technological considerations and least responsive to the needs of the individual end user. This method makes it possible to create effective information systems for large enterprises where the needs of the individual users are secondary to the policies of the enterprise and where there is sufficient operational mass to warrant engaging computer specialists who continue to improve the enterprise information system. In many cases the organization continues to fund this costly and non-responsive practice based on the promise that the next technological advance will provide a significant improvement.

Smaller businesses and independent professionals generally use generic business software such as spreadsheets, word processors and e-mail as the primary automation tool and, in effect, create an information system. This is an effective approach and highly flexible but it lacks a formal structure and tends to fall apart when these organizations grow even slightly.

The Invention specifically addresses this problem by adopting a service view of computing resources and functions. Furthermore it provides a mechanism to capture and enforce the framework of a regulated industry, and presents this environment to the end users in such a fashion as to allow them to personalize its behavior to fit their individual needs.

In effect, the invention transforms any single computer, or network of computers, into a scalable information management system. The users can connect word processors, desktop database managers and spreadsheet programs to internet based application services, enterprise databases, legacy applications or simply connect them together to create an enterprise solution. Using the Active Agent, business managers can customize the access to and use of information how, when and where they want it.

Agents

The way that people use computers today is by stepping the computers through what the computers have to go through to accept or provide information. This makes it so that only people who know how a computer works, (programmers) can effectively work with it. Others (users) have to accept the information when and how the programmers deliver it. We can make it so that most Internet users can tell the computers what information they need and how they want to receive that information.

The way we do this is by having an agent for each user in the Internet. This agent is a program that can store and distribute information the user has provided, and can gather information the user has asked for, in the form they wanted to receive it.

These agents can communicate with other agents and other programs that are available on the Internet as services. By telling these agents what and how they want to deal with information, people can create a personal work space that they can reach from any where, using any device that is capable of interacting with the Internet.

EXAMPLES

A service that calls you on your cell phone when you receive an email from certain individuals, looks up their phone number from your address book and offers to call the email sender.

A mechanism that keeps track of the time that an attorney spends with clients. This may be based on their calendar, the time they spend with clients on the phone, and the time that they spend working on documents that are in the client's files on line. This service can present the attorney with an invoice authorization report and upon approval can connect directly to a billing service that automatically invoices the client.

Services to keep track of all of household expenses, which are paid by check, using cellular phone or credit cards. At the end of the month, the service creates a simple spreadsheet to authorize direct payment from your bank account. This service can also make recommendations about transferring credit card balances or statistics on delinquent accounts with each lending institution.

A filing system that keeps track of your communications with your clients and keeps them organized and cross-referenced. Such a system can be used to conduct detailed dialogue on multiple topics with clients without the fear of loosing track of a topic or activity. In the end, each conversation can spawn into a new enterprise.

The Analogy with LEGO Blocks; Differences

An analogy with LEGO blocks works well as a means of making people understand that simple, re-useable parts make up the whole of the system. But after that, the analogy becomes misleading because it is communicating an image of the system as a physical or even structural entity.

The issue here is that the beneficiaries of the Active Agent are constructing a description of their personal processes not of what those processes accomplish. In other words, the Active Agent is not about helping you build a house, rather it is about helping you put together a construction company. If we were going to stay with the LEGO's analogy, we should talk about the re-usability of the idea that:

"I like to line up two blocks and push them together to get a single shape made up of the two."

This is not a trivial distinction. The core issue is that processes are more long lasting than the objects and structures that deploying those processes creates. Even more to the point "personal considerations" are primary and enterprise considerations define the set of constraints to meet.

The point of the concept as well as its value proposition (the answer to the question: why is not everyone doing this already) is in this distinction. People try to use physical objects to depict systems. This misleads the conversation because it introduces language that is not congruent with the subject. For example if we were to try to talk about theology using the language of finance we are likely to come up with a slightly different religion than would otherwise be the case (using language more suitable to the subject).

The core issue is in fact the choice for the linguistic considerations that is provided to the users when they use this approach to defining their information needs.

Definitions

A User is any individual who uses our service. We think that a user is a member of one or more "enterprises" which justifies their desire to use networked devices with the Internet as opposed to take a walk in the park or go to a movie.

An Enterprise is any formal collection of people who have something to do together. In our definition of an Enterprise, these people tend to create and access "information" in a formal manner (i.e. predictable, repeatable, with some objective in mind that reflects the common goal)

Internet Service is a service that is offered and delivered via Internet (or other linked environment). It may be any one of (and not limited to) an information content service (Wall Street Journal), an e-commerce service (the cheapest rate for flights to a particular city), or a link to an enterprise application (time and attendance or billing).

A Message is a string of characters with the appropriate structure that enables it to find its destination over the Internet. A message implies the existence of a protocol, an agreement on the syntax and semantics of a message.

How does the Active Agent Work

The Active Agent incorporates an agent that understands a few very simple concepts. These are:
   The user's role in the enterprise,
   The categories of services that the enterprise in general and this user in particular needs to deal with,
   The specific information in these services that this role and then this user cares about,
   The kind of messages that this role and this user responds to (a Role within the enterprise is a service).

Given these concepts, the User creates a program for their Agent by telling it the specifics of these general topics.

The statements for this program are generally in the form:

When I receive an "accept new client" message, create an information container and call it the same as the "name" of the client, as specified in the "client name" field of the client database whose ID field matches the ID that comes with the message.

In reality, once the user joins the service, presumable because they are joining an enterprise on-line, a general program for their agent is activated which they moodify to suit their specific need.

Over time, this agent is getting smarter and smarter about the user. The agent's view of the user is really about the mechanics of the information that the user handles. This is why we call the programs for the agent "the Information Model" for the user and the collection of these programs the Information Model for the enterprise.

What Happens when You Have an Information Model

Consider a situation where we have formal, accurate, and up to the moment information about the services that an individual has declared to need as a part of their everyday life for each of the enterprises to which they belong. Furthermore, consider that we are collecting daily statistics about the extent to which each aspect of these declared needs are being deployed, the quantities of information that are being exchanged, and the detailed cost of providing this information. Having the implicit (or explicit, as may be required by any applicable laws or regulations) consent of these individuals to help them with a more effective use of the network services gives the enterprise that offers this tool a significant advantage for managing its information resources.

The Key to Creating an Information Model

A key to creating an Information Model is the ability of the system to start with a simple model and to improve continuously, thereby reflecting the more sophisticated needs of the individual. If we try to create this model for the individuals, it will be very difficult to do. However, if we were to give the individuals a reason to offer this information about themselves, the model will improve itself.

As people delegate the mundane aspects of their daily work to their personal, Active Information Agent, these agents can provide a knowledge base of the economics of information management for each segment of the market. This information gives power to the members of this community because although their use of the information is individualized, at the level of using the mechanics of the Internet they represent a collective.

DESCRIPTION OF THE DRAWINGS

FIG. 20 is an illustration of an "edit view of associations within a role" interface element for an embodiment of the invention.

FIG. 27 is a general information flow diagram describing the operation of an information system for a Home Care embodiment in accordance with this invention.

FIG. 33 is a listing showing an example: directory structure for a Home Care embodiment in accordance with this invention.

DETAILED DESCRIPTION OF THE INVENTION

Figure 1:
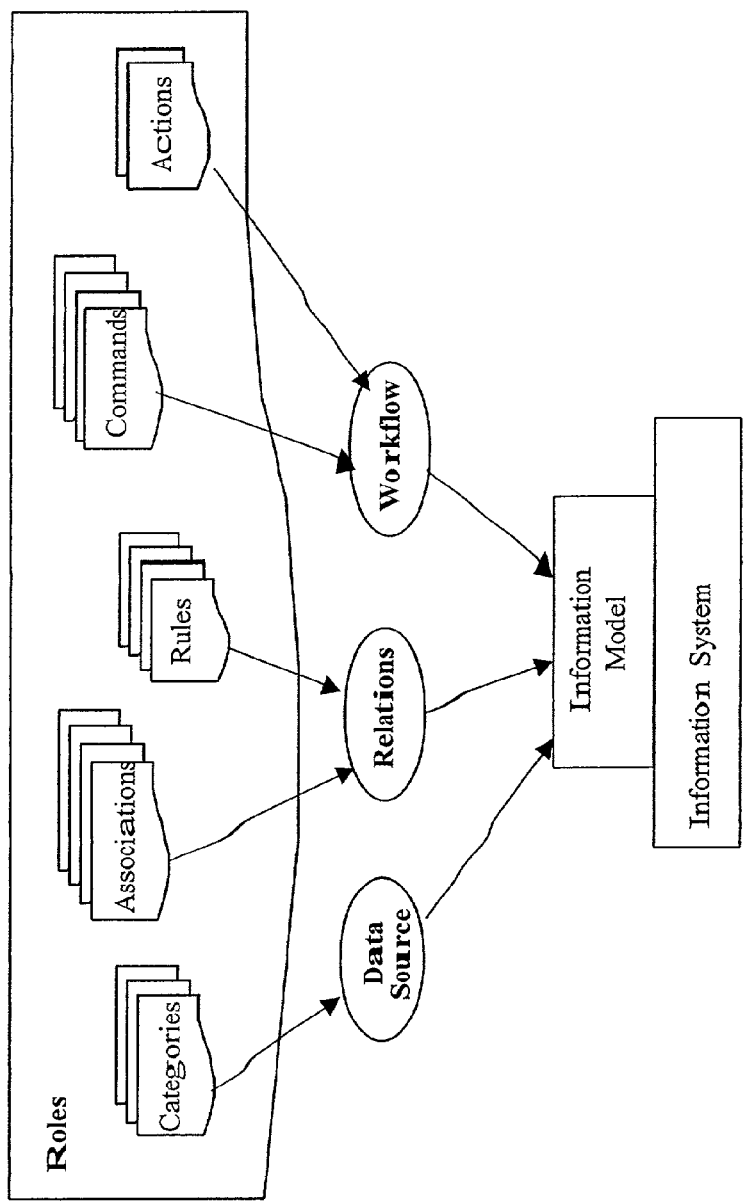
FIG. 1 is a schematic diagram of an active information model in accordance with this invention.

In the discussion which follows, we will assume familiarity with the concepts discussed in the "Summary" above. We will first discuss the invention in terms of its systems. Then, we will discuss the invention with reference to the attached figures. Those figures include an illustration of a particular embodiment of the invention in a regulated industry, but the invention is not so limited.

Active Information Model

To be a useful element of a company's management decision process, an information system must be easy to implement and adaptable to emerging technologies and changing business needs. Its successful implementation incorporates knowledge of the roles of the individuals and the workflow within the enterprise. Additionally, it is necessary to implement such an information system incrementally, allowing at all times for different parts of the enterprise to be at different levels of operational and technological maturity or obsolescence.

The four basic elements of the invention reflect these concepts in such a way as to facilitate a formal process for creation and maintenance of an Active Information Model. These elements are Roles, Data Sources, Relations, and Workflow.

The invention provides for definition and utilization of these elements, to the extent that is necessary to create and maintain an Active Information Model in an enterprise. The focus of the invention is on accuracy of this model and two essential qualities of the resulting information system i.e. serviceability and potential for change. Other essential qualities of the information system (such as performance, security, and availability) reflect the behavior of the implementation platforms.

The invention includes an apparatus for implementation and a method for specification of an Active Information Model. Although the principles of the invention are generally applicable, we have chosen to describe it in the context of organizations that operate within regulated industries. In doing so we feel that we have demonstrated the general nature of the device and method beyond current practices in design of information systems.

The basic theories of distributed systems incorporate four abstract operating perspectives. These are perspectives of Business Management, Application Developer, Service Provider and User. Although this model represents the users' perspective, it implicitly assumes that the information system belongs to one enterprise and the users' perspective is in the context of their relation to that enterprise. We feel, however that user centric information systems must reflect the dimensionalities of the users' universe beyond those mandated by their employers. By using the example of professional practitioners in regulated industries, we were able to include a quantifiable attribute of a professional's universe that transcends the consideration of a single enterprise.

Roles

The invention provides a mechanism to define a Role by specifying the activities in which an individual participates and the services that an individual requires within the context of the information system, in the course of fulfilling an assignment. For example, the following statement is a part of the definition of a the Role of an Intake Coordinator in a home care agency:

"To OPEN a Case, the Intake Coordinator copies the patient demographic information from patient database into the Intake Form and sends this form to the RN."

This statement identifies the following elements of the Active Information Model:

TABLE

Elements of the Intake Coordinator Role in a home care agency.

| | |
|---|---|
| Data sources | Patient Database and Intake Form |
| Reference model | the collection of the data fields that describe Patient Demographic information and their relationship to the fields in the Intake Form |
| Commands | SELECT information defined by patient demographic and INSERT this information into the appropriate fields in intake form |
| Action | OPEN a Case |

By defining a Role in this way, the external sources (to the Information system) where information is created or used are identified. In abstract, a Role may be described as "external interfaces of the information system". FIG. 1 shows a practical view of a Role, as a particular aggregation of the internal elements of the information system.

Data Sources

Data source is an abstract concept that encapsulates the origin and destinations of the information. We have used the generic term "data source", in recognition of Microsoft's ODBC and OLEDB initiatives, which are significant contributors to the computer industry's ability to share information between disparate systems. Our use of this term, however, is broader than Microsoft's. We look at data sources as elements of the entire enterprise rather than a component of the computing environment within the enterprise.

A data source, as a fundamental element of an Active Information Model refers to any component of the overall organization where information is stored and is made available according to a well-defined set of rules.

Practically, for the purposes of the invention, we define a data source as any data storage mechanism within the information system for which a formal interface definition is available. This includes databases and application specific file formats and other Engines.

Categories

A Category identifies reference to a data source within a Role. Categories describe data sources (logical reference), how to access them (access parameters), and the treatment of the information. For example, a Category may be a database located at a specific location on a network where the actual data resides. Another Category may be a reference schema that describes the way data is organized or a facade, which is a description of the presentation of data.

Relations

Relations are formal, abstract attributes of an Active Information Model that characterize the relationship between the elements of data sources. The prototype implementation of the Invention includes two classes of Relations, namely Associations and Rules.

Consider the Statement:

Patient Name on HCFA 485 form includes Last name, First name and Middle initial from the patient record. HCFA requires that Patient Name be specified as Last name, First name middle initial This statement describes the Relation between the element Patient Name in data source HCFA 485 form and the elements First name, Middle initial, and Last name in the data source patient record.

Associations

An Association is a declaration that a relationship exists between two or more elements of different data sources. In the above example the following Associations exist:

TABLE

| Example of Associations | |
|---|---|
| HCFA 485 form | Patient record |
| Patient Name | First name |
| Patient Name | Middle initial |
| Patient Name | Last name |

Associations do not imply sequence or cardinality. From the point of view of information system design, an Association is an abstract condition that must be satisfied in order for the Active Information Model to achieve steady state. The sequence of operations that lead to steady state may be implicit:

{Data source 1: element 1==Data source 2: element 5}

Or they may be described in terms of a Rule.

Rules

Rules are the mechanisms that embody an Association. In the above example the Rule relating to the Association is:

Name<=Last_name<,>First_name<sp>Middle_initial).

In general, Rules are attributes of Relations and independent of Associations. At the simplest level, this independence may be perceived as a means to re-use a definition of a Rule in the context of multiple Association. Although this is an appropriate example of the relationship between Rules and Associations it does not completely capture the scope of this concept. For example, the Invention allows for implementation of a time-variant, parametrically defined Rule that generates independent events based on changes in values of elements within multiple data sources.

Workflow

The Workflow Management Coalition (WFMC) defines Workflow as: "The computerized facilitation or automation of a business process, in whole or part". In the context of the Invention, Workflow refers to attributes of an Active Information Model that are concerned with movement of information between different data sources. Largely, Workflow is the element of the Invention that creates a unique instance of the Active Agent Engine, specific to the activities of an individual User. The prototype implementation of the Invention includes two classes of Workflow elements, namely Commands and Actions. As a general rule, Workflow elements tend to serve as a "verb" in a sentence where Categories serve as nouns.

Commands

Commands are the lowest level operators for moving data from one data source to another. The most common examples of Commands in an Information System are select and insert (similar to put and get as used in network protocols). As a rule, Commands require parameters that qualify their targets. In the above example a Command:

select First_name, Middle_initial_Last_name
        from patient_record
        where Patinet_ID=this_patinet
    identifies a source of information and the criteria for retrieving this information, and the Command
    insert patinet_name into HCFA 485 form
    identifies the logical destination of information in the context of the Role that is executing this Command. Notice that the identifiers for the elements in each case reflect the definitions within the target Category. Specifically, the definition of a Command is not instructions to the Information System for movement of data, rather the execution of a Command starts the chain of activities that ultimately resolve the conditions set forth in the related Associations.

Actions

Actions are aggregations of Commands that are visible to the run time interfaces of the Engine. In general, Actions activate the portions of the information system that are specific to an individual user. Actions are high level events and include global parameters that specify the criteria for access to the data sources and the context within which information is modified. For example, consider the Action Admit in the statement:

Nurse_Pat Admit Sick_Jack

This statement signifies that the Role Nurse_Pat includes a declaration for the Action Admit. It further signifies that the associated Commands used by this Action will use Sick_Jack to access the relevant data sources (in this case, a patient database).

It is important to recognize that the attributes of the Role Nurse_Pat govern the details needed for executing the task. From this perspective, the Action Admit is one such attribute.

Implementation of the Active Agent Engine

The Active Agent engine is an Active component, a program, which moves information between various data sources within a network of digital computers. A "data source" can be any collection of data for which a provider can be created. Examples of data sources are tab separated text files, spreadsheets, named fields in a form, or a table in a relational database. Active Agent engines are capable of communicating information in form of data and events i.e. an Active Agent engine can see data sources through other Active Agent engines and can send and receive events.

The Active Agent engine may be used in conjunction with a single utility that simplifies access to various data sources for a single user or device. An example of this kind of utility is one that creates a data source from multiple sources such as various databases, and stored documents within an enterprise information system. Another example may be a protocol converter for a device within a Health Information Management System.

A logical network of Active Agent engines may be used in a network of computers for the purpose of facilitating workflow. Under this scenario, the Active Agent engines act as the users' agents to communicate events to other application programs and move documents or other information containers according to the workflow specifications. Examples of this application are a find-me service, a document review and audit process, or e-mail forwarding and filtering mechanism.

The Active Agent engine also has the capability of moving elements of data sources. This capability is useful in situations where groups of users need access to different elements of a single body of information. An example of such an application is a long-term Care environment where various healthcare professionals communicate with each other through sending and receiving information that is associated with standard forms. In many of these situations, the access protocol follows a predetermined workflow that is specified by the professional community or a regulatory agency.

Each instance of the Active Agent engine uses a configuration model (for example a role configuration file) that specifies its associated data sources, Actions, Associations and Rules.

Using the Active Agent engine a user with access to a network of computers through a workstation, an Internet Appliance, a hand held wireless device, or a telephone or any other suitable device can input, export and review information from different databases or documents. The user interface may be a browser, desktop applications, Word processor, spreadsheet program, personal information management application (such as e-mail or contact managers) as well as many commercially available special purpose device drivers such as text to voice converters.

Integration Levels

The Active Agent engine provides the ability to associate or map together various data sources, apply Rules to the Associations and move information between data sources programmatically. The engine exposes this functionality to end users and enterprise system builders through interfaces that allow run time and design time reconfiguration. The interfaces address the needs of several levels of integration:

TABLE

Integration Levels

| Interface | Accepts changes | User | IT Programmer | Value added reseller | Active Agent developer |
|---|---|---|---|---|---|
| Execute Interface | Run time | X | X | X | X |
| Data source Provider Interface | Design time | | X | X | X |
| Configuration Interface | Run time | X | X | X | X |
| Data source Consumer Interface | Design time | | | X | X |
| Persistent Layer Interface | Built time | | | | X |

Active Agent Engine Interfaces

Provider Interface

The Provider Interface allows the user to connect to the Active Agent Engine as a data source. The schema exposed is determined by the configuration of the Active Information Model as specified by the configuration of the chain of Active Agent engines between the interface and the data source. This interface supports two features in the design of the Active Information Model. First, it allows the end user to access any Active Agent data source through standard database tools. In addition, an Active Agent engine can treat another Active Agent engine as a data source.

Consumer Interface

The Consumer Interface provides for the connectivity to all external data sources. The Active Agent supports a single connection method and relies on Provider utilities to convert data sources to this connection method. The use of Provider utilities minimizes the dependency of the Active Information Model on the specific characteristics of any data source. However, it is prudent to use a commonly used data source interface as the consumer interface for the Active Agent. For example, the Consumer Interface for the prototype implementation of the Active Agent engine used OLEDB® as specified by Microsoft Corporation.

Configuration Interface

The Configuration Interface exposes the programming model that allows the definition of a Role and its external behavior within the Active Information Model. In principle, this interface can be exposed for run-time modification. However, the Workflow Reference Model as specified by the Workflow Management Coalition (WFMC) specifies a distinction between run time and design time operation of a workflow engine. Different implementations of the Active Agent engine may choose to expose this interface through controlled utilities in order to adhere to the WFMC reference model.

Persistent Layer Interface

The Persistent Layer Interface supports different methods of storage of the Active Information Model. For example, the prototype implementation of the Active Agent engine used a binary file to store Role definition records within the Active Information Model.

Execute Interface

The purpose of the Execute Interface is to provide a simple interface from which to cause Actions to start within the Active Agent Engine. This interface has one method, which starts an Action, and one event, which notifies the consumer's code that the action has been executed.

Creating an Active Information Model

An Active Information model is a process. During this process the organization creates and continues to improve a formal and accurate description of who creates and uses the information, how they create and use this information, and in what forms. Ultimately an Active Information Model is a tool that will help with the process of improving the management of information within an organization. As a tool of process improvement, the Invention offers three essential concepts that are somewhat independent and at the same time collectively provide a complete definition. This section describes these concepts.

Roles: The complete definition of the creators and users of information

Categories: Data sources, schema presentation formats of data containers.

Actions: Events that govern transmission of Messages between Roles

An additional concept that is a part of the invention is the concept of Messages, as used commonly in distributed systems to signify a formal mechanism for transporting information.

These concepts are "abstractions" in the sense that each of them is a convenient aggregation of ideas and practices that satisfy the needs of a particular view within the enterprise.

Roles

One of the most basic concepts in the Invention is the concept of a Role. A Role is a description of a collection of assignments, usually associated with an individual or group with a specific set of credentials. The following Table is an overview of the relationship between a Role and the flow of information.

| Abstraction | Described in terms of . . . |
|---|---|
| Role | Qualifications of the individuals e.g. Registered Nurse, Certified Records Administrator, Bookkeeper. |
| Assignments | Objectives described qualitatively e.g. Admit a patient, Maintain patient records, manage accounts payable. |
| Tasks | Measurable goals e.g. complete intake form, perform initial case assessment, issue an invoice. |

To satisfy the needs of creating and maintaining an Active Information Model in an organization that is a part of a regulated industry, it is sufficient to describe clearly the Roles within the organization. In fact, deeper abstractions will create an obstacle to exploring alternative approaches within the overall objective of improving information management processes within the organization. This is in contrast, for example, to the process of developing an application for a functional element of an organization (such as an accounting application) where it is necessary to categorize the tools that are needed in performing each task.

Within an organization that is a part of a regulated industry, it is the qualification of an individual practitioner, not the business needs of an enterprise, that determines the assignments that they can accept and the information that they need or create in order to meet the objectives of those assignments.

Categories

Within the organization, however, different Roles can collaborate because they share perspectives on information. A perspective is an agreement on how to view information. A category is an abstraction that identifies a "view" of the information that may be useful to a group of perspectives.

Using this framework, the following concepts are of interest in defining Categories.

Data repositories

Data repositories as viewed through Roles

Reference categories

Facades

The first two concepts are concerned with the sources of information whereas the last two deal with creation and maintenance of the Active Information Model itself. A good general rule in design of an Active Information Model is that reference categories are inventions that facilitate dealing with data repositories and facades are inventions that facilitate dealing with Roles.

Data Repositories

For the purposes of Information Modeling any persistent medium that may contain information is a data repository. For practical purposes the information flow in and out of a given data repository is subject to its specific characteristic. For example in the context of an automated document management system, a hand written document that will be stored as a part of patient's medical record is a valid data repository with somewhat complex interface rules. For the purposes of Active Information Models related to the use of the Invention, machine accessible data repositories are the primary consideration.

Repositories Viewed through Roles

For all purposes, Roles appear as sources of information to other Roles. In practice, however, it is the view of information from within a Role that is of interest to other Roles.

Figure 5:
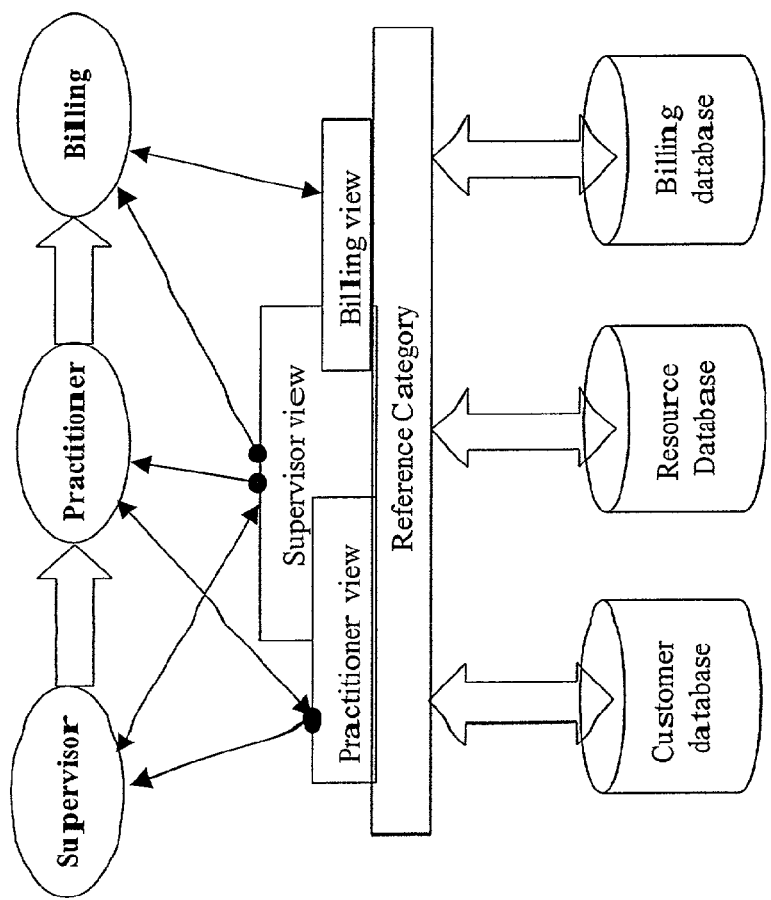
FIG. 5 is a schematic diagram showing the "reference category" feature of this invention.

For example in FIG. 5 the Supervisor can see Report form through the Role Practitioner. Here, Practitioner is providing a data source to the Supervisor. In practice, this concept is best implemented through the use of Facades, which makes it possible to manage access to data sources.

Reference Categories

Two significant problems in Information Modeling are initial creation and maintenance of the model. The reference category is a useful invention to help with this problem. Typically, a group of Roles within an organization contributes to accomplishing a particular objective. For example in a home care agency the Intake Coordinator opens a case and assigns it to a registered nurse who will then make an assessment and create the care program. During the period that the case is open, various professionals will access and input information related to it.

The Active Information Model is based on information that is used or created by each Role within the organization. The Reference Category provides a mechanism to aggregate the information that is used by a group of professionals in the course of completing an assignment under a single category. This mechanism allows a particular data repository to be redefined without effecting the rest of the Active Information Model.

Facades

Facades support a localized view of information. They provide a mechanism whereby a Role can declare its own view of a data source as a Category. For example, the Customer Service Role uses "Repair History" as a Data Source to be populated when a service request is issued. "Repair man" and "Parts Clerk" are two Roles that use "Work Order" and "Parts List" forms, respectively. It is likely that these forms will be modified from time to time based on considerations specific to those Roles. Each forms is presented to the Customer Service Role as a facade, which in turn declares its interest in information that is contained in this form as another facade, "Warranty Service Request", to the supervisor Role. A service request issued from the supervisor Role can populate appropriate fields in these forms automatically even though the actual structure of these forms is only determined locally Actions Actions are encapsulations of formal events that govern transmission of information between roles. In practice, Actions reflect organizational functions or individual assignments. The Active Agent exposes Actions as the external active interfaces to a Role. Within a Role, an Action defines a unique sequence of Commands, the atomic level operators that describe the movement of data between data sources.

Preferred Embodiment of the Active Agent

The Active Agent is an element of distributed application architecture and includes modular components that support workflow management, data mapping, and application linking. These components implement an information management system that is effective in a single workstation or a network of computers in a client-server model such as World Wide Web or an enterprise Intranet system.

An information system can use the Active Agent in a number of ways and embodiments in addition to those discussed above, including methods and systems that are integrated into a single device/method or in modules. The following is a brief description of the preferred embodiment of the invention.

Active Agent Servlet

The Active Agent servlet is a web server component that can turn a web site into an element of an enterprise information system. The servlet is responsive to commands that it receives form a web client or another site. It can connect to data sources on the World Wide Web on behalf of the user and it can prepare information according to a predefined format. The Active Agent servlet is a tool for personalizing information portals.

Active Agent Client

The Active Agent Client is an office automation tool that enables standard office utilities to be used in conjunction with a business's processes to transform any workstation or group of workstations into a scalable information management system.

Active Agent Administrator Utility

The Active Agent Administrator Utility is a program for the information manager installed in each system or database administrator's workstation or a web server. This utility provides the mechanism for the creation and modification of the harmonization Rules used by the Active Agent engine or servlet.

Connectivity Modules (data source providers)

Connectivity modules perform the appropriate data translation and message transformations to and from each data source.

System Designer Workbench

System Designer Workbench is a simple tool that enables application developers to describe their requirements from a pre selected set of application services and the System Designer Workbench software will select the appropriate components. System Designer Workbench components will include a database that maintains the customer's configuration and a prototyping tool used to explore alternative configurations. This capability will support the following features:

Component selection and purchasing

Remote configuration management

On-line IT management

Active Agent Build Environment

The inventors have successfully developed a prototype embodiment of the system of this invention, using the following build and test environment.

WinNT 4.0 with SP 4

Visual C++6.0 with SP3

ATL 3.0

MFC 4.2

Visual Basic 6.0 SP3

MDAC 2.1 SP1

Installshield For Visual C++6.0

Test Environments

Win98

Install MDAC 2.1 SP1

Win95

Latest SP

Install DCOM

Install MDAC 2.1 SP1

WinNT

Install MDAC 2.1 SP1

Install SP4

Now that the invention has been described, we will further explain the invention with reference to the attached figures.

Figure 6:
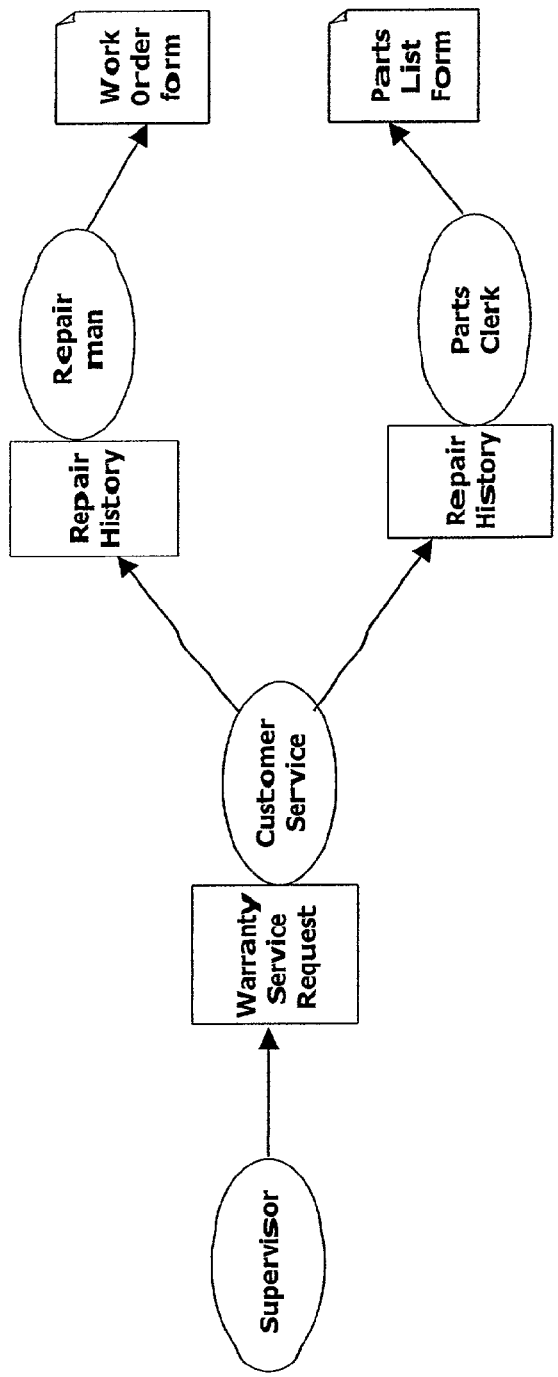
FIG. 6 is a schematic diagram showing the "facades" feature of this invention.

For ease of understanding, the figures may be grouped as follows (Groups A through G):

A. General Concepts
   FIG. 1 Active Information model
   FIG. 2. Defining a Role
   FIG. 3. Perspectives and Views of Information
   FIG. 4. Data Sources viewed through roles
   FIG. 5 Reference category
   FIG. 6. Facades
B. Creation of Active Information Model
   FIG. 7. Beginnings of an Information Model
   FIG. 8. Access to Information is an attribute of Roles
   FIG. 9 Users are autonomous members of the community
C. Active Agent Engine
   FIG. 10. Active Agent Engine functions
   FIG. 11. Active Agent Engine Integration levels
D. Personal Information Portal
   FIG. 12. Implementing Personal Information Portals
   FIG. 13. Using a Personal Information Portal
   FIG. 14. Example: Personal Information Portal in Home Healthcare
E. Initial Embodiment of the Active Agent Engine
   FIG. 15. About box for the Active Agent Admin utility
   FIG. 16. Event Logging option
   FIG. 17. Navigation view
   FIG. 18. Edit view of a Role
   FIG. 19. Edit view of a Category within a Role
   FIG. 20. Edit View of Associations within a Role
   FIG. 21. Edit View of Rules within a Role
   FIG. 22. Edit view of Commands within a Role
   FIG. 23. Edit view of Actions within a Role
F. Pilot Application
   FIG. 24 Example: Organizational view of an Information system for HomeCare
   FIG. 25. Example: Decision support model reflecting technology considerations
   FIG. 27 Example: General Information flow
   Table 27-1. Example: Summary of forms identified in FIG. 27
   FIG. 28. Example: A Measurable Subset of the Organization
   Table 28-1 Example: Attributes of the Measurable Subset
   FIG. 29. Example: QA function explicitly identified
   FIG. 30. Example: Using generic Roles and proxy Roles
   FIG. 31. Example: Implementation of SN OPEN
G. Pilot Implementation
   FIG. 32. Example: Practical deployment
   FIG. 33. Example: Directory Srtucture
   FIG. 34. Example: Role Configuration models for the local Network
   FIG. 35. Example: Role Configuration model for Certified Coordinator
   FIG. 36. Example: Role Configuration Model for mobile caregiver
   FIG. 37. Example: Role Configuration Model for Skilled Nurse (Generic)
   FIG. 38. Example: Proxy model for a mobile RN role The figures will now be discussed, in turn.
   FIG. 1 Active Information Model
   An Active Information Model is an abstract view into an information system that reflects the operational practices of the individuals who participate in that Information System (users). An Active Information Model is characterized by a single abstract concept, a Role, which represents the interest of an individual user in the information system.

Role: A Role corresponds to a position in the organization characterized by the qualification of the individual who represents a functional element of the organization e.g. Registered Nurse, Certified Records Administrator, Truck Driver, Test Technician. Functions that are performed by a Role are described as assignments and tasks. Assignments are qualitative statement of objectives e.g. Admit a patient, Maintain patient records. Tasks are measurable goals e.g. complete intake form, perform initial case assessment.

From the perspective of the Active Agent implementation a Role is a conduit for aspects of the user's responsibilities within the organization that influence the behavior of the Information System.

The scope of influence of a Role is characterized by three additional abstract components. These abstract components are Data Sources, Relations, and Workflow.

Data Sources represent the persistent component of information within an Information System. A Data Source within a Role is represented as a Category.

Category: Contains the description of the data source schema (data model). In general a category represents an actual source of data i.e. a service that delivers specific information in a predetermined form. Additionally, there are two categories that serve to represent the appearance of a Role to other Roles:

Facade: A category that does not have a data source. A Facade provides an abstract schema (view) of the Role.

Reference Model: A category that does not have a data source. It represents the core information model for the Role. The core "Reference Model" would usually consist of rules, associations, messages and actions.

The atomic component of a Data Source is an Element

Elements: Descriptions of the components within a category. For example a fields within a table in a database.

Relations represent a formal definition of the value that a Role may place on Elements or groups of Elements. This formal definition is reflected within a Role as Associations and Rules.

Association: Associations define a relationship between two or more Elements. Associations are normally made between Elements that match in type and format. When Elements need to be associated that do not match then Rules are applied to the Association.

Rule: Provide the ability to merge, convert or modify Elements in a predetermined fashion. In practice, Rules are scripts with a list of parameters that map to Associations. Rules govern Associations but are independent from Associations thus allowing one rule to be applied to many Associations Workflow represents the operational protocol of behavior within the organization and the trigger events for movement of information within the Information System. Within a Role, Commands and Actions represent a Workflow.

Command: (e.g. apply a query to a data source). The command object has two modes, Execute and Design. The Design mode provides the functionality to build a command against a category, for example to get data from or insert data into a database. The Execute mode is applicable only to an instance of a command within a Role.

Actions: Are aggregations of Commands for a Role and are externally visible. An Action is the mechanism through which a Role can request a task to be performed by another Role.

Figure 2:
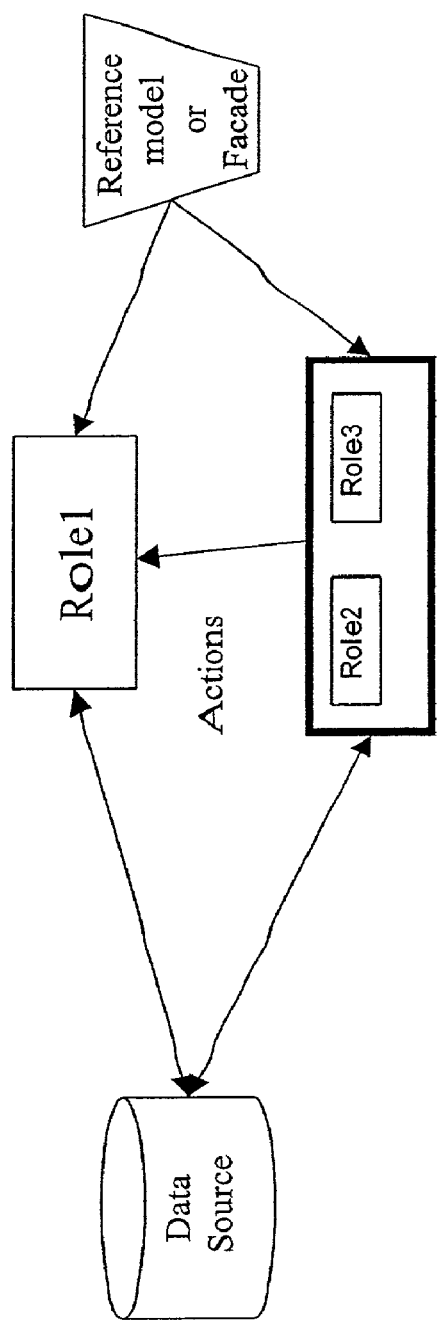
FIG. 2 is a schematic diagram showing a "defining a role" feature of this invention.

FIG. 2. Defining a Role

A Role is characterized in terms of its relationship to certain other information elements of the Information Model specifically other Roles and Categories (data sources).

The relationship of a Role to data sources is essentially a declaration that the Role has an interest in certain specific elements of those data sources. This declaration may be shared with other Roles as a Facade or as a Reference model.

Actions are a declaration of the functions that a Role intends to perform within the Information System, reflecting the functions that the user performs within the enterprise.

The declarations regarding Actions, Facades and the Reference Model are the core support structure for the collaborative relationships between the Roles.

Figure 3:
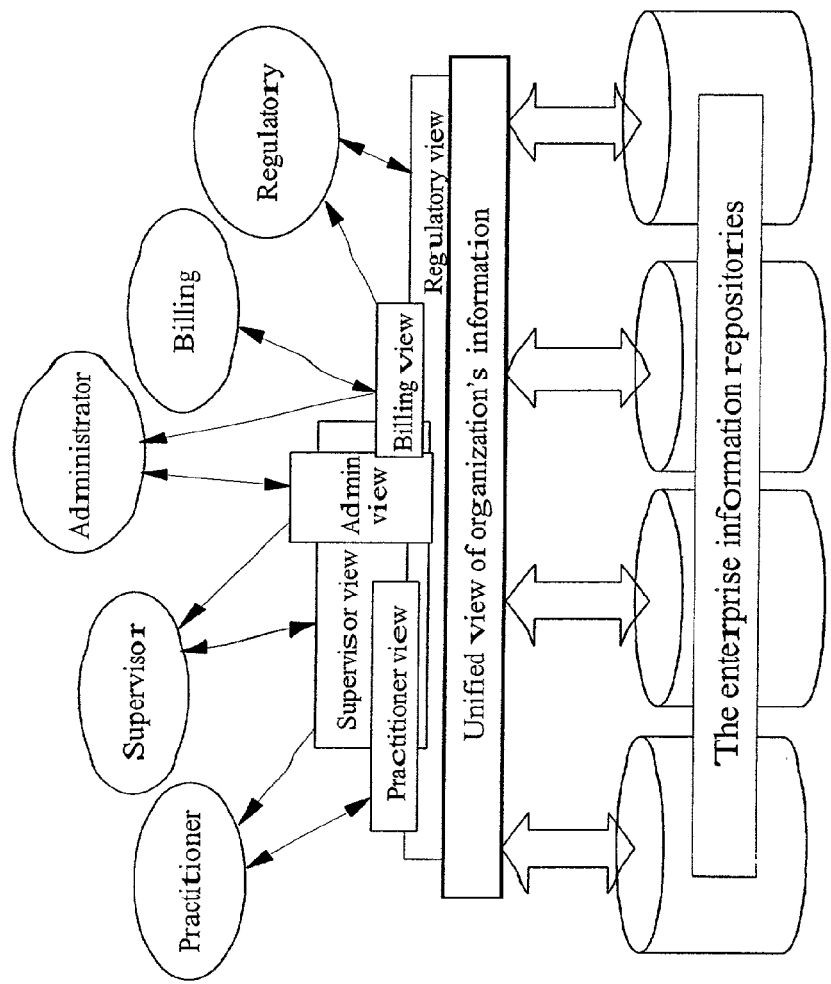
FIG. 3 is a schematic diagram showing a "perspectives and views of information" feature of this invention.

FIG. 3. Perspectives and Views of Information

By declaring the nature of its interest in the elements of the Information Model, a Role specifies its perspective on the enterprise information system. Taken together, the aggregation of all the relationship of all Roles in an organization constitutes a unified view of the organization's information. In a non-user centric system, this aggregation is essentially useless since it is virtually guaranteed to be redundant and quite possibly contains conflicting and incomplete logic.

In a user centric system, however, these declarations are localized in the sense that they are only evaluated in the context of specific Actions, which are the formal abstractions of the tasks that each Role performs within the enterprise.

Figure 4:
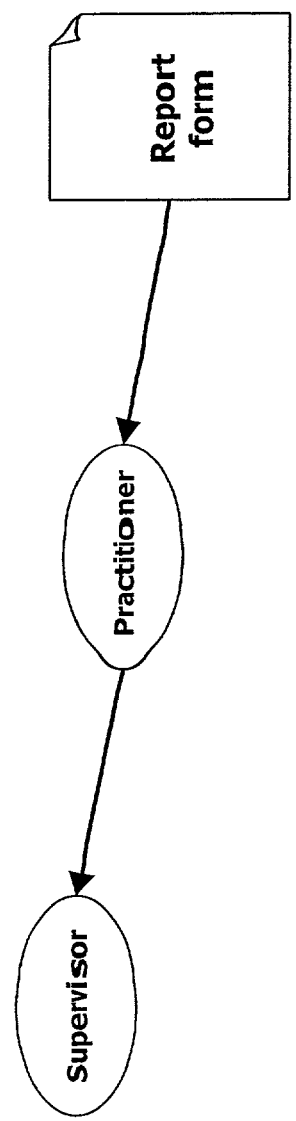
FIG. 4 is a schematic diagram showing the "data sources viewed through roles" feature of this invention.

FIG. 4. Data Sources Viewed through Roles

A fundamental attribute of a user centric system is the ability of a user to select the view of information that is appropriate in the context of performing a task. It is appropriate to assume that these views will change as a result of a variety of parameters such as the communication devices that the user may employ.

At the same time, various views of information that are provided to other Roles represent departmental or organizational policies. The system must provide for a mechanism that enables changes in these policies to occur at a different rate than the changes in user's environment. This mechanism is supported through creation of Reference Categories and facades.

FIG. 5 Reference Category

A Reference Category reflects departmental agreements. For example within the context of certain specific tasks the supervisor, the practitioner and the billing clerk can adopt a single view of a customer service voucher. This agreement creates a unified view of the organization's information resources and each Role can use this unified view as the definition of the relevant information for that specific task (a Category).

FIG. 6. Facades

A more localized view of information is supported through the use of facades. Facades provide a mechanism whereby a Role can declare its own view of a data source as a Category. For example the Customer Service Role uses "Repair History" as a Data Source to be populated when a service request is issued. "Repair man" and "Parts Clerk" are two Roles that use "Work Order" and "Parts List" forms, respectively. It is likely that these forms will be modified from time to time based on considerations specific to those Roles. Each form is presented to the Customer Service Role as a facade, who in turn declares its interest in information that is contained in these form as another facade, "Warranty Service Request", to the supervisor Role. A service request issued from the supervisor Role can populate appropriate fields in these forms automatically even though the actual structure of these forms is only determined locally.

Figure 7:
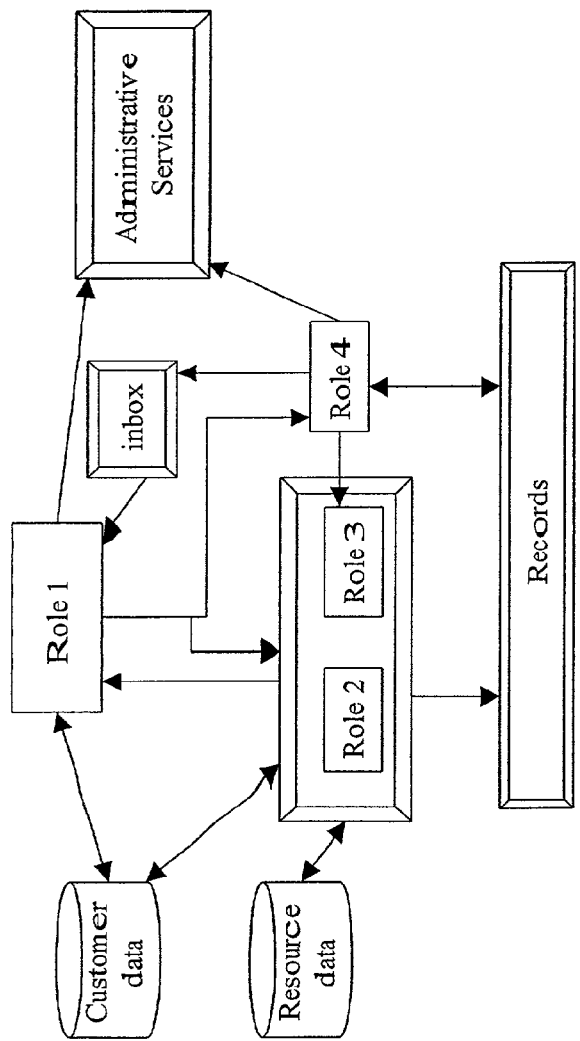
FIG. 7 is a schematic diagram showing the beginnings of an information model in accordance with this invention.

FIG. 7. Beginnings of an Information Model

An Information Model is a simple network of Roles and data sources reflecting the corresponding organizational structure. The formal model is a declaration of these elements and their relations.

A relationship between two Roles is declared in terms of Actions. (Shown as one way arrows in FIG. 7). The model assumes access to data sources (two way arrows in FIG. 7) as a consequence of the declarations within a Role, consequently Actions are the only substantive content of the communication between Roles.

From the perspective of a given Role, certain other Roles may be grouped together representing the organization's view of a department. Using the concepts of Reference Categories, Actions, and Facades, this aggregation can be treated as a Role, performing a service (Records, Administrative Services and Inbox in FIG. 7).

The aggregation of Roles may only be appropriate in a limited context. For example Roles 2 and 3 can appear as a single department to Role 1, but Role 4 can have an exclusive relationship with Role 3.

Figure 8:
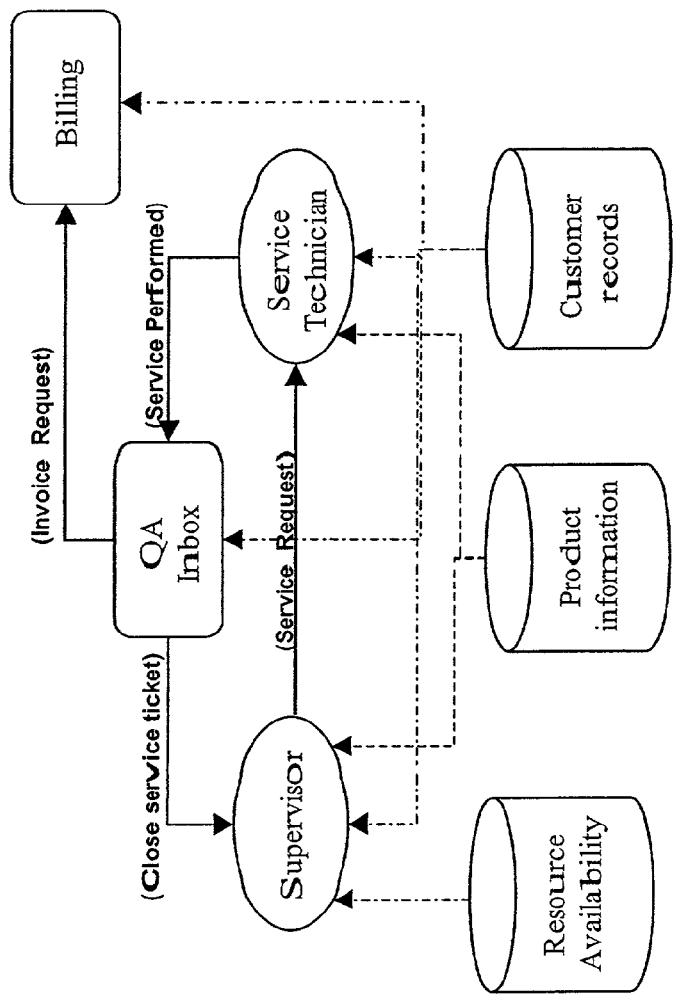
FIG. 8 is a schematic diagram illustrating how "access to information is an attribute of roles" in accordance with this invention.

FIG. 8. Access to Information is an Attribute of Roles

The relevance of the Information Model to the practical operation of the enterprise is maintained by protecting the autonomy of the individual users in a distributed information system architecture. Within this architecture a message is a request for a service to be performed by a Role including the "context" of the service, (the data) rather than the presentation of that data.

In the example of FIG. 8 the Role "Supervisor" issues a (Service Request) to be performed by the Role "Service Technician". The Service Technician performs this task and issues a (Service Performed) to the Role "QA Inbox" (represented here as an aggregation or a department) presumably to close the service request. QA Inbox verifies the completion of the task and issues (Invoice Request) to "Billing" and a (Close Service Ticket) request to Supervisor.

In practice, when the individual human being who is represented in the Information Model by the Role "Supervisor", issues a (Service Request), he or she is filling out a form using the information that is relevant to authorizing the service and assigning the appropriate individual to perform it. This information may include product warranty records and information about a service individual who is available and qualified to perform the required task. The "Service Technician" will receive a message that includes substantively the need for this service to be performed and the relevant information which may include product history and customer's home address where the service is to be performed.

Figure 9:
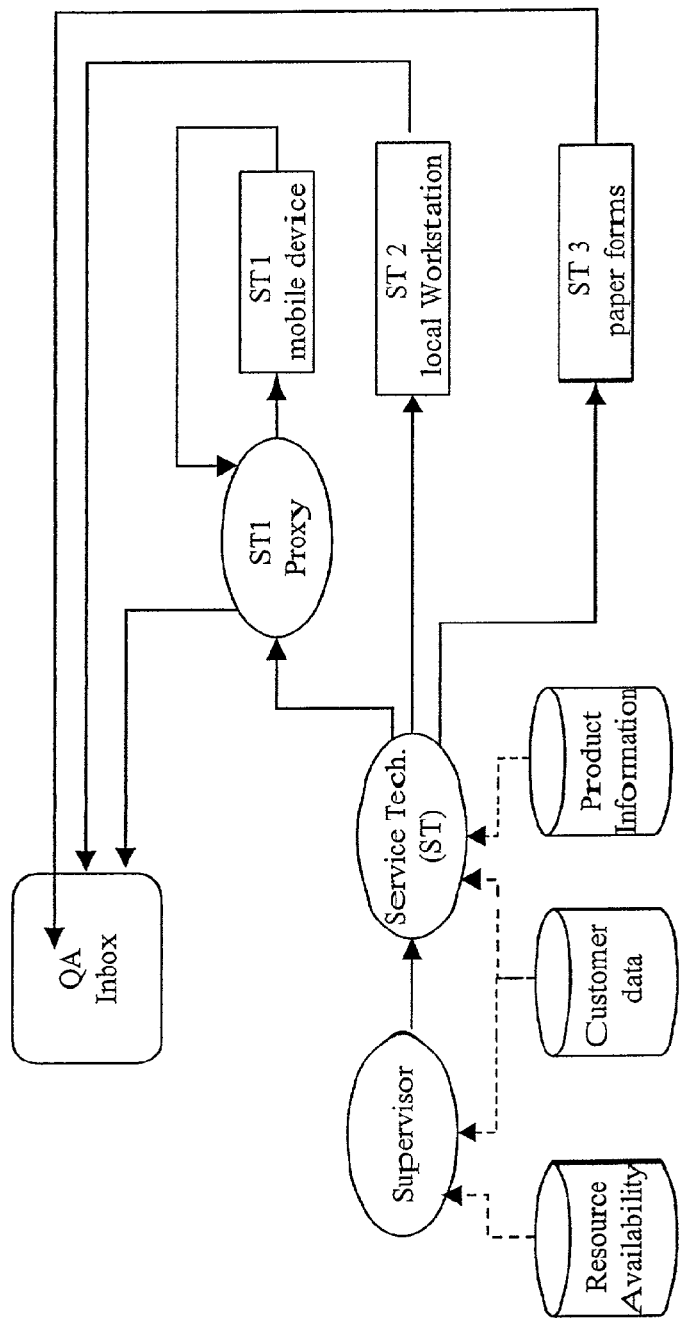
FIG. 9 is a schematic illustrating how "users are autonomous members of the community" in accordance with this invention.

FIG. 9 Users are Autonomous Members of the Community

Furthermore, the presentation of this information to the individual Service Technician depends on the communication device that is available to that technician. FIG. 9 demonstrates an information model that supports three different modes of communications for a single generic Role of Service Tech. Notice that the Supervisor does not have to be concerned with the difference in the communication media because the generic Role Service Tech provides a uniform view of these resources.

In certain cases the user's connection to the information system requires inclusion of a Proxy Role. For example ST1 mobile device is not directly connected to the information system and ST1 Proxy Role serves as an agent for ST1 in the Information Model.

Figure 10:
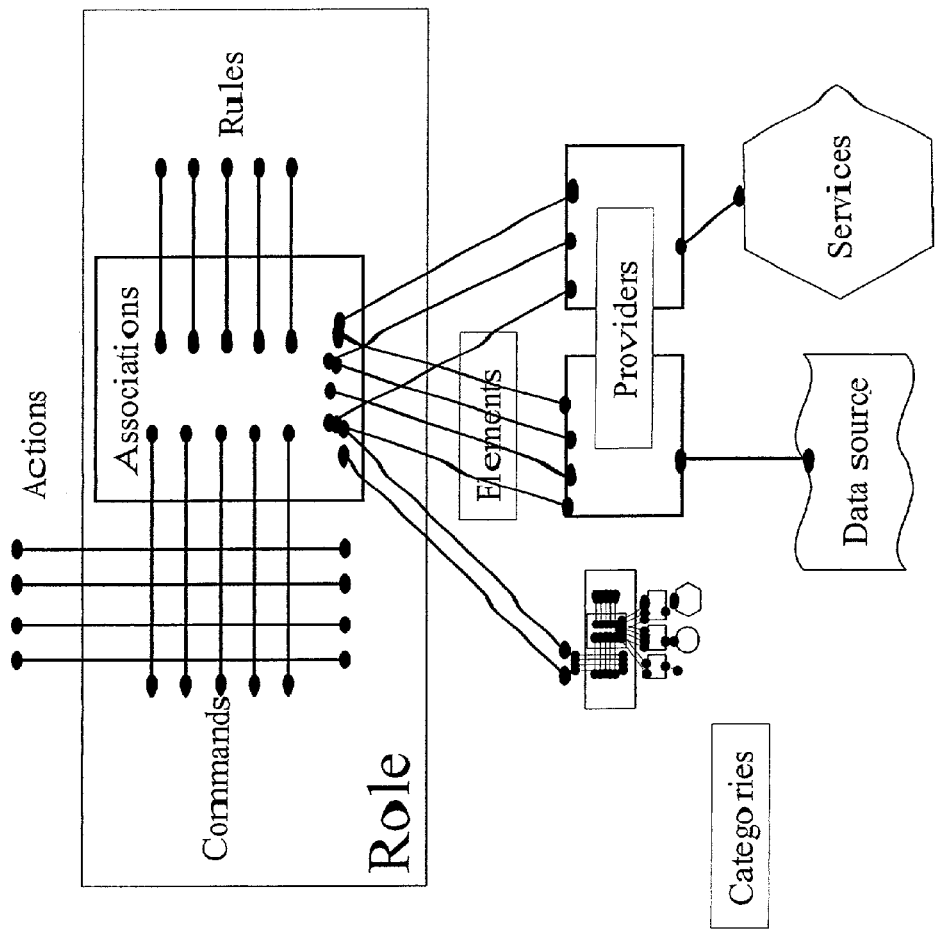
FIG. 10 is a schematic diagram illustrating how the Active Agent Engine functions in accordance with this invention.

FIG. 10 Active Agent Engine Functions

The Active Agent is implemented as a software engine, a stand-alone executable element, within a distributed, networked computing environment. Each instance of the Active Agent engine represents a single Role within the information system. The definition of a Role, the Role Configuration, that is the program that controls the behavior of the Active Agent instance that represents that Role is stored in a database as a record or in a file system as a binary file.

The Role Configuration identifies Actions and the Commands that make up those actions, Categories, the relevant elements of each category, the associations between those elements, and rules that govern those associations.

Categories that are visible to a Role may be a data source, an external service or another instance of an Active Agent engine (another Role). Each Category is made available to an Active Agent instance through a Provider mechanism, which normalizes its unique information access protocol for the Active Agent engine.

Figure 11:
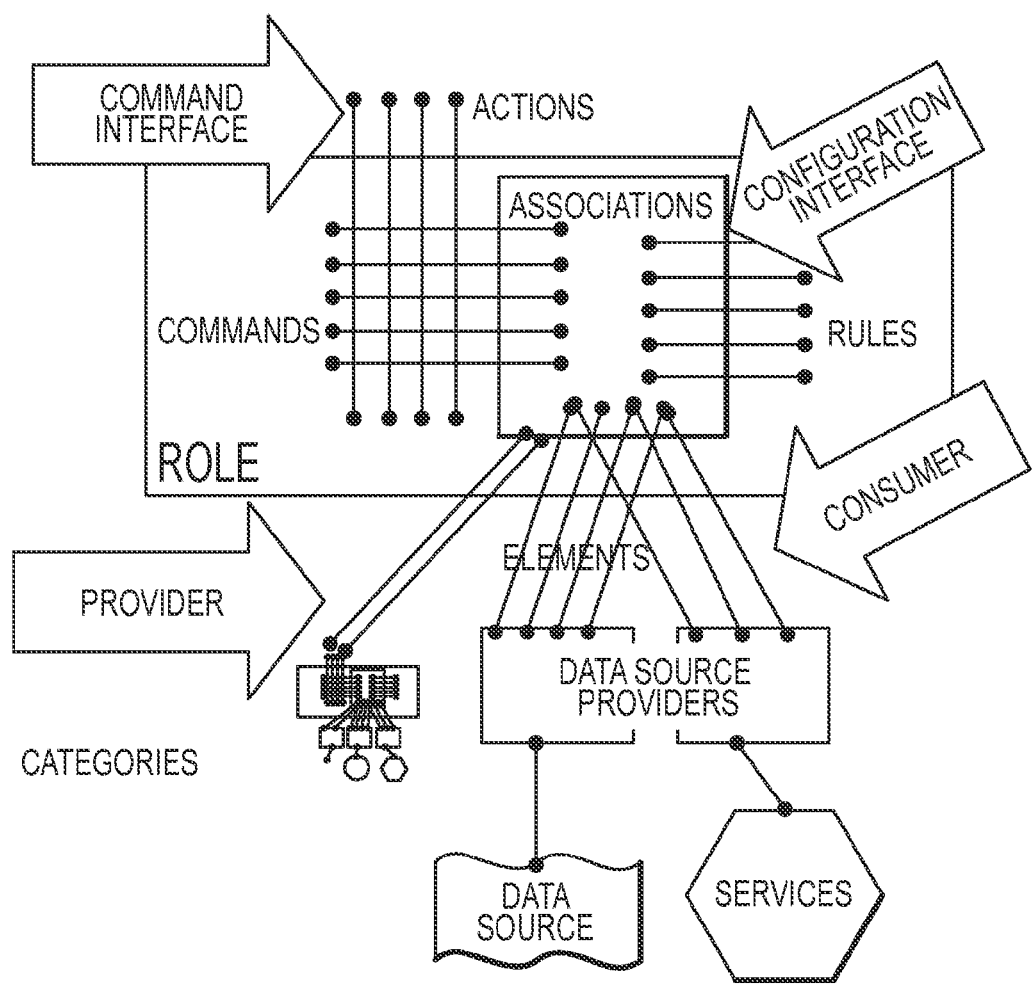
FIG. 11 is a schematic diagram illustrating the Active Agent Engine Integration levels in accordance with this invention.

FIG. 11. Active Agent Engine Integration Levels

In practice the Active Agent engine presents four external interfaces. The Command Interface exposes Actions and is seen by other Active Agent instances. The Consumer Interface exposes the data source Categories, the Provider interface presents a view through other Active Agent engines. The Configuration Interface provides access to the Role Configuration for each instance of an Active Agent (each Role) and can be used to reconfigure each Active Agent instance i.e. to redefine a Role. A fifth interface (not shown) is for access to the persistent information i.e. role definition records.

Figure 12:
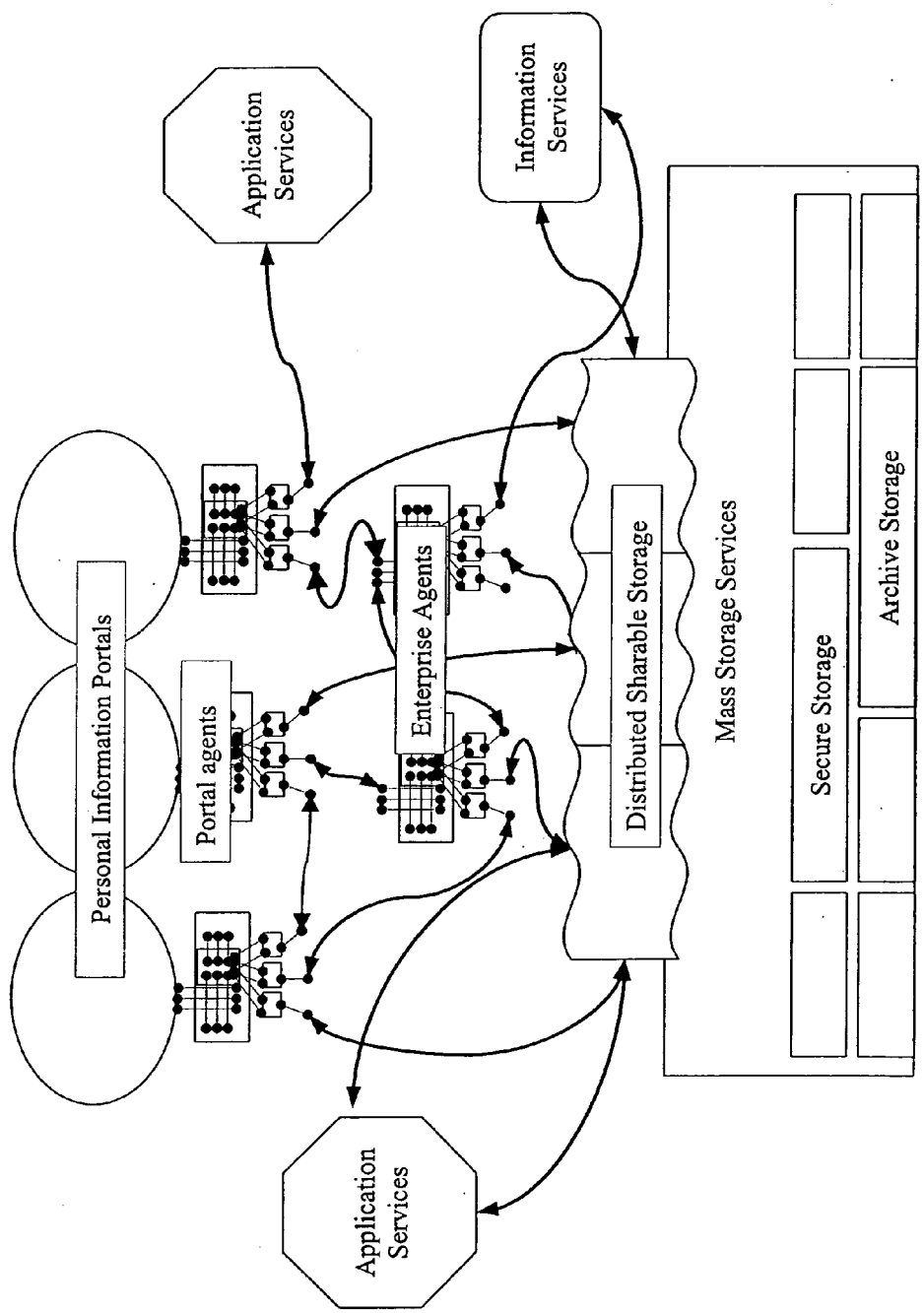
FIG. 12 is a schematic diagram showing the "implementing personal information portals" feature of this invention.

FIG. 12. Implementing Personal Information Portals

Personal Information Portals are mechanisms that enable an individual user to establish a personal view into one or more information systems in a distributed environment such as the World Wide Web or an enterprise Intranet system. A Personal Information Portal that implements an active Information Model will include the following components:

The Portal: A view of the Information System that is presented to the user

Portal Agents: Active Agent instances serve as Proxy Roles to serve user's preferred device configuration.

Enterprise Agents: Active Agent instances that represent the structure of the enterprise Active Information Model (Roles).

Distributed Sharable Storage: An information service that provides mechanisms for data sources that may be shared between users. This mechanism includes a Mass Storage Service which provides for Secure Storage and Archival Storage, as integral elements of the distributed environment.

Information Services: Other services that are available to the distributed system such as news services or stock quotes.

Application Services: These are specific functions that are external to the enterprise but necessary for the functions of the enterprise. Examples of these services are Credit card verification, or Time and Attendance applications.

Figure 13:
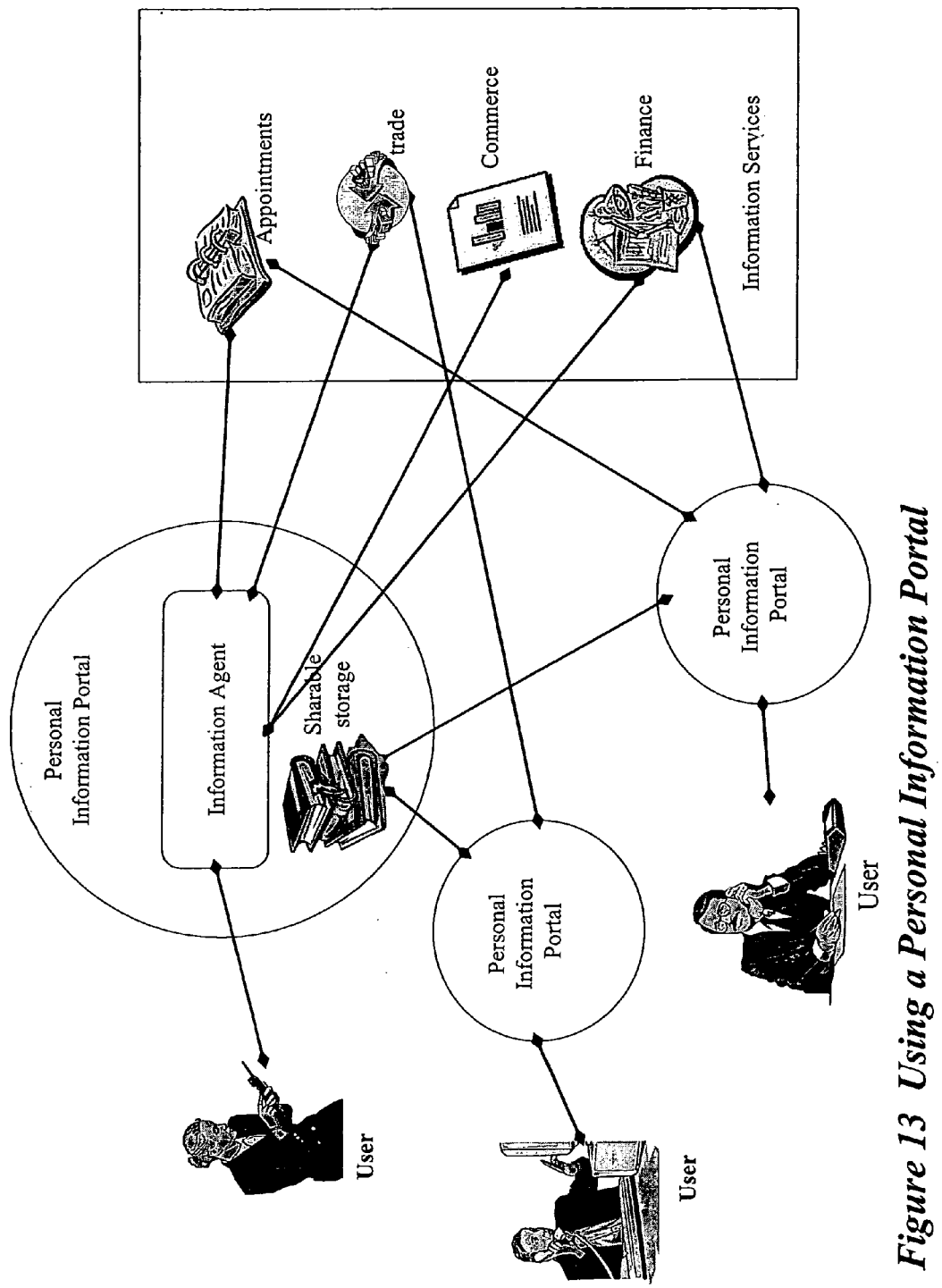
FIG. 13 is a schematic diagram showing the "using a personal information portal" feature of this invention.

FIG. 13. Using a Personal Information Portal

Using this model, the Personal Information Portal provides a mechanism where a group of users can create a distributed enterprise information that incorporates publicly available services. From the point of view of a single user, the portal incorporates an Information Agent who represents the user in each enterprise. Services that are available to the enterprise are offered to each user within the context of their specific Roles within the Information Model.

Figure 14:
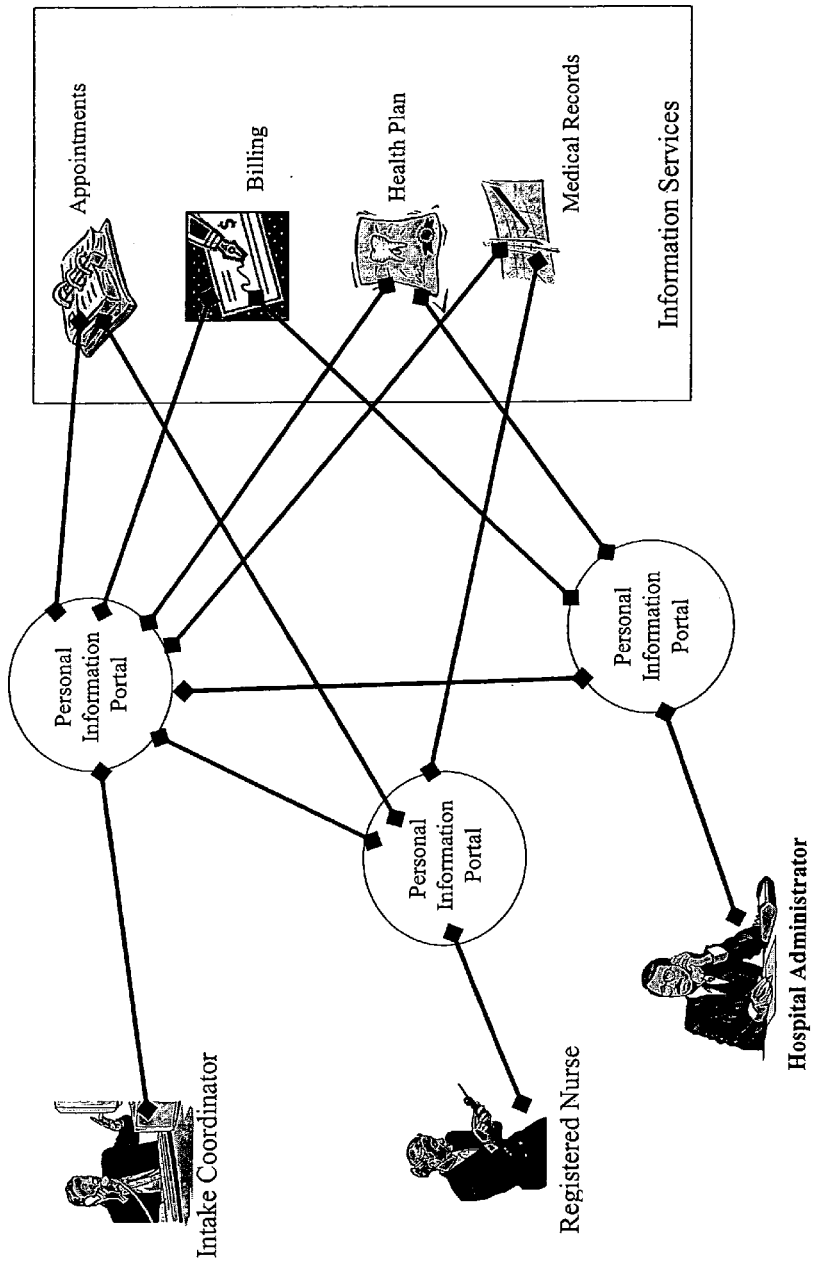
FIG. 14 is a schematic diagram showing an example: personal information portal in home healthcare.

FIG. 14. Example: Personal Information Portal in Home Healthcare

Home Healthcare is an interesting example of a distributed enterprise that includes mobile professionals, diverse and regulated practices and a strong need for formal organizational structure that is imposed by government agencies and private insurance companies. Using the Active Agent to implement an Active Information Model a Home Care system can use the World Wide Web as the foundation of its information system.

FIGS. 15 through 23 demonstrate the user interface that was designed for the pilot implementation of the administrator utility for the Active Agent engine. This interface was designed to provide direct control over the operation of each instance of the Active Agent engine by creating the appropriate Role Configuration files.

Figure 15:
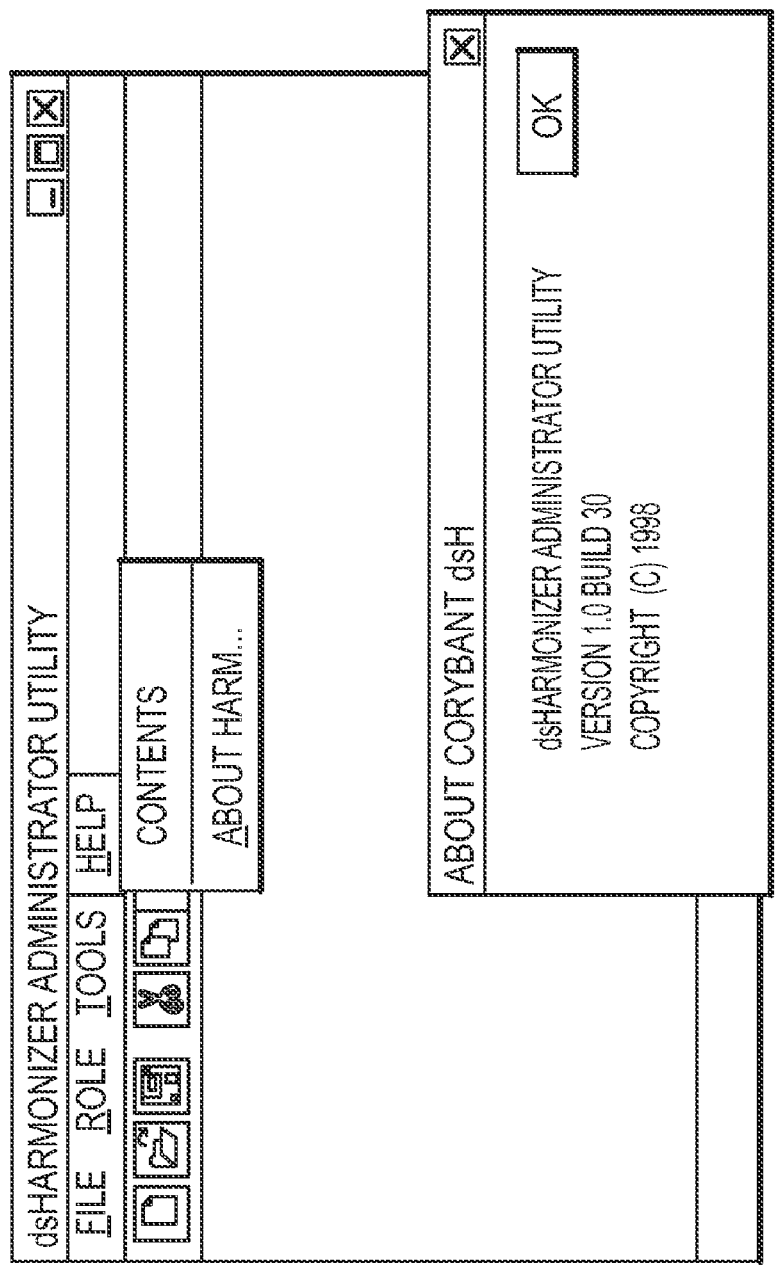
FIG. 15 is an illustration of an "about box for the Active Agent Admin utility" interface element in an embodiment of the invention.

FIG. 15. About Box for the Active Agent Admin Utility

This figure demonstrates the basic opening screen of the utility and the standard about box identifying the build version and copyright notice.

Figure 16:
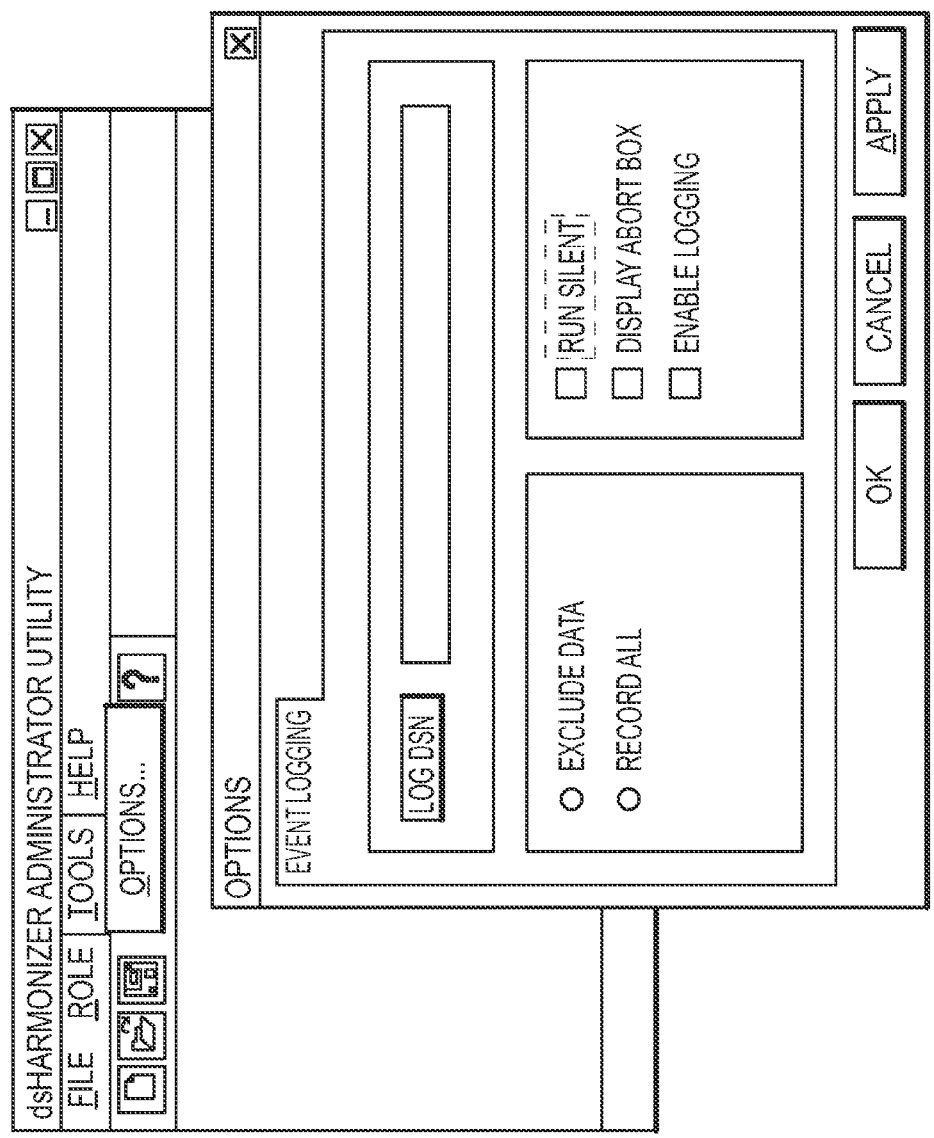
FIG. 16 is an illustration of an "Event Logging option" interface element in an embodiment of the invention.

FIG. 16. Event Logging Option

Event logging capability is a key element of the Active Information Model. Using this capability, each instance of the Active Agent engine can maintain a record of the activities that it has performed. This information can be used for audit, billing, security and predictive allocation of computing and storage resources. The direct contribution of event logging to the process of information modeling is that it provides a mechanism whereby the organization can ascertain the specific cost of the information system to the resolution of a single role. This capability provides the measurable component of the "Practical Considerations" in the decision support model.

Figure 17:
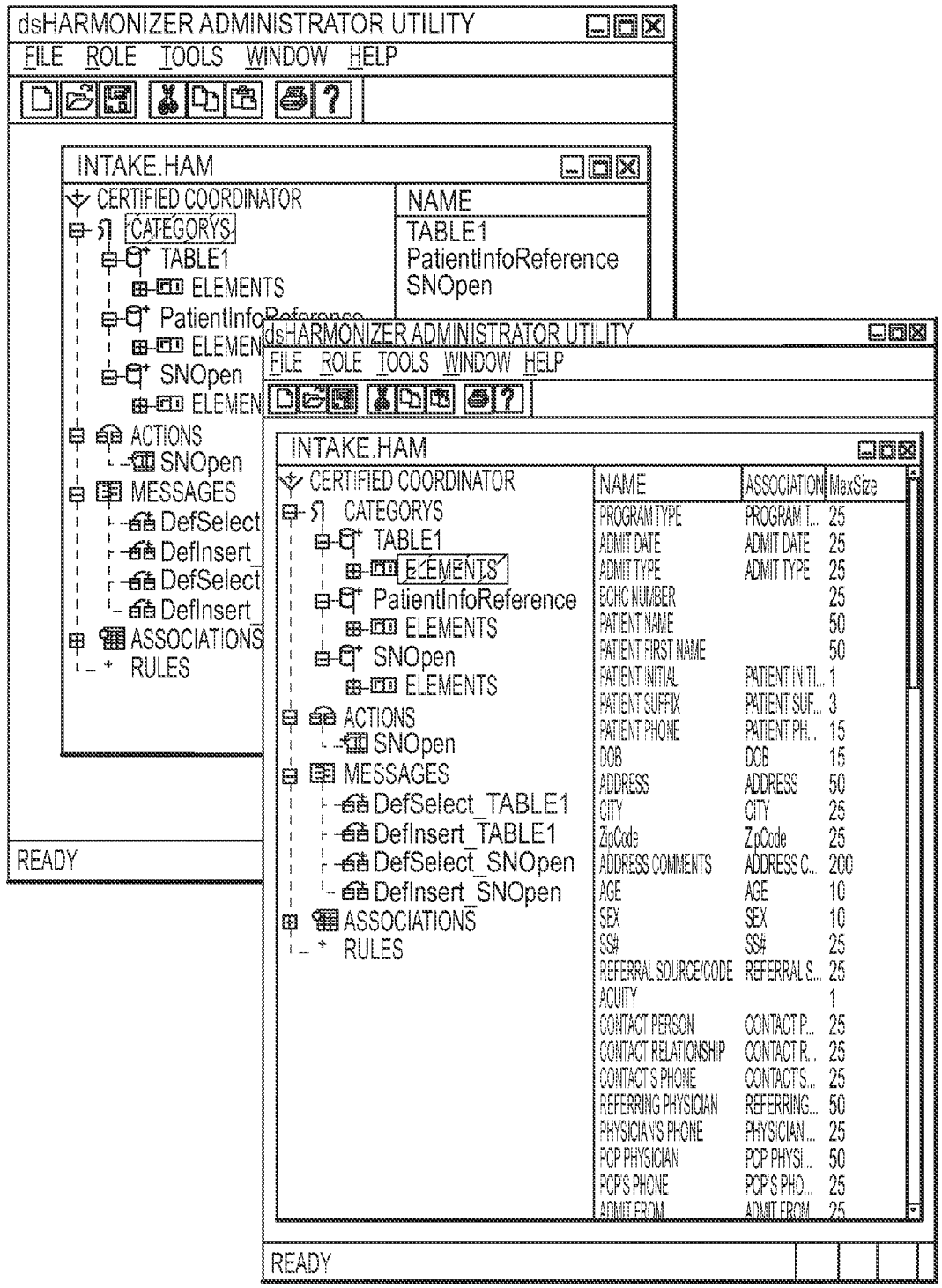
FIG. 17 is an illustration of a "navigation view" interface element for an embodiment of the invention.

FIG. 17. Navigation View

FIG. 17 displays the navigation view of a Role Configuration file defining the function of Intake in the pilot implementation example for a home care agency. The role Certified Coordinator contains three categories of data sources (Table 1; a database table, Patient Reference; a reference model pertaining to a physical, regulated form, and SNOpen; a view of a facade that is looked through another role). A deeper view of the elements within Table 1 is also demonstrated. It is significant to note that these categories maintain a unified appearance even though the nature of the data sources that they represent can vary.

Figure 18:
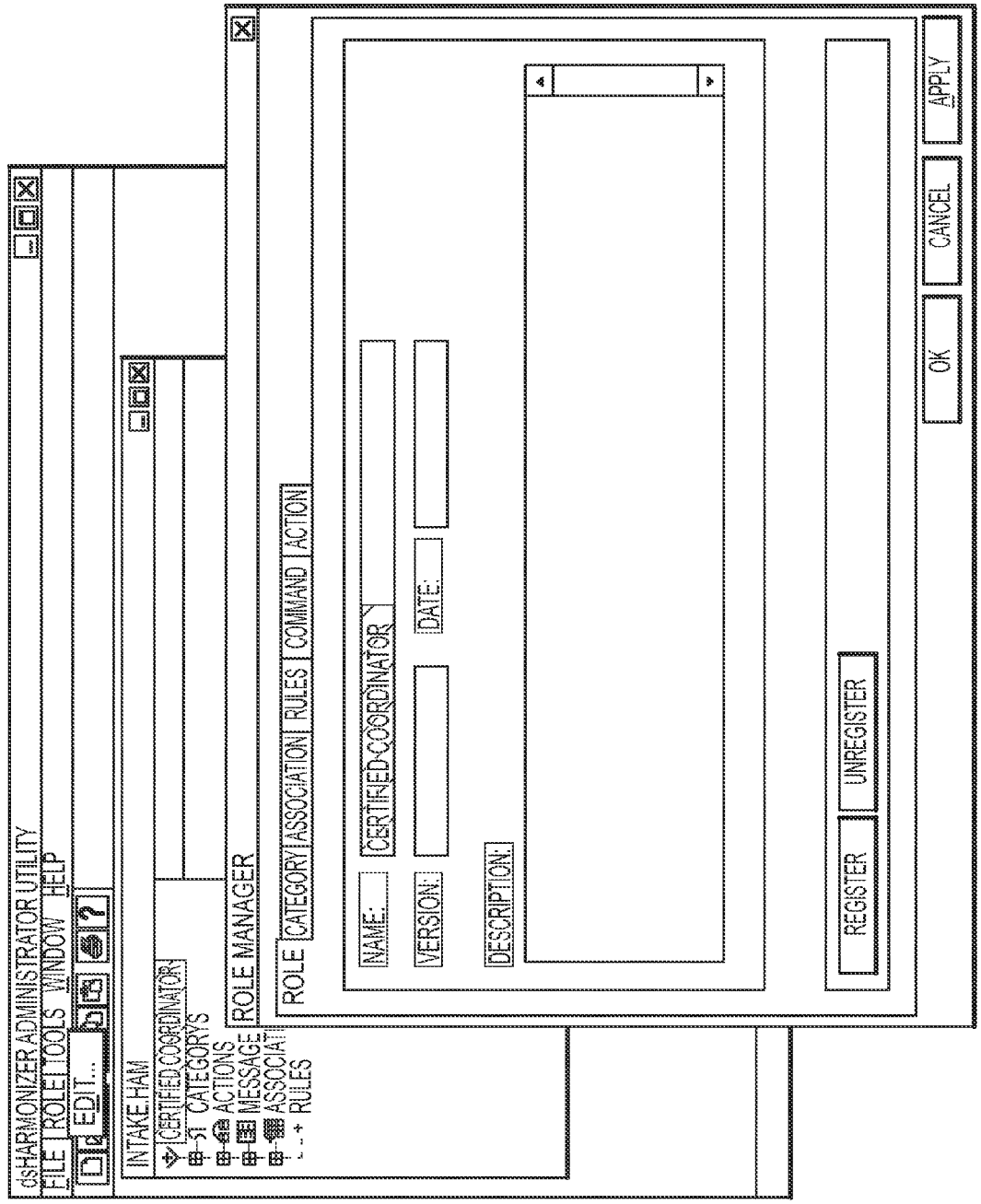
FIG. 18 is an illustration of an "edit view of a role" interface element for an embodiment of the invention.

FIG. 18. Edit View of a Role

From the perspective of the function of responsibilities within an organization a Role is a container for the mechanics of definitions and an identifier of a resource. FIG. 18 displays a "Role Manager" screen that provides edit access to the internal definition of a Role, namely the Role Identifier as well as the categories, Associates, Rules, Commands, and Actions associated with that Role.

A fundamental attribute of a Role is its relationship to the Information Model and the associated Information System. To "Register" or "Unregister" a Role, the Active Agent engine adds or removes its corresponding organizational function from the pool of resources within the Information System.

Figure 19:
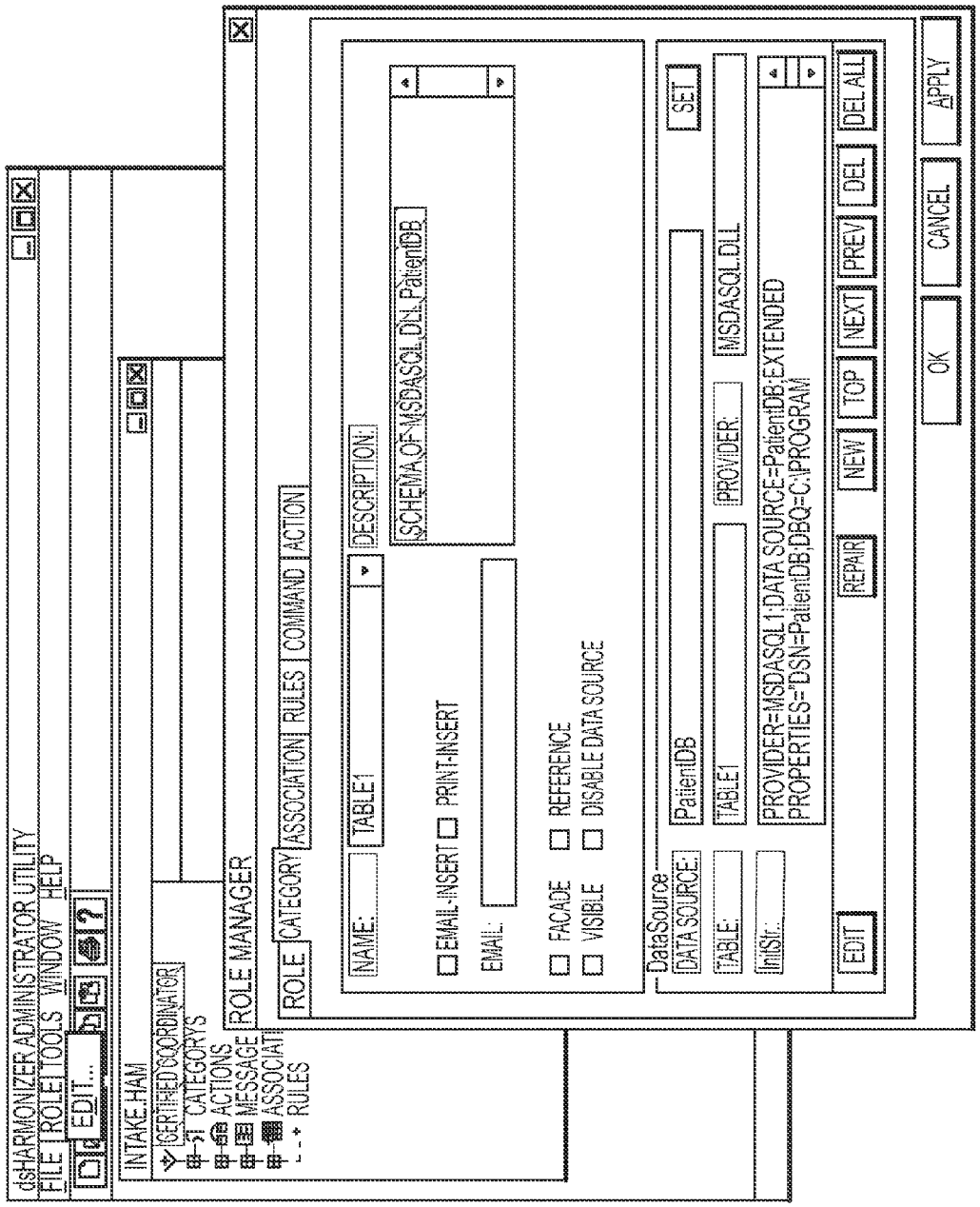
FIG. 19 is an illustration of an "edit view of a category within a role" interface element for an embodiment of the invention.

FIG. 19. Edit View of a Category within a Role

The definition of a category within a Role includes three distinct considerations:

Identification of the category: This group includes the information that is needed to access and refer to a category. These include a name, the data source and component within that data source (such as tables or queries in a database).

Disposition: These are attributes that identify the services that are available for the disposition of a category. Examples that are presented in this implementation were email or print insert. Other implementation may include a variety of services that are available to the system such as voice to text or text to voice services.

Perspectives: These characterize the relationship of the data source to the Role. In this example they include Facades, Visible, Reference and disabled.

Figure 20:
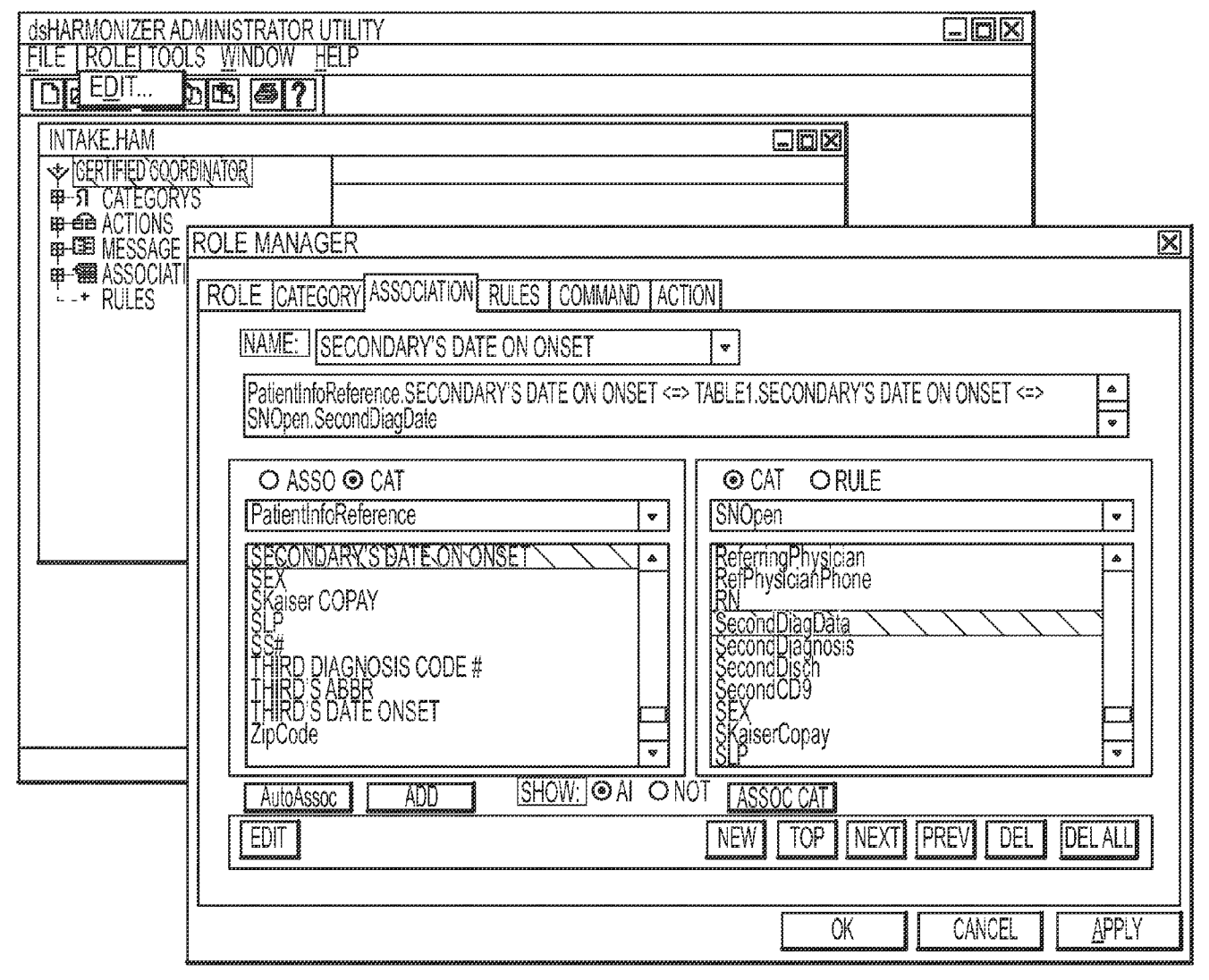

FIG. 20. Edit View of Associations within a Role

An association is a relationship between the elements of different categories. In the example above association is identified between "Secondary's Date on onset" in "PatientInfoReference" Category with "SecondDiagDate" element of "SNOpen" category.

An Association is an instance of an object within the scope of a Role. As such, a single association may connect multiple elements of multiple categories or it may connect these elements to Rules. The specific mapping of the values of these elements are not specified within the definition of an Association, only the fact that these elements are related through this association.

Figure 21:
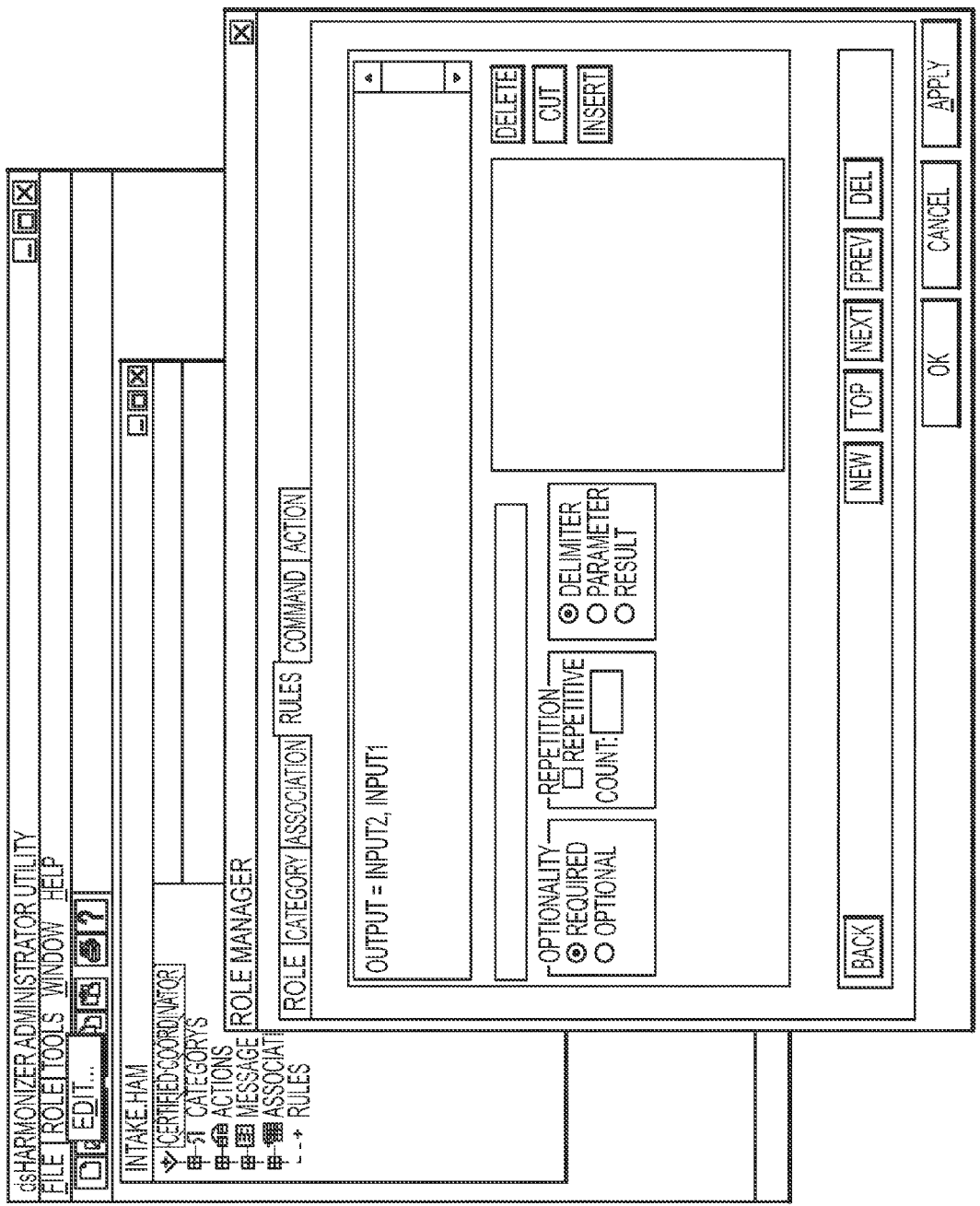
FIG. 21 is an illustration of an "edit view of rules within a role" interface element for an embodiment of the invention.

FIG. 21. Edit View of Rules within a Role

Rules define the actual mapping of the values of elements between categories. A Rule may be an interpreted script such as a Java or Perl script whose invocation arguments are the elements that are Associated with those rules. A Rule may also be an instance of an Active Agent primitive string or arithmetic operation as shown in FIG. 21.

Figure 22:
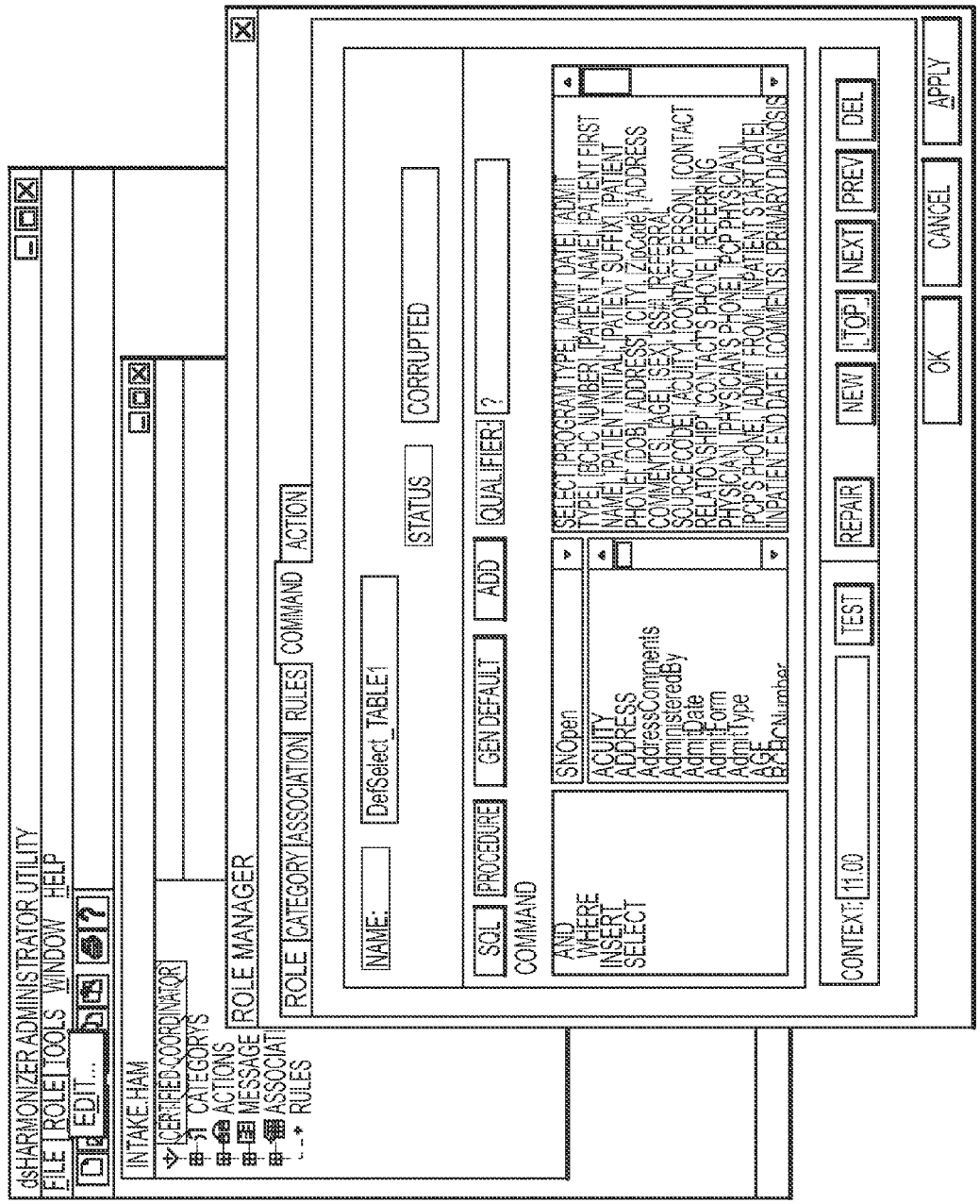
FIG. 22 is an illustration of an "edit view of commands within a role" interface element for an embodiment of the invention.

FIG. 22. Edit View of Commands within a Role

A Command is an object within the scope of a Role that serves as an atomic level operation through which a Role attempts an access to one or more elements of a data source.

A Command can accept qualifiers to communicate to a data source such as a search parameter for a data base query.

Figure 23:
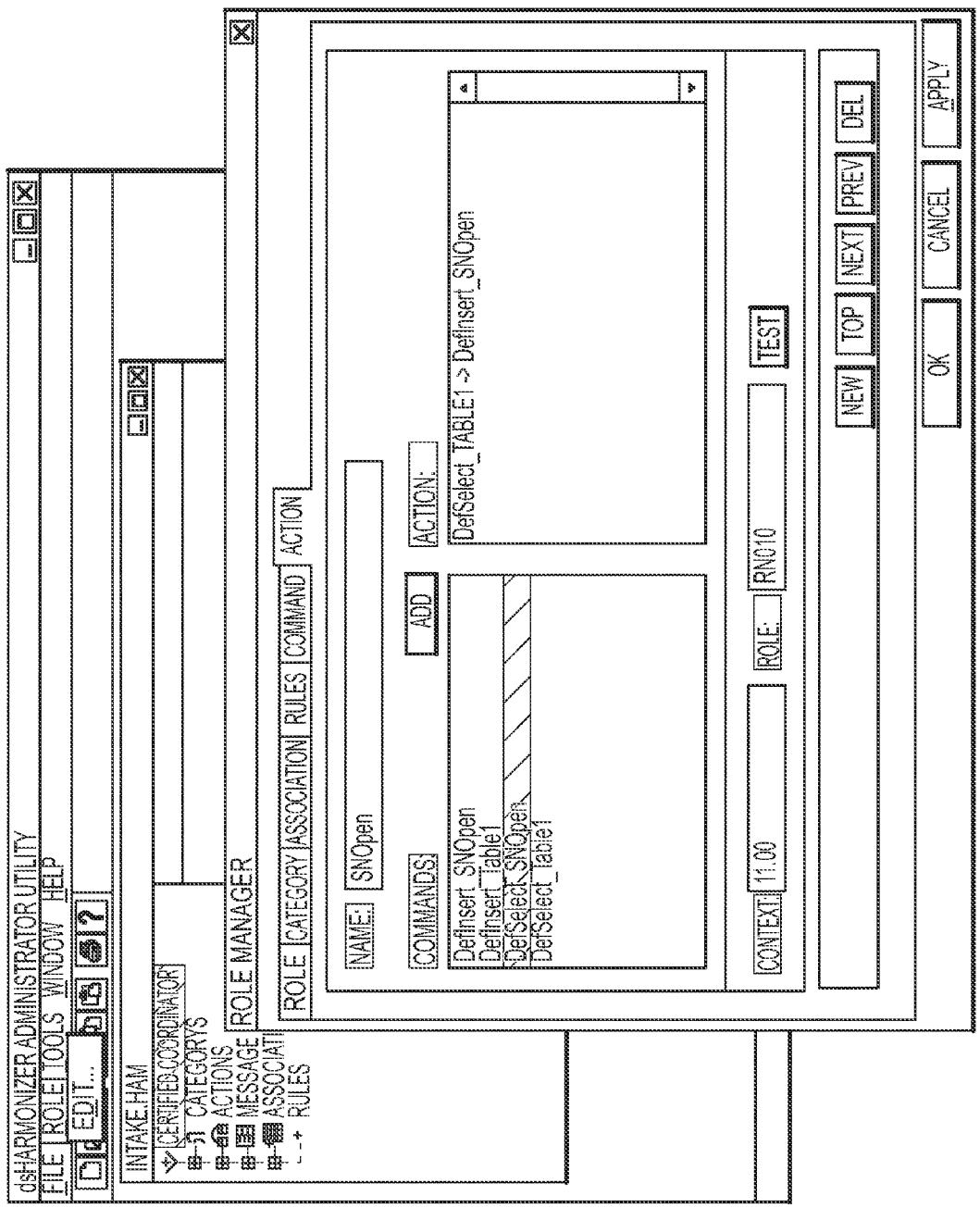
FIG. 23 is an illustration of an "edit view of actions within a role" interface element for an embodiment of the invention.

FIG. 23. Edit View of Actions within a Role

Actions are a sequence of commands that are executed in order. Actions are visible external a Role and can accept parameters as Context (arguments to be supplied to Commands). In the test implementation the Active Agent engine accepted an additional, optional, qualifier (Role) to simplify the programming of the user interface.

The application of the Active Agent: An Example

We will use the process of building an information system for HomeCare, a prototypical home healthcare agency, as an example in describing one type of problem that is addressed by the Active Agent. Home healthcare is a regulated industry and it includes:

Patients who need a moderate amount of professional care on regular basis.

Professional caregivers in a multiplicity of specialized disciplines. In most cases caregivers share caseload as a patient may need care in multiple areas or as the type and degree of care that is provided is responsive to the stage of convalescence.

Healthcare administrators who oversee the operation of agencies. A home care agency is traditionally a small organization although recently the industry is demonstrating a trend toward consolidation.

Payers. These include health insurance agencies that may be privately held as well as government institutions such as Health Care Financing Administration (HCFA).

We have chosen this industry to demonstrate an application of the Active Agent because it characterizes the behavior of an information system that needs to be User Centric in order to be effective. Specifically we are going to describe the relationship of the information system to the caregivers and healthcare administrators.

The Problem

To Harmonize: To adjust in fit proportions; to cause to agree; to show the agreement of; to reconcile the apparent contradiction of. (From Webster's Revised Unabridged Dictionary 1913)

Let us assume that HomeCare is a relatively small organization that works as an extension of a local hospital. Let us assume the administrators as well as professional caregivers associated with HomeCare have articulated its mission: "to provide a comprehensive range of home healthcare services to the community and strive for the highest level of professional and technical competence in those services".

Figure 24:
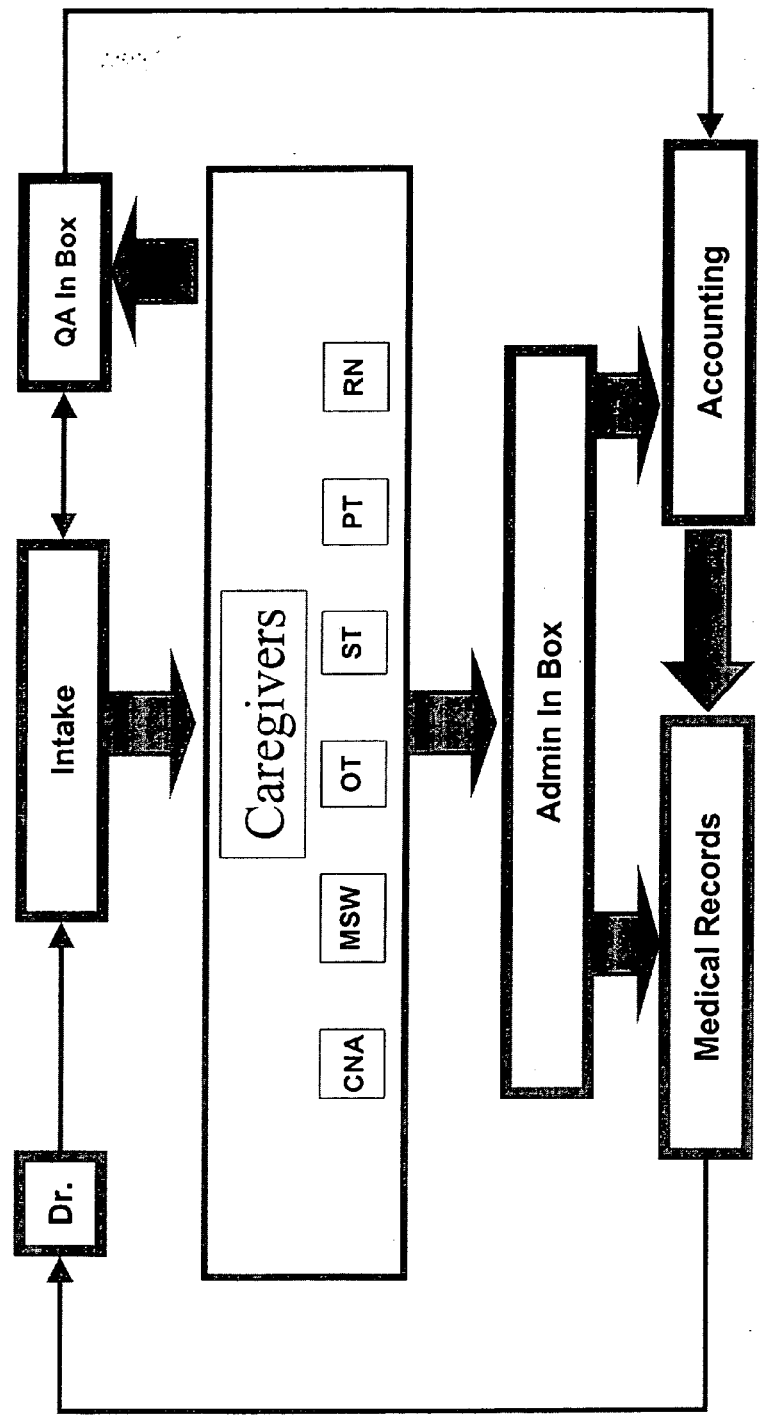
FIG. 24 is a schematic diagram showing an example: organizational view of an information system for a Home Care embodiment in accordance with this invention.

To meet the challenges of its mission statement, HomeCare must be organized to satisfy the professional needs of its employees, its own business needs, and the regulatory requirements as well as the medical needs of its clients, FIG. 24 provides an organizational view of an information system for HomeCare. Activities in this organization are substantially influenced by two external sources: the doctors and the payers. Additionally, regulatory considerations impose requirements from the perspective of quality and longevity of the patient records. Furthermore, professional and business considerations impose requirements with regard to timeliness of services and preparation of information relative to the services. Caregivers deliver the actual services that HomeCare offers according to methods and policies that are accepted by the Caregiver community in general and that are modified to fit the specific needs of the professionals who are employed by HomeCare.

FIG. 24. Organizational View of an Information System for HomeCare

Within this organization, policies regarding formal flow of information are based on:

Agreements among individuals and groups,

Job assignments,

Government regulations,

Policies of payers and doctors or client hospitals.

It is important to recognize that these elements are subject to change at various levels of the organization. For example caregivers need the flexibility to reassign caseloads in emergency situations, the administration may need to change operational policies, and payer plans and government regulation are constantly changing.

It is also important to recognize that these elements are primarily concerned with the practice of healthcare and not with technologies that may be deployed to perform the functions within this practice.

Moving Toward Automation

Let us assume that the management of HomeCare understands that the practice of information management represents a significant portion of the organization's responsibilities. Common wisdom, substantiated by practice in other industries, indicates that the proper use of "state of the art technology" in information management can improve quality and reduce operating costs. Let us assume HomeCare management identified automation as the key element for process improvement and undertakes a management initiative aimed at automating HomeCare's information management activities. Let us assume the objective of this initiative is:

"to develop a strategic plan and budget to support the automation of core business processes including tactical planning for interim computer operations, and the evaluation of appropriate available computer technology in moving toward an electronic patient record and total electronic bill generation".

However, the definition of "appropriate available computer technology" is not a constant. On the average, using the technology life cycles of 1995-1999 as a basis of calculation, the life span of an automation tool is about ½ to ⅓ the time that it takes an organization in a regulated industry to make a measurable change in its operating processes.

Traditional Decision Process

Given the above statement of objectives and operational realties, it seems inevitable that the organization will move toward higher degrees of automation in phases. Each phase will involve allocation of funds and therefore a management decision process. A traditional decision process to prioritize the goals of each phase of automation follows the decision support model that is summarized in FIG. 25.

Figure 25:
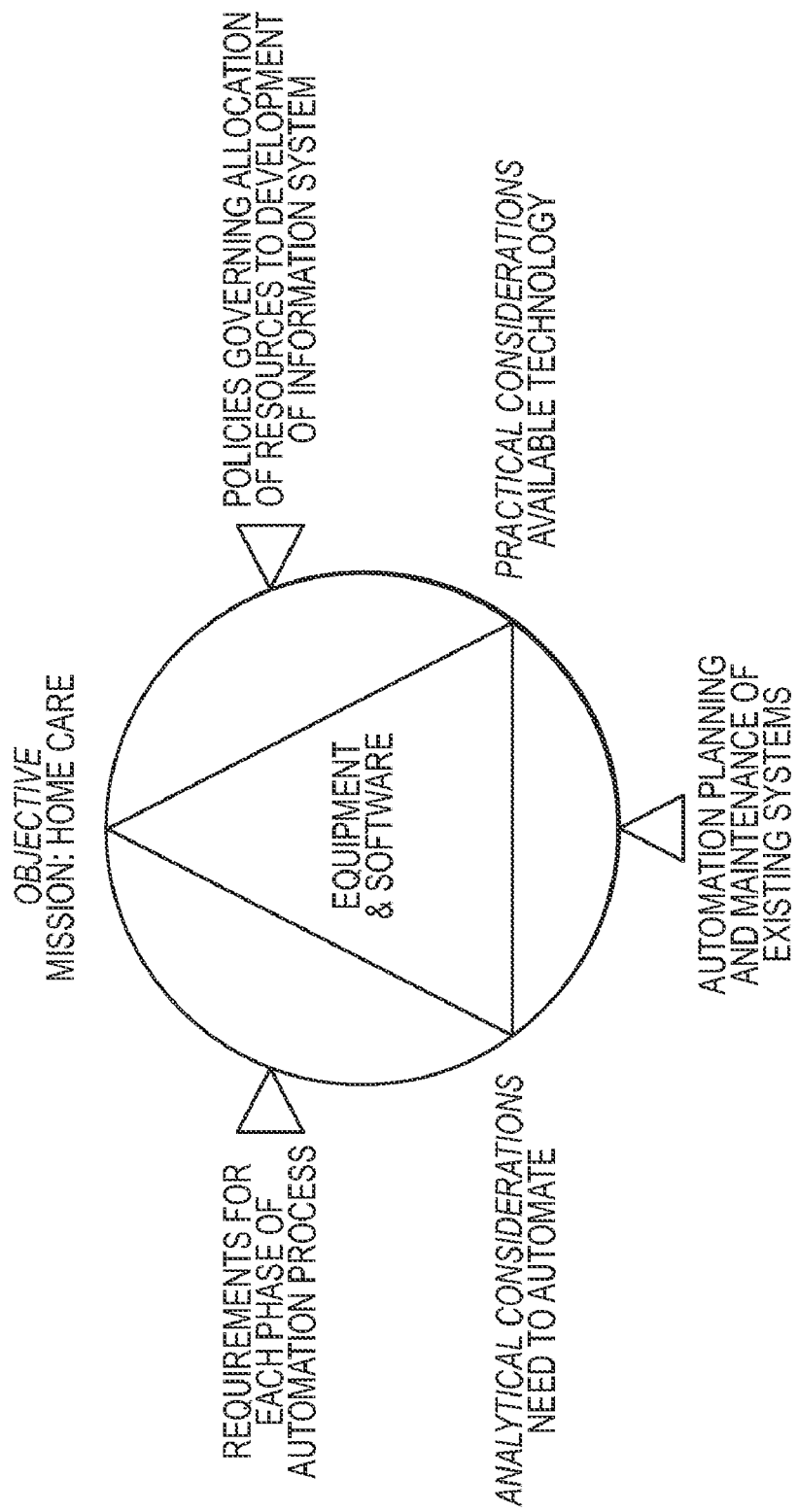
FIG. 25 illustrates a decision support model reflecting technology considerations.

FIG. 25. Decision support model reflecting technology considerations

This model identifies the elements of the decision process and highlights the relationships between these elements. It demonstrates the following principals:

The overall objective is to improve the effectiveness of the organization toward performance of its mission (home care).

Requirements for each phase of automation are driven by the need to automate some portion of the business.

The specific goals of each phase of automation will be determined by the individuals or groups who are impacted and the state of tools and services that are affordable to the organization.

The allocation of resources to each phase of automation will be driven by the realities of the business and the available technologies.

This decision process is somewhat intuitive from the perspective of supplying services and technology to this organization. It will serve to identify the resources that should be applied to acquisition and deployment of computing equipment and software. However this model is biased toward technological considerations. Since the mission of HomeCare does not involve mastery of information technologies it is not likely that HomeCare will have the staff and infrastructure to have up-to-date and accurate knowledge of available resources in this area. Consequently, there is a strong possibility that this decision will be made at the expense of the organization's ability to meet the objectives of its automation initiative.

It is a common experience that decisions based on this process tend to create conflict between the users and service providers. Practically, this process limits the practices of various departments to the capabilities offered by the primary vendor who supplied the last component of automation. Given the rate of change of technology, the fact that it may take the organization 6-12 months to adopt an automation component, and the nature of HomeCare's business that forces it to use products after they have been proven, the organization is essentially guaranteed to be using obsolete products. Phased implementation further exasperates the situation, making it practically impossible for HomeCare to effectively deploy technology.

An Alternative Decision Process

Figure 26:
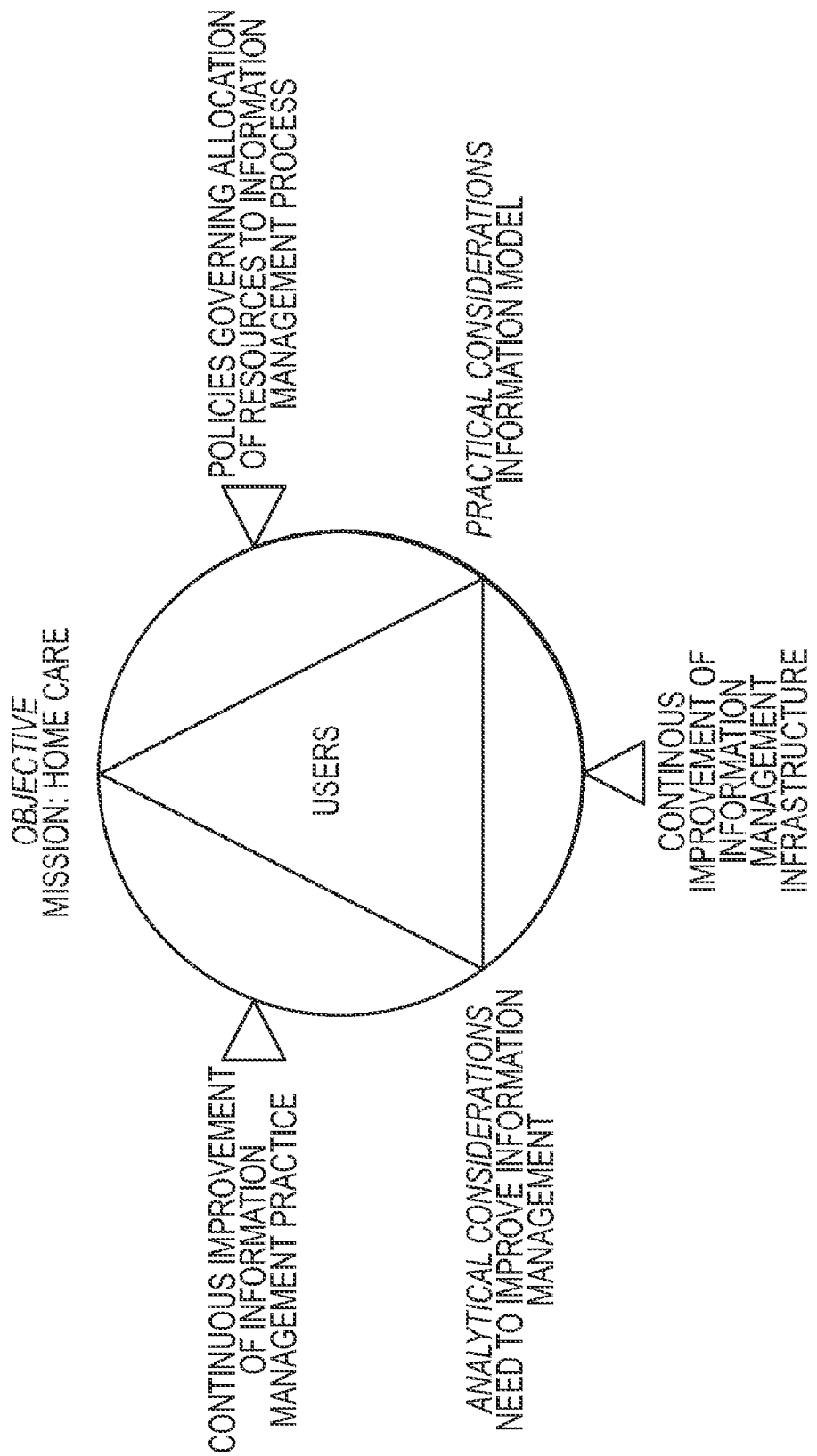
FIG. 26 illustrates a decision support model reflecting business considerations.

The decision support model of FIG. 26 demonstrates an alternate process that is to a great degree impervious to technology changes. Given such a model, the decision process for each phase of automation can be a continuation of the overall process of business automation and can benefit from the lessons learned form previous phases. Technology considerations, which are by nature variable, are still included in the process of implementing the infrastructure but they do not govern the process of automation.

This decision process is focused exclusively on the mission of HomeCare. From that perspective the primary goal of this process is to determine the resources required in order to meet the users' needs. The analytical considerations, which provide the guidelines for measuring success in each phase, are based on the strategic objective of improving the organization's ability to improve its Information Management Capabilities rather than a specific tactical need at a point in time. This approach offers a consistent means of defining the tactical goals of each phase.

In addition, the practical considerations are based on the organization's Active Information Model and not a sample of the state of implementation technology. In summary within this process:

The overall objective is to improve the effectiveness of the organization toward performance of its mission (home care).

Requirements for each phase of automation are driven by overall need of the organization to improve its ability to manage its information base.

The specific goals of each phase of automation will be determined by balancing the need to improve information management practices and affordability of the underlying technology.

The allocation of resources to each phase of automation will be driven by the realities of the business and the long-term strategy to move toward automation.

Although this approach seems reasonable and even attractive, it has not been practical because it assumes that the organization has a consistent Active Information Model that (1) is described using the terminology of the organization's primary mission and (2) can be used to control the behavior of the information system.

The inventors' Active Agent provides the mechanism for defining and implementing such an Active Information Model and in doing so makes it possible to put the needs of the users of the information system in the center of the decision support process.

Problem Definition

FIG. 27 is an information flow diagram describing the operation of the Home Care organization. It identifies the specific roles within the organization as well as the forms that are used to communicate the information. Table 27-1 below is a summary description of these forms.

In general, the process starts with a verbal order from the attending physician stating that a patient may be discharged from the hospital and requesting that this patient is placed under home care. The Certified Coordinator at HomeCare verifies the patient's eligibility for home care under the patient's insurance plan and using an Intake Form (form 1) issues a request to a Registered Nurse to conduct an initial assessment of the patient's home environment. This assessment starts the process of providing the appropriate level of care to the patient as well as the billing authorization and payment process for HomeCare.

The process of home healthcare is a supervised, regulated, collaborative process where actions and observations by professional caregivers are documented and used as a basis for future decisions. The information system that supports documentation and communication of this process must be reliable and easy to use while at the same time flexible to allow its users to execute their professional discretion as required.

TABLE 27-1

Forms useful in the system of FIG. 4.

| Reference ID | Description |
| --- | --- |
| 1 | Intake Form |
| 2 | Dr Verbal Order |
| 3/O | Open Reimbursement form |
| 4/O | Open Treatment of Consent |
| 5/O | Open Financial Responsibility |
| 6/O | Open Oasis Form |
| 7/O | Open Progress notes 2nd page only |
| 7SN | Daily Progress notes Skilled Nursing |
| 7PT | Daily Progress notes Physical Therapy |
| 7ST | Daily Progress notes Speech Therapy |
| 7OT | Daily Progress notes Occupational Therapy |
| 7MSW | Daily Progress notes Social Worker |
| 7CNA | Daily Progress notes Certified Home Health Aid |
| 8/O | Open 485 |
| 9 | Med sheet side affects |
| 10/O | Medication list |
| 11 | Discharge Summary |
| 12 | CNA Plan of Care |
| 13PT | Plan of Care Physical Therapy |
| 13ST | Plan of Care Speech Therapy |
| 13OT | Plan of Care Occupational Therapy |
| 13MSW | Plan of Care Social Worker |
| 14 | MSW Plan of Care Social Worker |
| 15PT | Initial Eval Physical Therapy |
| 15ST | Initial Eval Speech Therapy |
| 15OT | Initial Eval Occupational Therapy |
| 15MSW | Initial Evaul Social Worker |
| 16 | Activity Sheet |
| 17MSW | MSW orders |
| 17 | Interim physician's orders |
| 18 | CNA Supervisory |
| 19 | Misc. communication form |
| 20 | Revisit Form |
| 21 | Transfer Summary |

Table 27-1 Summary of forms useful in the system of FIG. 27.

Designing an Active Information Model

A change in level of automation within an organization is for all purposes a change in some of the organization's practices. In most real cases, if an organization is complex enough to benefit from having a computer based information system, it can only implement incremental operational changes. Furthermore, any significant operational change within such an organization will effect operation of all of the organization.

Given these two factors, the only realistic approach is to create an Active Information Model for the parts of the organization where a change in the scope of automation is anticipated. If we accept that continuous improvement is a desirable goal, it would follow that the most critical attribute of an Active Information Model for an organization is that it can maintain its overall integrity even though it is always only partially complete.

Since a change is a possible outcome of automation, it is reasonable to strive to establish performance measures that are independent of the organizational structure or the approach that is utilized in implementing automation. For example the efficiency of a caregiver in performing clerical and administrative work in the course of their duties is a valuable measure of improvement since external regulatory requirements impose a requirement that caregivers document performance of their tasks. On the other hand the speed by which the Certified Coordinator can assign a nurse to a case is not a useful measure since it is subject to internal agreements that do not have significance outside of the organization.

In designing an Active Information Model it is therefore necessary to identify an appropriate subset of the organization where such a performance measure applies. Such a subset for HomeCare is shown in FIG. 28.

Figure 28:
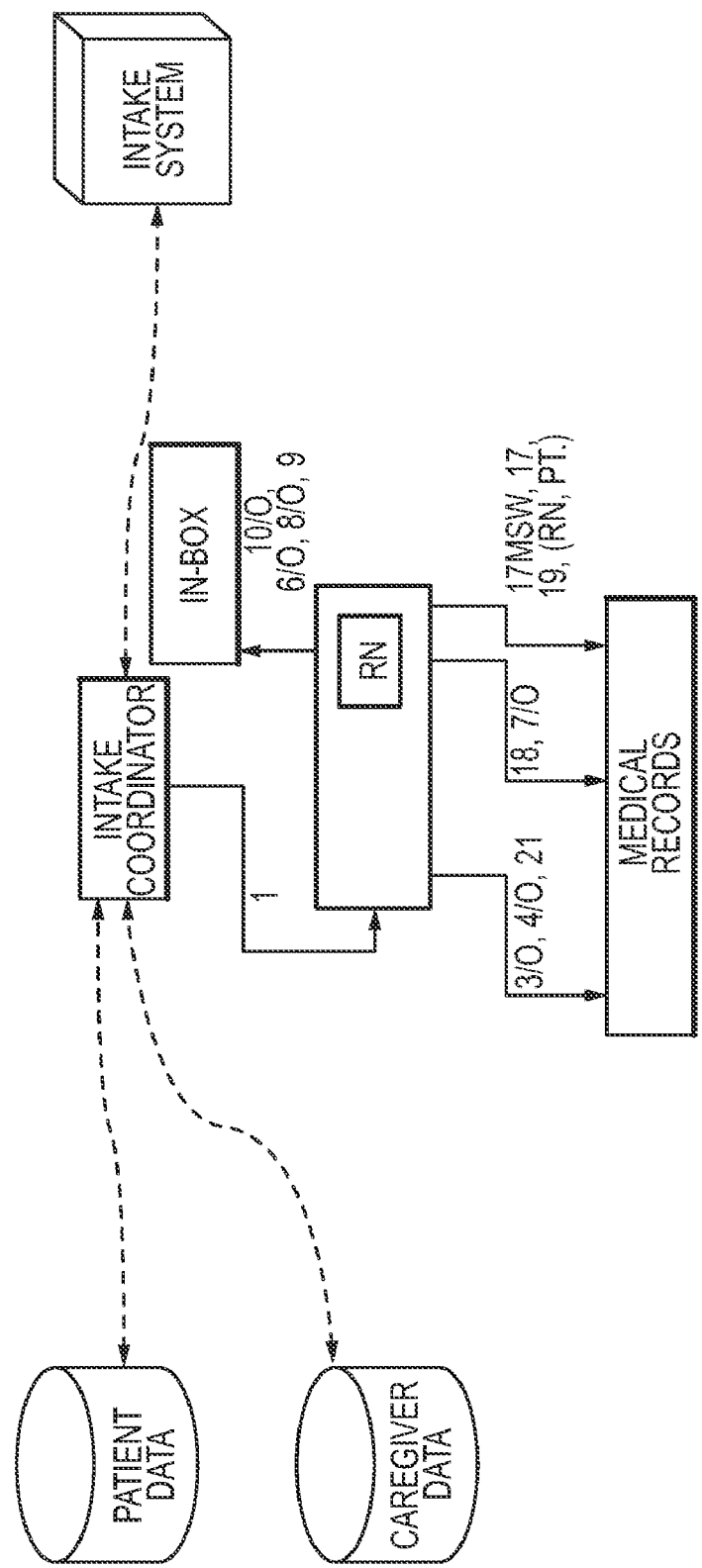
FIG. 28 is a schematic diagram showing an example: a measurable subset of the organization for a Home Care embodiment in accordance with this invention.
Figure 29:
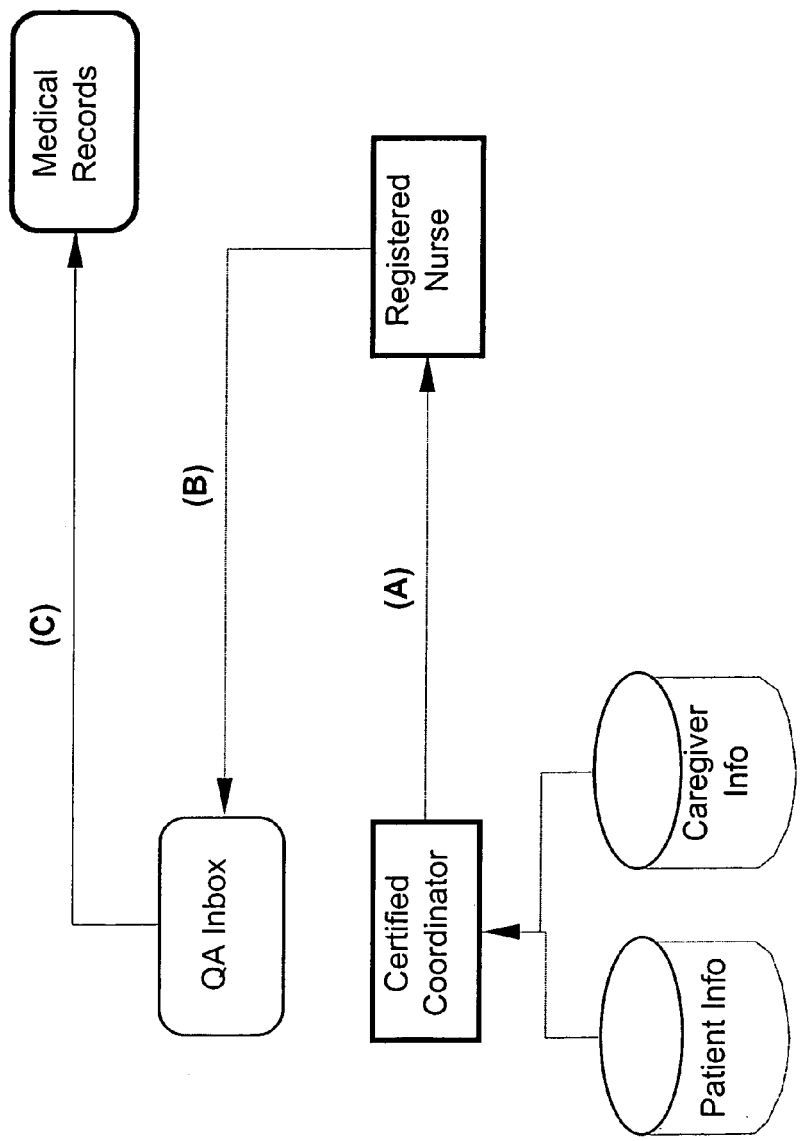
FIG. 29 is a schematic diagram showing an example: QA function explicitly defined for a Home Care embodiment in accordance with this invention.

This subset involves attributes that are identified in table 28-2, Attributes of the Measurable Subset of FIG. 28.

| | |
| --- | --- |
| Roles | Certified Coordinator, Registered Nurse |
| Categories | Patient information, Caregiver information, QA Inbasket, Medical records |
| Messages | Email, printout, fax |
| Actions | SNOpen, |

In observing the current state of the organization in the context of this simplified model, it becomes evident that in the initial definition of the organization (FIG. 27) certain control mechanisms are implicitly enforced. These mechanisms need to be explicitly defined in order for automation to succeed. For example, the simplified structure highlights that a mechanism that would notify the Certified Coordinator that a case has been accepted by the caregiver is not explicitly identified. It is common practice in small organizations for such functions to be implicit as the same individual performs multiple functions. In the case of HomeCare the administrative support functions in the organization are also responsible for certain clerical aspects of the QA function, allowing that individual to monitor closure of case assignments. The actual information flow under automation is more accurately demonstrated in FIG. 29, QA function explicitly identified.

One significant advantage of implementing an Active Information Model in small increments is that it simplifies the validation process thereby accelerating closure. After a few prototype implementations, the following considerations were identified and incorporated into the design:

It is necessary to provide a simple mechanism to change the way each Registered Nurse may utilize the services of the automated system. For example, some nurses may wish to continue to use paper forms for some or all of their charting needs while others may chose to use email and a laptop or a workstation that is on a local area network.

Different individuals within the organization may perform administration of the Active Information Model. For example the Certified Coordinator may choose to modify their own data sources while the Registered nurses may choose to modify the content and forms of charts that they create.

Figure 30:
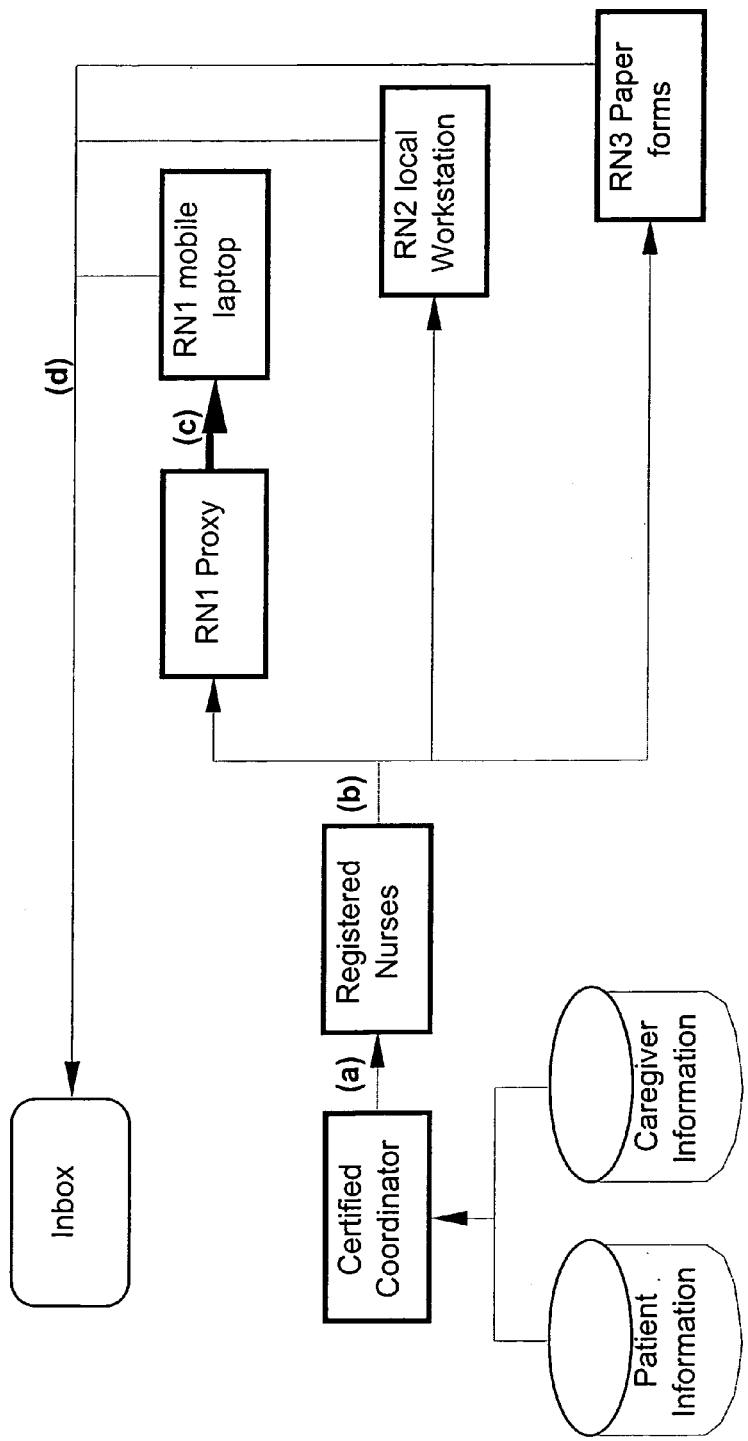
FIG. 30 is a schematic diagram showing an example: using generic roles and proxy roles for a Home Care embodiment in accordance with this invention.

Incorporating these considerations resulted in the model that is shown in FIG. 30, Using generic Roles and proxy Roles.

The overall logic of the diagram in FIG. 30 is outlined in table 30-1,

Logical Behavior of the Active Information Model (a) The Certified Coordinator role creates a message containing patient and caregiver information. This message is sent to the Registered Nurse role.

(b) The Registered Nurses role constructs a message containing patient information is sent to the specific Caregiver who is assigned to the case. The diagram shows RN1 Proxy and RN2 local as two possible destinations for this message.

(c) RN1 Proxy is a local handler that contains delivery information about RN1 mobile. The proxy function creates an information packet and forwards it to its client RN1 mobile. In this case the information packet is an INTAKE form (MSWord document) and it is delivered as an attachment to an email message.

d) The information in the INTAKE form is used to create all of the forms that are used by the Registered Nurse. The Caregiver transmits these forms to the Inbox as they are completed.

Implementation

Figure 31:
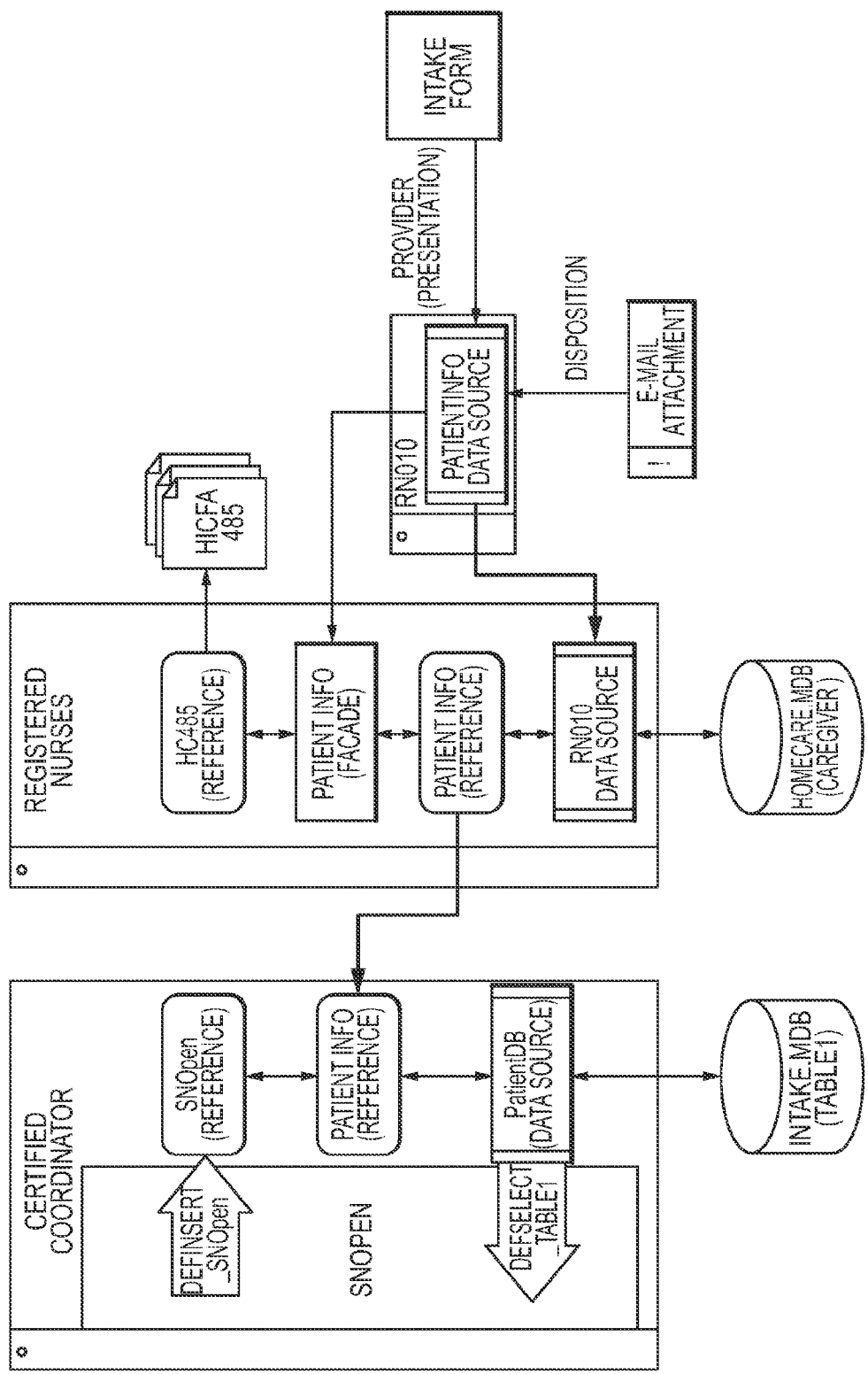
FIG. 31 is a schematic diagram showing an example: implementation of SN OPEN for a Home Care embodiment in accordance with this invention.

FIG. 31 is a schematic depiction of the Active Information Model using three instances of the Active Agent and two database tables. Each instance of the Active Agent represents a role within the Active Information Model and is tasked with receiving and sending the appropriate messages providing the appropriate mapping of the data fields for each message. The specific activity that is demonstrated is the SN OPEN action that causes the commands [defselect_table1] to map information from intake.mdb:table1 data base into appropriate format and the command [definsert_SNOpen] to select RN010 as the final recipient and present this information to the logical view of a "registered nurse" as seen by the Certified Coordinator.

The disposition of the message, i.e. the package in which the information is to be delivered to RN010 depends on the preferences of that individual. This package may be a facsimile, a print out, a phone message or a page. In this case the Active Agent instance that represents RN010, upon being presented with the SNOPEN action, creates an Intake form (an electronic document), populates it with the patient information and forwards it as an e-mail attachment.

The primary purpose of the Active Agent engine is to facilitate the implementation of an Active Information Model. For this Active Information Model to be effective its elements must deal with abstract information at the same level as the corresponding organizational elements. This capability is highlighted by the use of a reference to HCFA 485 form at the level of Active Agent instance "Registered Nurses". Although the content and the disposition of the information are substantially at the discretion of the Certified Coordinator and the RN010, the overall performance of the generic role of registered nurse is a regulated issue. At the most pragmatic level, these regulations are enforced by the way the information regarding the care of patients is presented to the payers. If (and when) the structure of HCFA485 is modified, that abstract view of this change does not change the functions within the role of the Certified Coordinator.

Deployment

Figure 32:
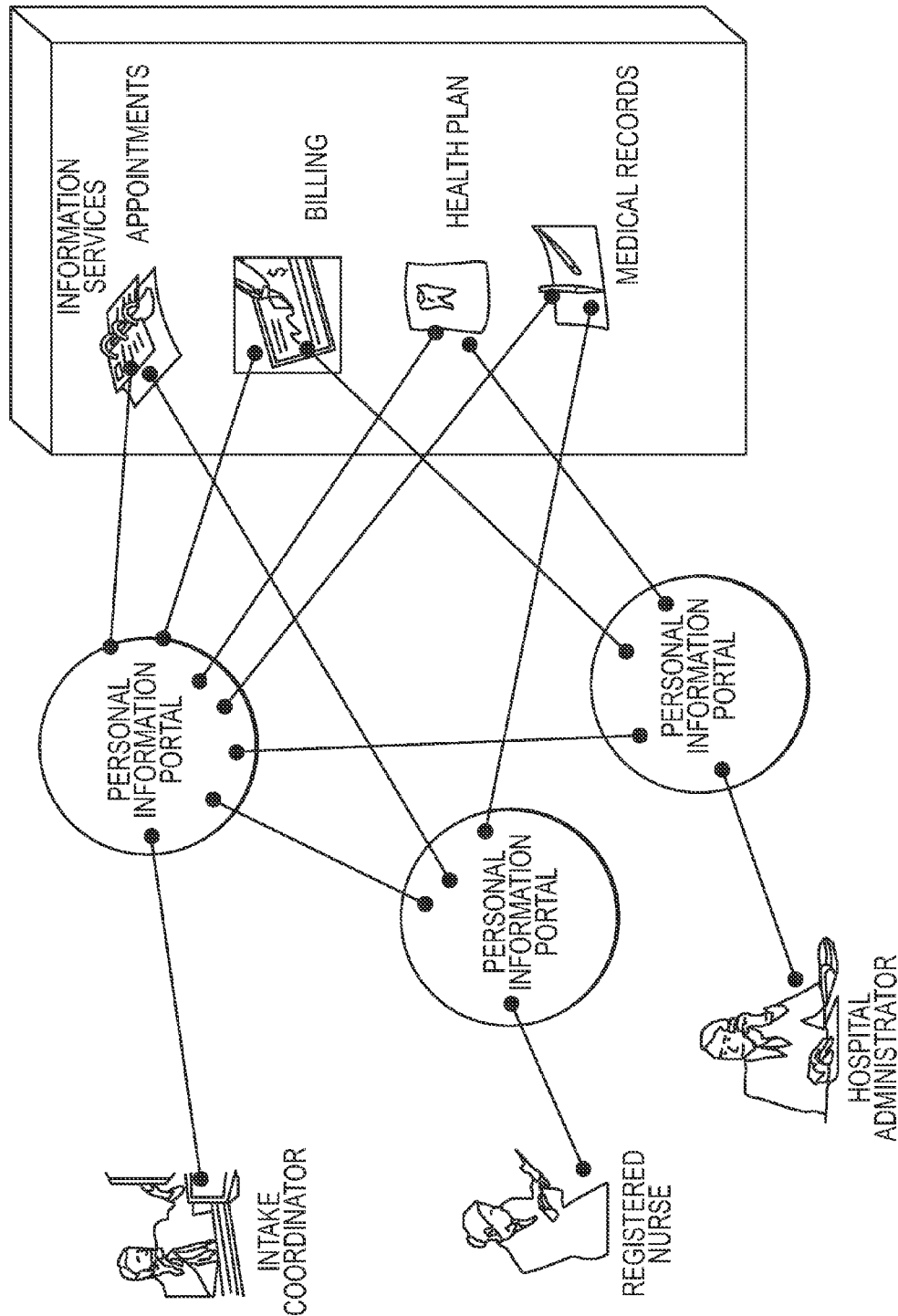
FIG. 32 is a schematic diagram showing an example: practical deployment for a Home Care embodiment in accordance with this invention.

FIG. 32 demonstrate a practical deployment option for the Active Agent. Each individual within the enterprise is assigned a Personal Information Portal, which serves as the individual's agent within the enterprise information system. This approach simplifies the task of providing access to information services within the enterprise as well as the communication process between different professionals.

Implementation Detail

Certain aspects of the pilot implementation for the system are presented below for reference. This pilot implementation used a Microsoft Windows NT® operating system as an implementation platform. The role definitions were captured in simple binary files using ".ham" extension. The pilot implementation included additional caregivers and certain other elements of the Active Information Model that are reflected in the role configuration files below.

Conventions

A directory structure that is used in implementation of the system in this example is presented in FIG. 33. This implementation includes two database files (.mdb files) and six role definition files (.ham files).

A convention that is used in this directory structure is not required by the Active Agent Administrator Utility. However certain additional conventions are necessary for proper operation of the system and are outlined below:

Roles are registered in the system registry under:

HKEY_CURRENT_USER\Software\Corybant\Harm Eng\Roles

This is accomplished by using the "Register" button from within the Active Agent Admin tool under the Role tab. If a role configuration file (.ham file) is being installed, this step is necessary to "introduce" this role to the operating system. Note that this convention enforces a need for unique names for each role within an environment.

The role definition files specifically identify the data sources that they use. These categories include the database tables, other role definition files (.ham files), and other data sources for which a provider is available (see Adding a new category below). A new data source can be identified by specifying a path or by identifying a data source that has been registered with the system. The convention that is used in this implementation is to register ODBC data sources as a system DSN under ODBC control panel.

Location of MSWord® documents that are created from within a role configuration file (.ham file) are specified in the ham file to be in the directory that is associated with that role. For example the role rn030 creates multiple forms upon receipt of GENPAC command. These forms are created as Word documents inside the directory \Program files\Corybant\homecare\registerednurses\rn030\.

Templates for MSWord® documents that are used as datasources are stored with other MS Office templates. The Active Agent engine enforces this convention.

Data Sources

The following table summarizes the datasources that are specified in this example.

| Name | Type | File | Description |
|---|---|---|---|
| cg | Access table | . . . \homecare\homecare.rndb | Care giver database. This table is references by the Intake form that is a part of the Intake.mdb database. |
| Table1 | Access table | . . . \homecare\Intake\Intake.mdb | Patient database table. This table is populated via the Intake form that is part of the Intake database |
| Intake | WORD template | Intake.dot | Intake form that is created by the proxy role configuration file (.ham file) associated with the caregiver who is |

-continued

| Name | Type | File | Description |
|------|------|------|-------------|
|      |      |      | assigned the case. This form is mailed to the mobile caregiver. |

Role Configuration Files

Figure 34:
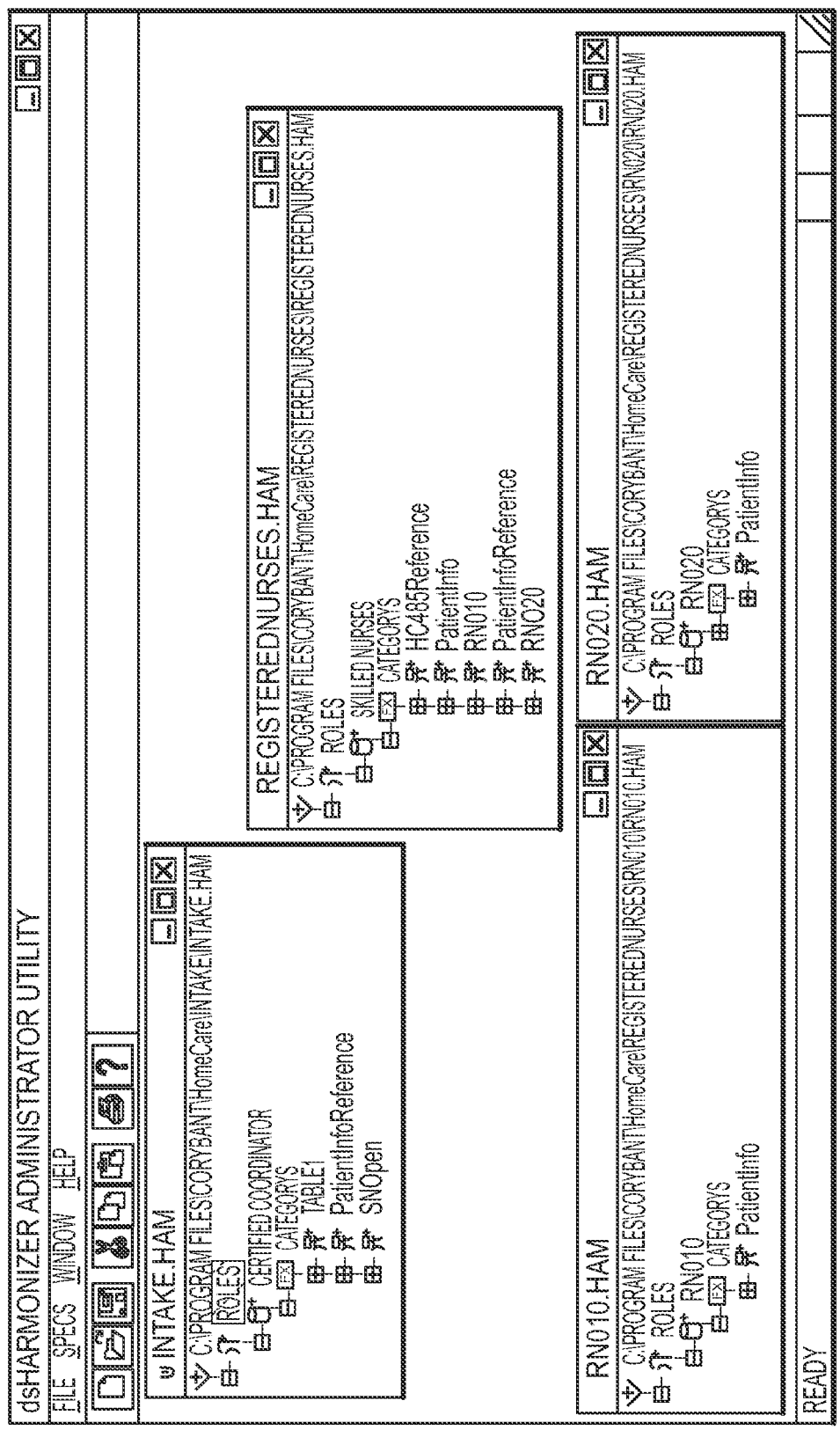
FIG. 34 is an illustration showing an example: role configuration model for the local network for a Home Care embodiment in accordance with this invention.

FIG. 34 illustrates Role Configuration models for the local Network.

Figure 35:
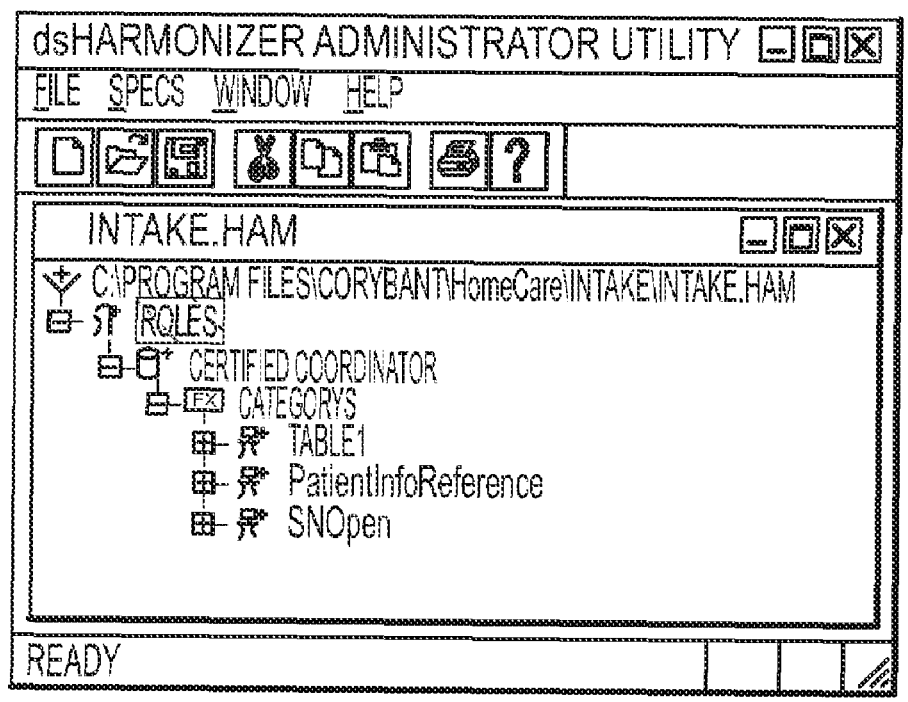
FIG. 35 is an illustration showing an example: role configuration model for certified coordinator for a Home Care embodiment in accordance with this invention.

FIG. 35 illustrates Role Configuration model for Certified Coordinator.

Figure 36:
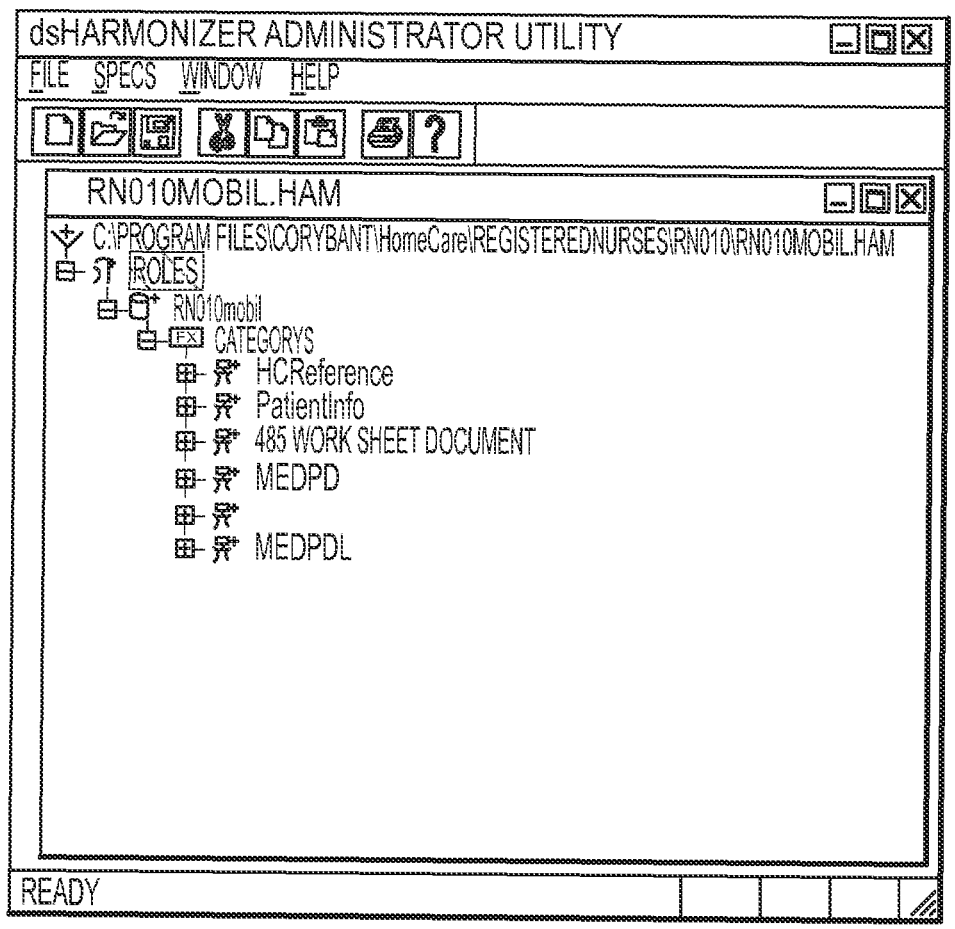
FIG. 36 is an illustration showing an example: role configuration model for mobile caregiver for a Home Care embodiment in accordance with this invention.

FIG. 36 illustrates Role Configuration model for the mobile caregiver.

Figure 37:
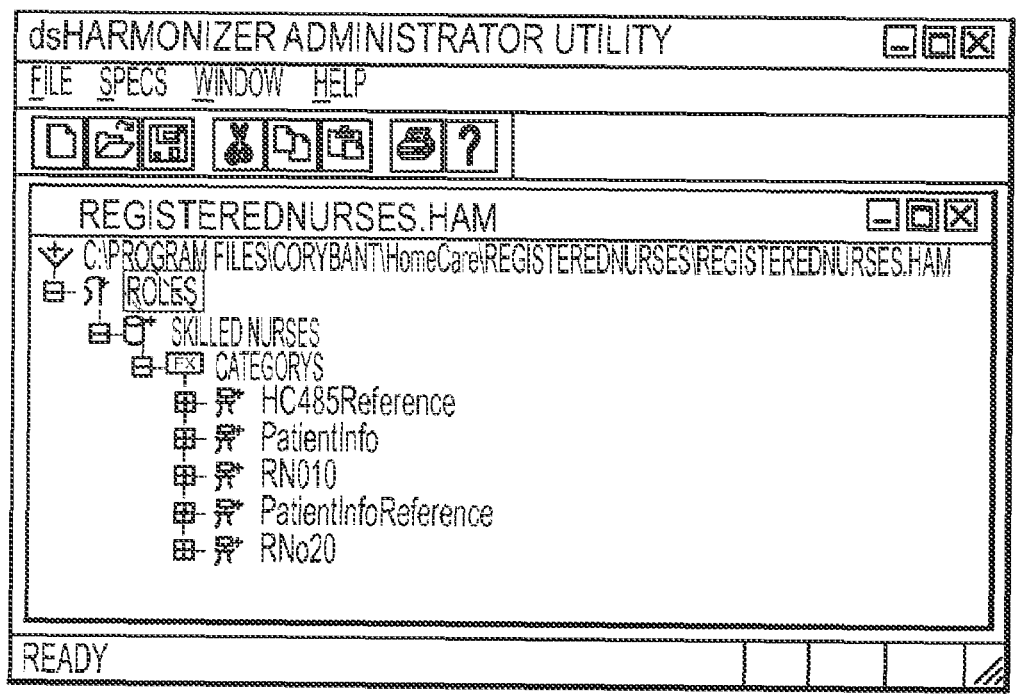
FIG. 37 is an illustration showing an example: role configuration model for skilled nurses (generic) for a Home Care embodiment in accordance with this invention.

FIG. 37 illustrates Role Configuration model for generic RN role.

Figure 38:
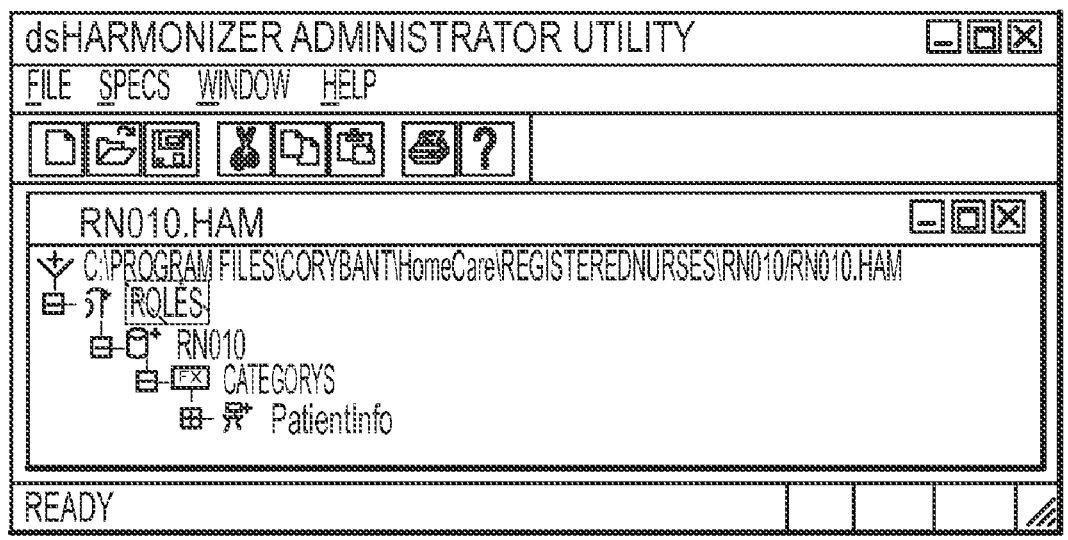
FIG. 38 is an illustration showing an example: role configuration model for a mobile RN role for a Home Care embodiment in accordance with this invention.

FIG. 38 illustrates Role Configuration model for a mobile RN role.

What is claimed is:

1. An active information model for an enterprise comprising:
    at least one personal information portal wherein the personal information portal indicates an individual within the enterprise and comprises:
    a storage mechanism configured to store a role and information including a definition of the role of the individual specifying a collection of assignments, activities and services associated with the individual and wherein the role indicates first relationships of the individual with sources of the information and with at least one function that the individual performs within the enterprise; and
    an active agent configured to retrieve the role from the storage mechanism, exchange the information with the storage mechanism and the sources of the information based on the role, and process the information based on the role to improve the active information model over time by:
        emerging technologies by providing the individual accessibilities to the sources of the information through one or more other active agents; and
        changing business needs by communicating events between application programs and moving the information between the sources according to a workflow; and
        incorporating knowledge of the role of the individual and the workflow within the enterprise by providing the individual the information according to the individual's preferences to reflect needs of the individual.

2. The active information model of claim 1 wherein the role further comprises a plurality of categories of the sources of information wherein the categories define access to and treatment of the information.

3. The active information model of claim 1 wherein the role indicates second relationships between elements in the information.

4. The active information model of claim 1 wherein the role comprises the workflow and the workflow indicates movement of the information between the sources.

5. The active information model of claim 4 wherein the workflow comprises a plurality of commands that move the information between the sources.

6. The active information model of claim 4 wherein the workflow comprises a plurality of actions that modifies the information.

7. The active information model of claim 1 wherein the active agent is configured to establish connections with the sources of the information based on the role.

8. The active information model of claim 1 wherein the active agent is configured to log the events that the active agent has performed in the storage mechanism.

9. The active information model of claim 1 wherein the active agent comprises a provider interface configured to establish connections with the sources of the information based on the role.

10. The active information model of claim 1 wherein the active agent comprises a consumer interface configured to establish connections with the sources of the information based on the role.

11. The active information model of claim 1 wherein the active agent comprises an executive interface configured to exchange and process the information based on the role.

12. A method of operating an active information model for an enterprise to improve a simple active information model over time to reflect needs of an individual by being adaptable to emerging technologies and changing business needs, wherein the active information model comprises at least one personal information portal that indicates an individual within the enterprise, the method comprising:
    storing a role of the individual in a storage mechanism within the personal information portal specifying a collection of assignments, activities and services associated with the individual and wherein the role indicates first relationships of the individual with sources of information and functions that the individual performs within the enterprise;
    in an active agent included within the personal information portal, retrieving the role of the individual from the storage mechanism;
    in the active agent, exchanging the information with the storage mechanism and the sources of the information based on the role; and
    in the active agent, processing the information based on the role by:
        providing the individual accessibilities to the sources of the information through one or more other active agents;
        communicating events between application programs and moving the information between the sources according to a workflow; and
        incorporating knowledge of the role of the individual and the workflow within the enterprise by providing the individual the information according to the individual's preferences.

13. The method of claim 12 wherein the role further comprises a plurality of categories of the sources of information wherein the categories define access to and treatment of the information.

14. The method of claim 12 wherein the role indicates second relationships between elements in the information.

15. The method of claim 12 wherein the role comprises the workflow that and the workflow indicates movement of the information between the sources.

16. The method of claim 15 wherein the workflow comprises a plurality of commands that move the information between the sources.

17. The method of claim 15 wherein the workflow comprises a plurality of actions that modifies the information.

18. The method of claim 12 further comprising:
in the active agent, establishing connections with the sources of the information based on the role.

19. The method of claim 12 further comprising:
in the active agent, logging the events that the active agent has performed in the storage mechanism.

20. A software product stored in at least one computer readable medium for operating an active information model for an enterprise, wherein the active information model improves over time by being adaptable to emerging technologies and changing business needs, allowing at all times for different parts of the enterprise to be at different levels of operational and technological maturity or obsolescence, wherein the active information model comprises at least one personal information portal that indicates an individual within the enterprise and comprises a storage mechanism and an active agent, the software product comprising:

active agent software operational when executed by a processor to direct the processor to retrieve at least one of the roles of the individuals from a storage mechanism, exchange information with the storage mechanism and sources of the information based on the role, and process the information based on the role to improve the active information model over time by:
providing the individual accessibilities to the sources of the information through one or more other active agents;
communicating events between application programs and moving the information between the sources according to a workflow; and
incorporating knowledge of the role of the individual and the workflow within the enterprise by providing the individual the information according to the individual's preferences;

wherein the role specifies a collection of assignments, activities and services associated with the individual and indicates first relationships of the individual with the sources of the information and functions that the individual performs within the enterprise.

21. The software product of claim 20 wherein the role further comprises a plurality of categories of the sources of information wherein the categories define access to and treatment of the information.

22. The software product of claim 20 wherein the role indicates second relationships between elements in the information.

23. The software product of claim 20 wherein the role comprises the workflow and the workflow indicates movement of the information between the sources.

24. The software product of claim 23 wherein the workflow comprises a plurality of commands that move the information between the sources.

25. The software product of claim 23 wherein the workflow comprises a plurality of actions that modifies the information.

26. The software product of claim 20 wherein the active agent software is operational when executed by the processor to establish connections with the sources of the information based on the role.

27. The active information model of claim 20 wherein the active agent software is operational when executed by the processor to log the events that the active agent has performed in the storage mechanism.

* * * * *